(12) United States Patent
Suggu et al.

(10) Patent No.: US 11,702,011 B1
(45) Date of Patent: Jul. 18, 2023

(54) DATA AUGMENTATION FOR DRIVER MONITORING

(71) Applicant: PlusAI, Inc., Cupertino, CA (US)

(72) Inventors: Sai Akhil Suggu, Cupertino, CA (US); Inderjot Singh Saggu, Cupertino, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/855,670

(22) Filed: Jun. 30, 2022

(51) Int. Cl.
- *B60R 1/20* (2022.01)
- *G06V 10/82* (2022.01)
- *G06V 20/59* (2022.01)

(52) U.S. Cl.
CPC ............... *B60R 1/20* (2022.01); *G06V 10/82* (2022.01); *G06V 20/597* (2022.01)

(58) Field of Classification Search
None
See application file for complete search history.

(56) References Cited

U.S. PATENT DOCUMENTS

| | | | |
|---|---|---|---|
| 10,169,680 | B1 | 1/2019 | Sachdeva et al. |
| 2016/0325680 | A1 | 11/2016 | Curtis et al. |
| 2016/0379486 | A1 | 12/2016 | Taylor |
| 2019/0108384 | A1* | 4/2019 | Wang ................ G06V 20/49 |
| 2020/0242379 | A1* | 7/2020 | Mabuchi ............ G06V 30/1988 |
| 2021/0023992 | A1 | 1/2021 | Broggi |
| 2021/0124916 | A1* | 4/2021 | Boon ................ B60W 40/08 |
| 2021/0309248 | A1 | 10/2021 | Choe et al. |
| 2021/0380115 | A1* | 12/2021 | Alpert ............. B60W 30/0956 |
| 2021/0383096 | A1 | 12/2021 | White et al. |
| 2021/0383616 | A1 | 12/2021 | Rong et al. |
| 2022/0067408 | A1 | 3/2022 | Sheu et al. |
| 2022/0101047 | A1* | 3/2022 | Puri ................... G06T 11/00 |
| 2022/0137634 | A1 | 5/2022 | Bozchalooi et al. |

OTHER PUBLICATIONS

Bhatia, Notice of Allowance, U.S. Appl. No. 17/855,717, dated Sep. 28, 2022, 9 pgs.
Suggu, Office Action, U.S. Appl. No. 17/855,623, dated Feb. 1, 2023, 27 pgs.

* cited by examiner

*Primary Examiner* — Rebecca A Volentine
(74) *Attorney, Agent, or Firm* — Morgan, Lewis & Bockius LLP

(57) ABSTRACT

This application is directed to augmenting training images used for generating a model for monitoring vehicle drivers. A computer system obtains a first image of a first driver in an interior of a first vehicle and separates, from the first image, a first driver image from a first background image of the interior of the first vehicle. The computer system obtains a second background image and generates a second image by overlaying the first driver image on the second background image. The second image is added to a corpus of training images to be used by a machine learning system to generate a model for monitoring vehicle drivers. In some embodiments, at least one of the first driver image and the second background image is adjusted to match lighting conditions, average intensities, and sizes of the first driver image and the second background image.

20 Claims, 28 Drawing Sheets

1400

At a computer system including one or more processors and memory:

Obtain a first image of a road 1402

Identify within the first image a drivable area of the road 1404

Obtain an image of an object 1406

Generate a second image from the first image by overlaying the image of the object over the drivable area 1408

> Extract the image of the object from the first image at a first location within the first image 1418
>
> Obtain the image of the object from a source that is distinct from the first image 1424
>
> Select a second location in the drivable area 1420
>
> Overlay the image of the object at the second location of the drivable area 1422

Add the second image to a corpus of training images to be used by a machine learning system to generate a model for facilitating driving of a vehicle 1410

> The corpus of training images includes the first image 1412
>
> The object is an uncommon object that is selected from a plurality of known objects 1426
>
> The uncommon object is marked with a predefined label for the plurality of known objects 1428
>
> The model is constructed based on one-class learning and trained using the corpus of training images to detect a first type of road features and a second type of outlier objects. The second type of outlier objects include the plurality of uncommonly-seen objects 1430

Train, using machine learning, a model using the corpus of training images, including the second image 1414

Distribute the model to one or more vehicles, including a first vehicle; wherein, in use, the model is configured to process road images captured by the first vehicle to facilitate driving the first vehicle 1416

At a computer system including one or more processors and memory: 2002

Obtain a first image of a first driver in an interior of a first vehicle 2004

Separate, from the first image, a first driver image from a first background image of the interior of the first vehicle 2006

> Apply a segmentation model to generate a segmentation mask that (1) associates a plurality of first pixels of the first image with the first driver image or (2) associates a plurality of second pixels of the first image with the first background image 2018
>
>> The segmentation model includes a U-Net that is based on a fully convolutional network 2020

Obtain a second background image 2008

> Collect a plurality of background images 2024

> Map each of the background images onto a respective point in a multidimensional space having a distance metric d 2026

> Cluster the plurality of background images using the distance metric d to form a plurality of image clusters 2028

> For each of the plurality of background images, determine, on a clustering plot, a respective distance between the respective background image and a corresponding cluster center of an image cluster to which the respective background image belongs, wherein the second background image is selected from the plurality of background images based on the respective distance between the second background image and the corresponding cluster center 2030

Adjust one or more image properties of, normalize, and/or scale at least one of the first driver image and the second background image 2022

Generate a second image by overlaying the first driver image onto the second background image 2010

Add the second image to a corpus of training images to be used by a machine learning system to generate a model for autonomously monitoring vehicle drivers 2012

| Train the model for autonomously monitoring vehicle drivers to determine whether a vehicle driver is looking forward at a road ahead of a vehicle 2014 | Train the model for autonomously monitoring vehicle drivers to determine whether a vehicle driver is looking forward at a road, looking to the left, looking to the right, looking down, closing eyes, or talking 2016 |

Figure 20

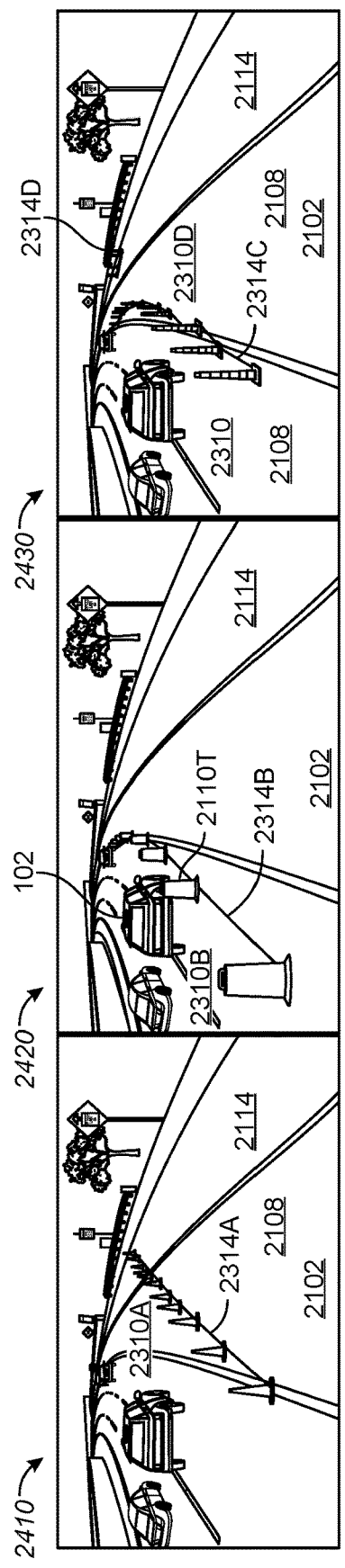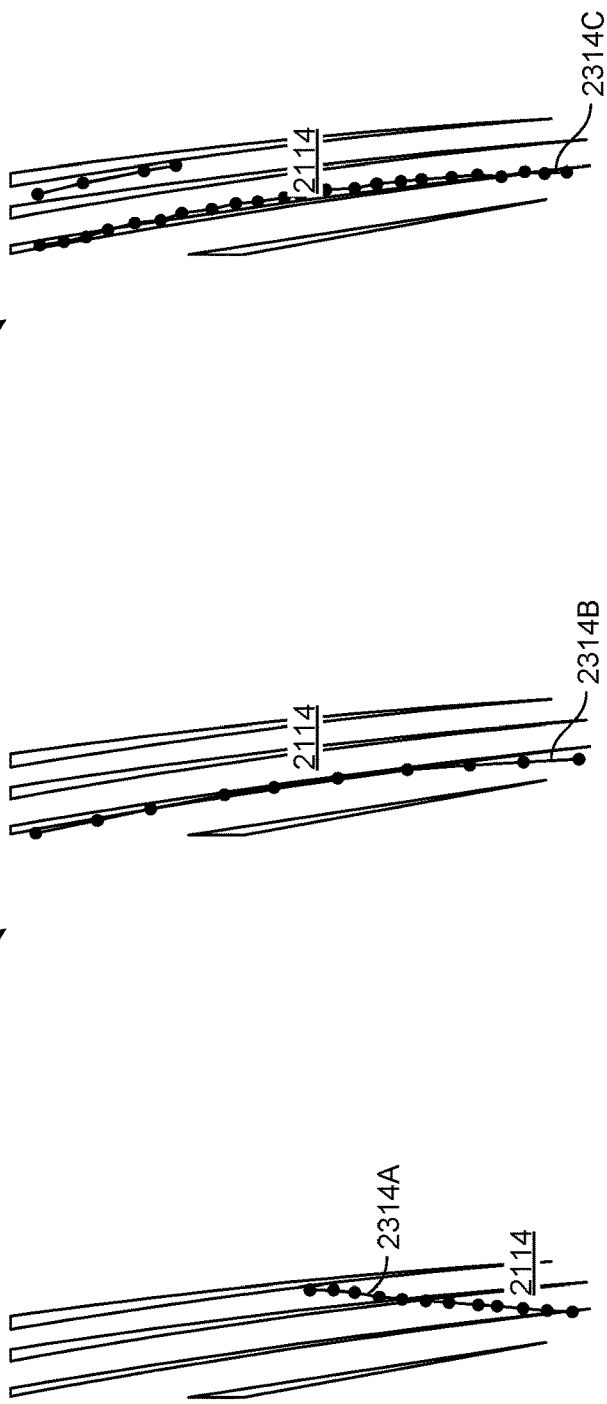

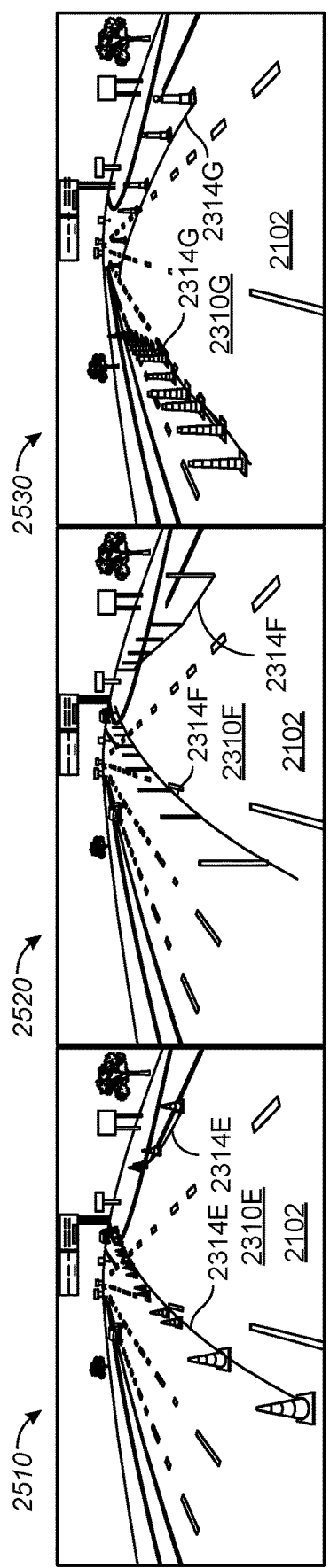
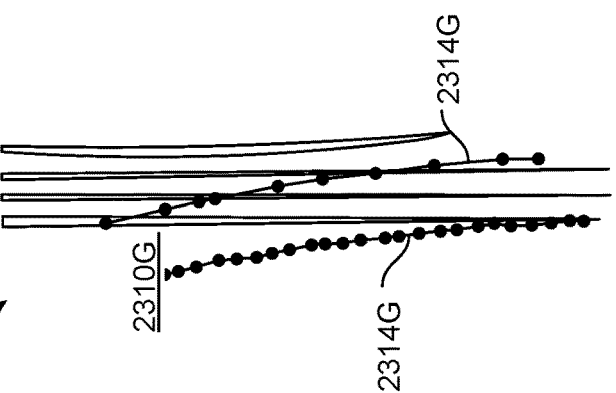
Figure 25A  Figure 25B  Figure 25C
Figure 25D  Figure 25E  Figure 25F

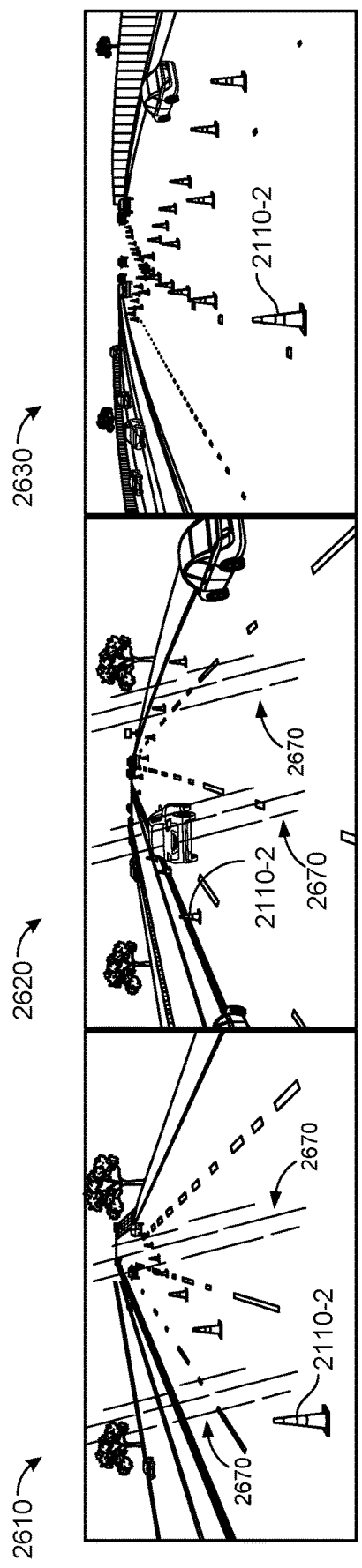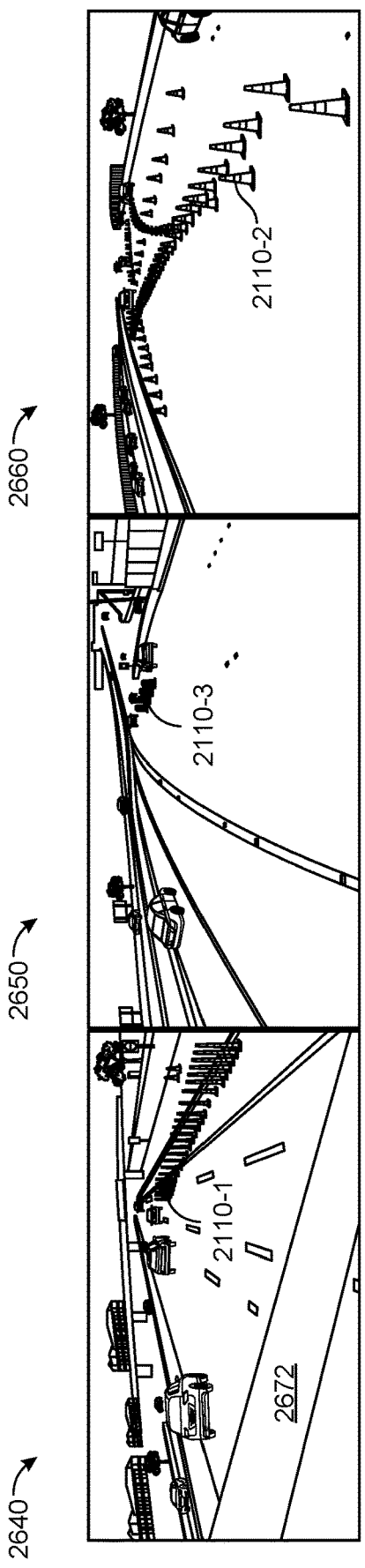

2700

- Obtain a first image of a road 2702
- Identify within the first image a drivable area of the road 2704
- Obtain an image of a traffic safety object 2706
- Determine a detour path on the drivable area 2708
  - The detour path is defined by two substantially parallel detour lane lines, and positions of one or more of the traffic safety objects are substantially on or near the detour lane lines 2728
  - Determine a first detour lane line that is adjacent to the detour path and configured to define the detour path on the drivable area 2730
  - Identify positions for one or more of the plurality of traffic safety objects on or near the first detour lane line 2732
- Determine positions for a plurality of traffic safety objects to be placed adjacent to the detour path 2710
- Generate a second image from the first image by adaptively overlaying a respective copy of the image of the traffic safety object at each of the determined positions 2712
  - Scale a respective size of the respective copy of the image of the traffic safety object based on a respective position where the respective traffic safety object is to be placed 2722
  - Adjust an orientation of the respective copy of the image of the traffic safety object based on a direction normal to the drivable area at the respective position 2724
  - Adjust one or more image properties of the respective copy of the image of the traffic safety object 2726
- Add the second image to a corpus of training images to be used by a machine learning system to generate a model for facilitating at least partial autonomous driving of a vehicle 2714
- Train, using machine learning, the model using the corpus of training images, including the second image 2716
- Distribute the model to one or more vehicles, including a first vehicle 2718
  - In use, the model processes road images captured by the vehicle to facilitate at least partially autonomously driving the vehicle 2720

Figure 27

DATA AUGMENTATION FOR DRIVER MONITORING

RELATED APPLICATIONS

This application is related to U.S. patent application Ser. No. 17/855,623 titled "Data Augmentation for Vehicle Control", filed Jun. 30, 2022, and U.S. patent application Ser. No. 17/855,717, titled "Data Augmentation for Detour Path Configuring", filed Jun. 30, 2022, each of which is incorporated by reference in its entirety.

TECHNICAL FIELD

The present application generally relates to vehicle technology, and more particularly to, computer-aided methods and systems for augmenting existing training data applied to train a deep learning model for at least partial autonomous vehicle control.

BACKGROUND

Vehicles are now capable of self-driving with different levels of autonomy. Each of these levels is characterized by the amount of human and autonomous control. For example, The Society of Automotive Engineers (SAE) defines 6 levels of driving automation ranging from 0 (fully manual) to 5 (fully autonomous). These levels have been adopted by the U.S. Department of Transportation.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving. One of the key obstacles facing the autonomous vehicle industry, however, is the complexity and unpredictability of road and traffic conditions. This makes it difficult to train autonomous vehicles for every possible rare condition or event that the vehicle may encounter while driving (so-called "edge" cases). For example, occasionally, human drivers may need to react to extraordinary or rare events, like a package falling off of a truck, a lane closure, or something even more rare, such as an aircraft making an emergency landing on the freeway. In these rare situations, human drivers are usually able to react instinctively to avoid harm to themselves and their vehicles. However, unless an autonomous driving model has been trained for each such rare event, the vehicle may not know how to react.

To capture and learn from existing road and traffic conditions, fleet operators often collect large amounts of data from individual vehicles. This data is regularly sent from the vehicles to a remote server and later analyzed. Transmitting such large amounts of data (e.g., HD video or LIDAR data) from many vehicles (e.g., over a cellular data network) consumes valuable communication bandwidth and is prohibitively expensive. Therefore, it is desirable to provide a more efficient mechanism for collecting, monitoring, and learning from road condition data captured by a fleet of vehicles.

Additionally, the large amounts of data collected by individual vehicles are often processed in real time using deep learning techniques. These deep learning techniques are trained using training data that was previously collected under different traffic conditions. Collection of thorough and high-quality training data is costly in time and money, and the training data collected in real life is often insufficient or has a low quality. Data inferred by the deep learning techniques oftentimes has a limited accuracy level because of the insufficient or low-quality training data used in training. It would be beneficial to have a more efficient mechanism to train and apply deep learning techniques to facilitate vehicle driving.

SUMMARY

This application is directed to methods, systems, and non-transitory computer readable storage media for augmenting training data used to train models that facilitate driving of a vehicle (e.g., models for object perception and analysis, vehicle localization and environment mapping, vehicle drive control, vehicle drive planning, and local operation monitoring). Training data augmentation can be implemented in different levels. For example, in simple augmentation, at least one transformation of geometry, color, or kernel is applied to images used in vehicle model training. In complex augmentation, part of an image is optionally replaced with a portion from another image, and new features or information may be added to an image without changing remaining features in the image. In some situations, an entirely new scenario is created in an image by data augmentation, and the augmented training data is applied in vehicle model training. Such data augmentation is highly scalable and can be implemented at a low cost and with a quick turnaround time. This improves diversity and quantity of the training data, providing high fidelity coverage of more driving scenarios.

In one aspect, a method is implemented at a computer system including one or more processors and memory to augment training data used for vehicle driving modelling. The method includes obtaining a first image of a road, identifying within the first image a drivable area of the road, obtaining an image of an object, generating a second image from the first image by overlaying the image of the object over the drivable area, and adding the second image to a corpus of training images to be used by a machine learning system to generate a model for facilitating driving of a vehicle. In some embodiments, the method further includes training, using machine learning, a model using the corpus of training images, including the second image, and distributing the model to one or more vehicles. In use, the model is configured to process road images captured by a first vehicle to facilitate driving the first vehicle (e.g., at least partially autonomously).

In one aspect, a method is implemented at a computer system including one or more processors and memory to augment training images used for monitoring vehicle drivers. The method includes obtaining a first image of a first driver in an interior of a first vehicle and separating, from the first image, a first driver image from a first background image of the interior of the first vehicle. The method further includes obtaining a second background image and generating a second image by overlaying the first driver image on the second background image. The method further includes adding the second image to a corpus of training images to be used by a machine learning system to generate a model for monitoring vehicle drivers. In some embodiments, the model for monitoring vehicle drivers is configured to determine whether a vehicle driver is looking forward at the road ahead of the vehicle. In some embodiments, the model for monitoring vehicle drivers is configured to determine whether a vehicle driver is looking forward at the road, looking to the left, looking to the right, looking down, closing his/her eyes, or talking.

In some embodiments, the method further includes collecting a plurality of background images and clustering the plurality of background images to generate a plurality of image clusters. The method further includes identifying a set of one or more remote images that are most distant in the plurality of image clusters and selecting the first background image from the set of remote images.

In one aspect, a method is implemented at a computer system including one or more processors and memory to augment training images used for generating vehicle driving models. The method includes obtaining a first image of a road, identifying within the first image a drivable area of the road, obtaining an image of a traffic safety object (e.g., a cone, a delineator, or a barrel), determining a detour path on the drivable area, and determining positions for a plurality of traffic safety objects to be placed adjacent to the detour path. The method further includes generating a second image from the first image by adaptively overlaying a respective copy of the image of the traffic safety object at each of the determined positions. The method further includes adding the second image to a corpus of training images to be used by a machine learning system to generate a model for facilitating driving of a vehicle. In some embodiments, the method further includes training the model by machine learning using the corpus of training images. The training images include the second image. The model is distributed to one or more vehicles, including a first vehicle. In use, the model is configured to process road images captured by the first vehicle to facilitate driving the vehicle (e.g., at least partially autonomously).

According to another aspect of the present application, a computer system includes one or more processing units and memory having a plurality of programs stored in the memory. The programs, when executed by the one or more processing units, cause the vehicle to perform any of the methods for augmenting training data and facilitating vehicle driving as described above.

According to another aspect of the present application, a non-transitory computer readable storage medium stores a plurality of programs configured for execution by a computer system having one or more processing units. The programs, when executed by the one or more processing units, cause the computer system to perform any of the methods for augmenting training data and facilitating vehicle driving as described above.

BRIEF DESCRIPTION OF DRAWINGS

The accompanying drawings, which are included to provide a further understanding of the embodiments, are incorporated herein, constitute a part of the specification, illustrate the described embodiments, and, together with the description, serve to explain the underlying principles.

FIG. 14 is a flow diagram of a process for augmenting training data used for vehicle driving modelling, in accordance with some embodiments.

FIG. 20 is a flow diagram of an example method for augmenting training images used for generating a model for monitoring vehicle drivers, in accordance with some embodiments.

FIGS. 24A-24C are three example training images including a plurality of traffic safety objects, in accordance with some embodiments, and FIGS. 24D-24F are top views of a drivable area of a road in the training images in FIGS. 24A-24C, in accordance with some embodiments.

FIGS. 25A-25C are another three example training images including a plurality of traffic safety objects, in accordance with some embodiments, and FIGS. 25D-25F are top views of a drivable area of a road in the training images in FIGS. 25A-25C, in accordance with some embodiments.

FIGS. 26A-26F are six training images showing a drivable area of a road where copies of an image of a traffic safety object are placed to define distinct detour paths, in accordance with some embodiments.

FIG. 27 is a flow diagram of another example method for augmenting training data used for generating autonomous vehicle driving modelling, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to augmenting training data (particularly road images) used to train models that facilitate driving of a vehicle. Existing training data is expanded by (1) adding one or more road features (e.g., a vehicle or a pedestrian) on a drivable area of a road, (2) adding traffic safety objects (e.g., cones, delineators, barrels, flashers, or reflectors) on a drivable area of a road, and/or (3) changing a foreground image or a background image of a driver image. Such augmented training data can be used locally (or at a remote server) by a machine learning system of the vehicle to train a model for facilitating driving of a vehicle (e.g., for occluded lane detection, generic-obstacle detection, shoulder vehicle detection, and/or cone-based detour path detection). Such data augmentation is highly scalable and can be implemented at a low cost with a quick turnaround time, thereby allowing entirely new scenarios to be created in training data and applied in vehicle model training. By these means, the diversity and quantity of the training data can be conveniently improved to provide a high fidelity coverage of more driving scenarios and make sure that the models are trained with high quality training data and can output accurate deep learning results to facilitate vehicle driving.

Figure 1:
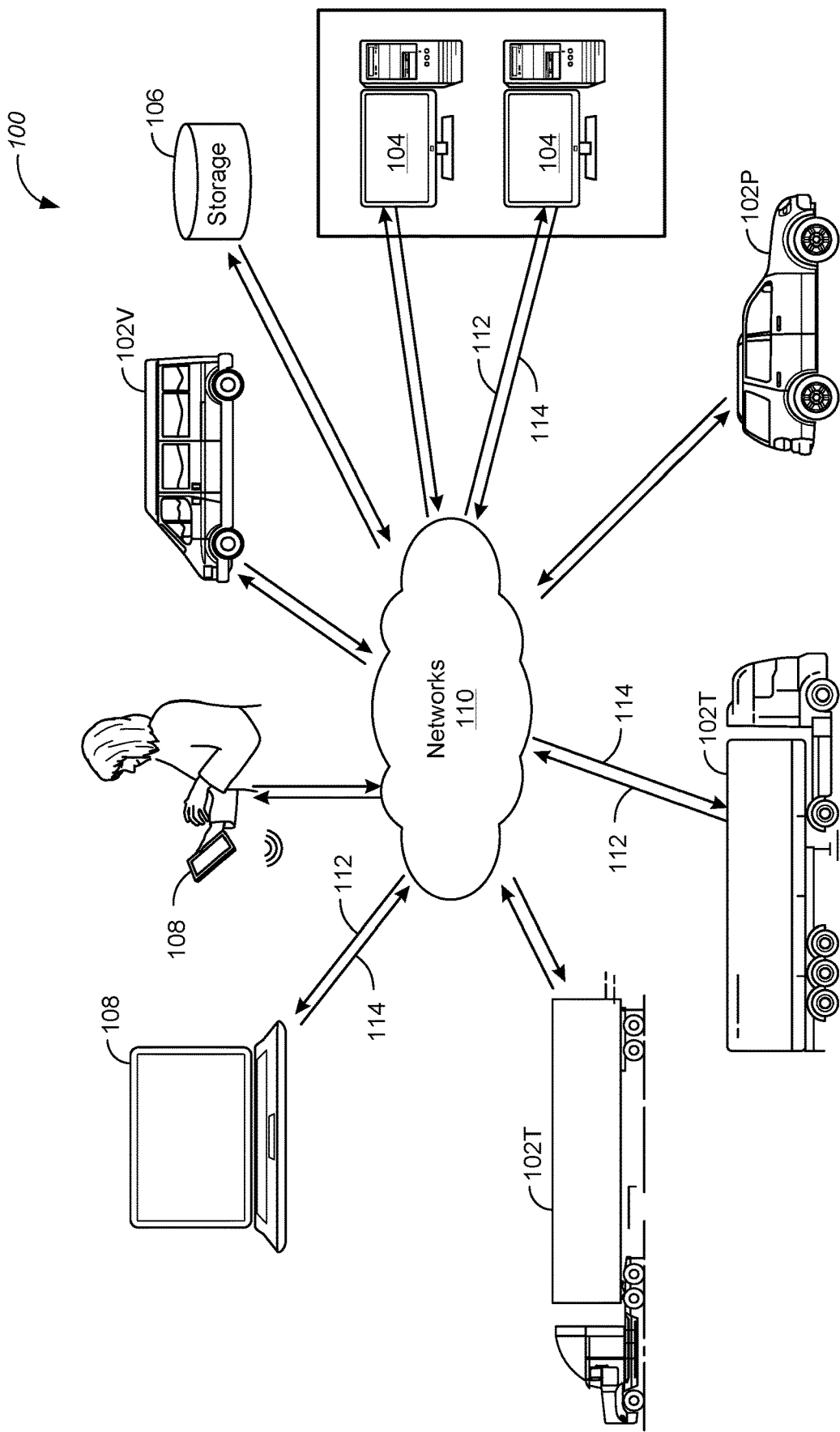
FIG. 1 is an example vehicle driving environment for a plurality of vehicles, in accordance with some embodiments.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g. level 2 additional assistance or level 5 full automation) for at least a period of time or during the entire operating time of the autonomous vehicle. Other classification systems can provide other levels of autonomy characterized by different vehicle capabilities.

In some embodiments, the vehicle 120 drives in the vehicle driving environment 100 at level 5. The vehicle 120 collects sensor data from the plurality of sensors, processes the sensor data to generate vehicle control instructions, and controls the vehicle control system to drive the vehicle autonomously in response to the vehicle control instructions. Alternatively, in some situations, the vehicle 120 drives in the vehicle driving environment 100 at level 0. The vehicle 120 collects the sensor data and processes the sensor data to provide feedback (e.g., a warning or an alert) to a driver of the vehicle 120 to allow the driver to drive the vehicle 120 manually and based on the driver's own judgement. Alternatively, in some situations, the vehicle 120 drives in the vehicle driving environment 100 partially autonomously at one of levels 1-4. The vehicle 120 collects the sensor data and processes the sensor data to generate a vehicle control instruction for a portion of the vehicle control system and/or provide feedback to a driver of the vehicle 120. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models, each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
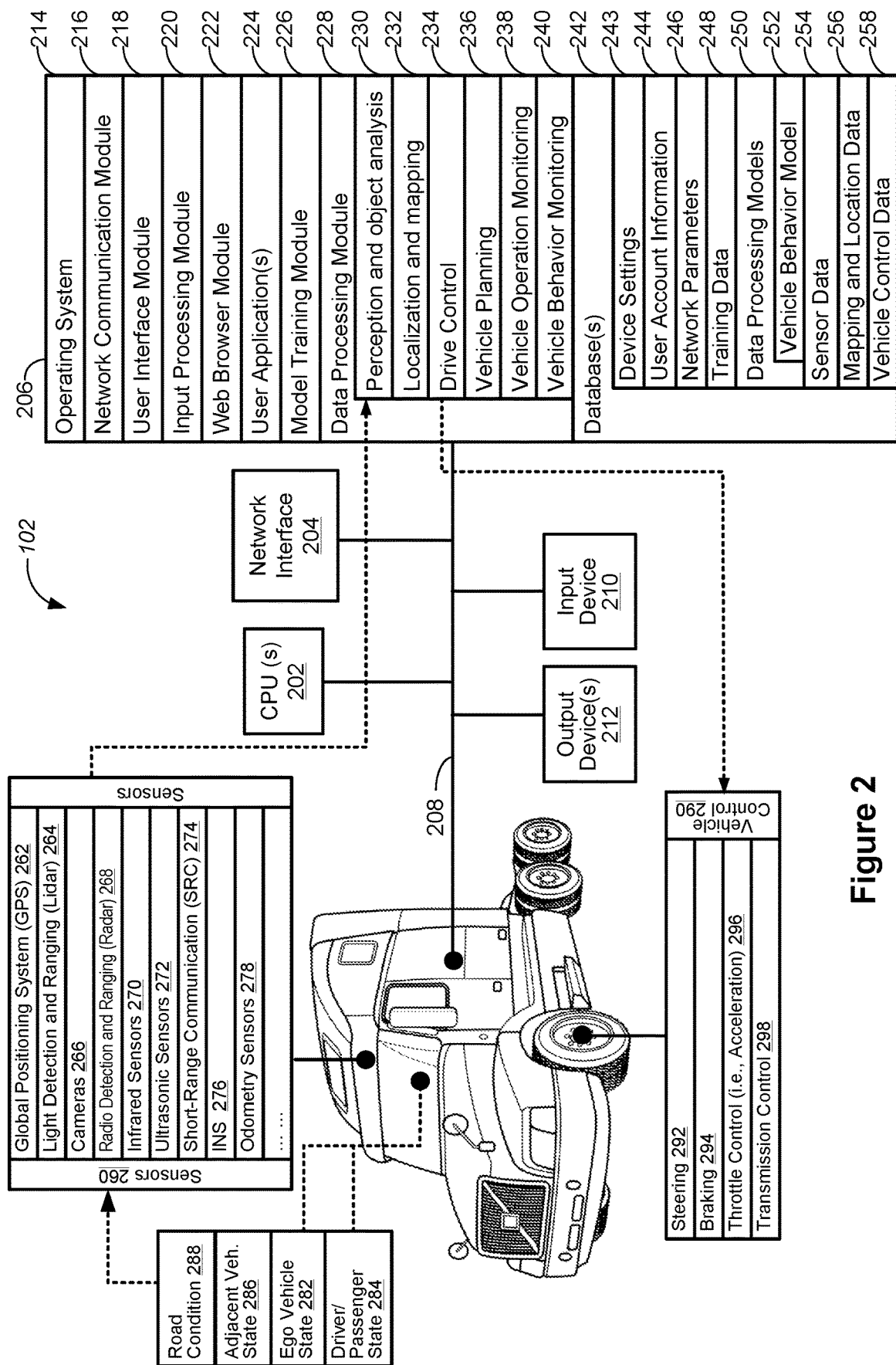
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, a DSRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The DSRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a vehicle data processing model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle driving behavior monitoring 240;
- a vehicle database 242, which stores vehicle data 112, including:
  - device settings 243, including common device settings (e.g., service tier, device model, storage capacity, processing capabilities, communication capabilities, and/or medical procedure settings) of the vehicle 102;
  - user account information 244 for the one or more user applications 224 (e.g., user names, security questions, account history data, user preferences, and predefined account settings);
  - network parameters 246 for the one or more communication networks 110, (e.g., IP address, subnet mask, default gateway, DNS server, and host name);
  - training data 248 for training the vehicle data processing model 250;
  - vehicle data processing models 250 for processing vehicle data 112. The vehicle data processing models 250 include a vehicle driving behavior model 252 applied to determine vehicle driving behaviors of the vehicle 102 and/or other adjacent vehicles 102;
  - sensor data 254 captured or measured by the plurality of sensors 260;
  - mapping and location data 256, which is determined from the sensor data 254 to map the vehicle driving environment 100 and locations of the vehicle 102 in the environment 100; and
  - vehicle control data 258, which is automatically generated by the vehicle 102 or manually input by the user via the vehicle control system 290 to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
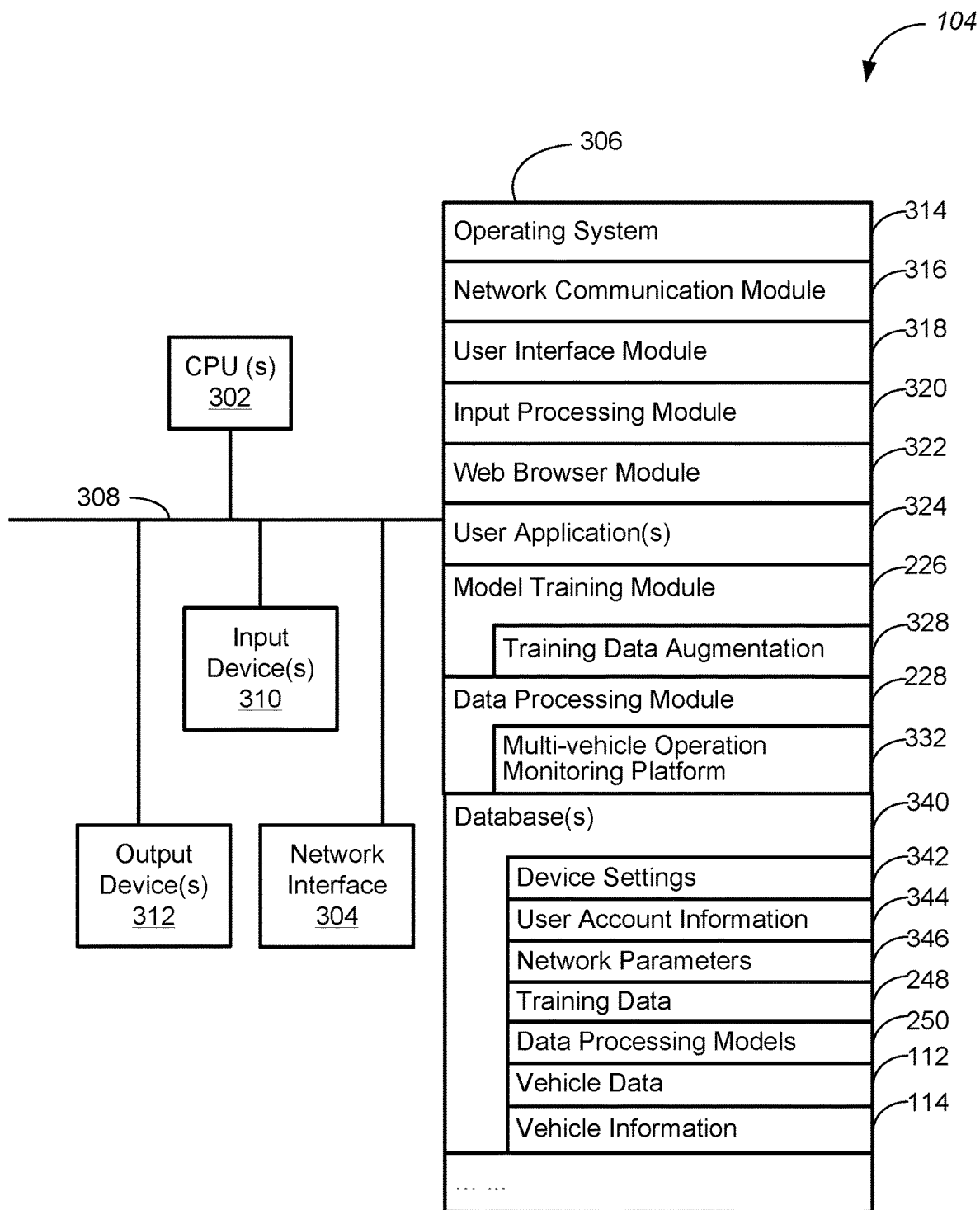
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a vehicle data processing model 250. The model 250 includes at least one neural network and is applied to process vehicle data (e.g., sensor data and vehicle control data) of one or more vehicles 102;

a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);

vehicle server data 340, including:

- device settings 342, which include common device settings (e.g., service tier, device model, storage capacity, processing capabilities, communication capabilities, and/or medical procedure settings) of the server 104;
- user account information 344 for the one or more user applications 324 (e.g., user names, security questions, account history data, user preferences, and predefined account settings);
- network parameters 346 for the one or more communication networks 110, (e.g., IP address, subnet mask, default gateway, DNS server, and host name);
- training data 248 for training the vehicle data processing model 250;
- vehicle data processing models 250 for processing vehicle data. The vehicle data processing models 250 include a vehicle driving behavior model 252 applied to determine vehicle driving behaviors of the vehicle 102 or other adjacent vehicles 102;
- vehicle data 112, which is collected from a plurality of vehicles 102 and includes sensor data 254, mapping and location data 256, and vehicle control data 258; and
- additional vehicle information 114, including vehicle operation information, fault information, and/or driving solution information, which are generated from the collected vehicle data 112.

In some embodiments, the model training module 226 includes a training data augmentation module 328 configured to synthesize training data based on a predefined dataset or collected sensor data of the vehicles 102. In some embodiments, the predefined dataset is used with the synthesized training data to train a vehicle data processing model 250. In some embodiments, the collected sensor data is used with the synthesized training data to train a vehicle data processing model 250. In some embodiments, the synthesized training data is used independently to train a vehicle data processing model 250. By these means, the training data can be augmented conveniently, allowing the vehicle data processing model 250 to be trained efficiently and offer a higher accuracy level.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
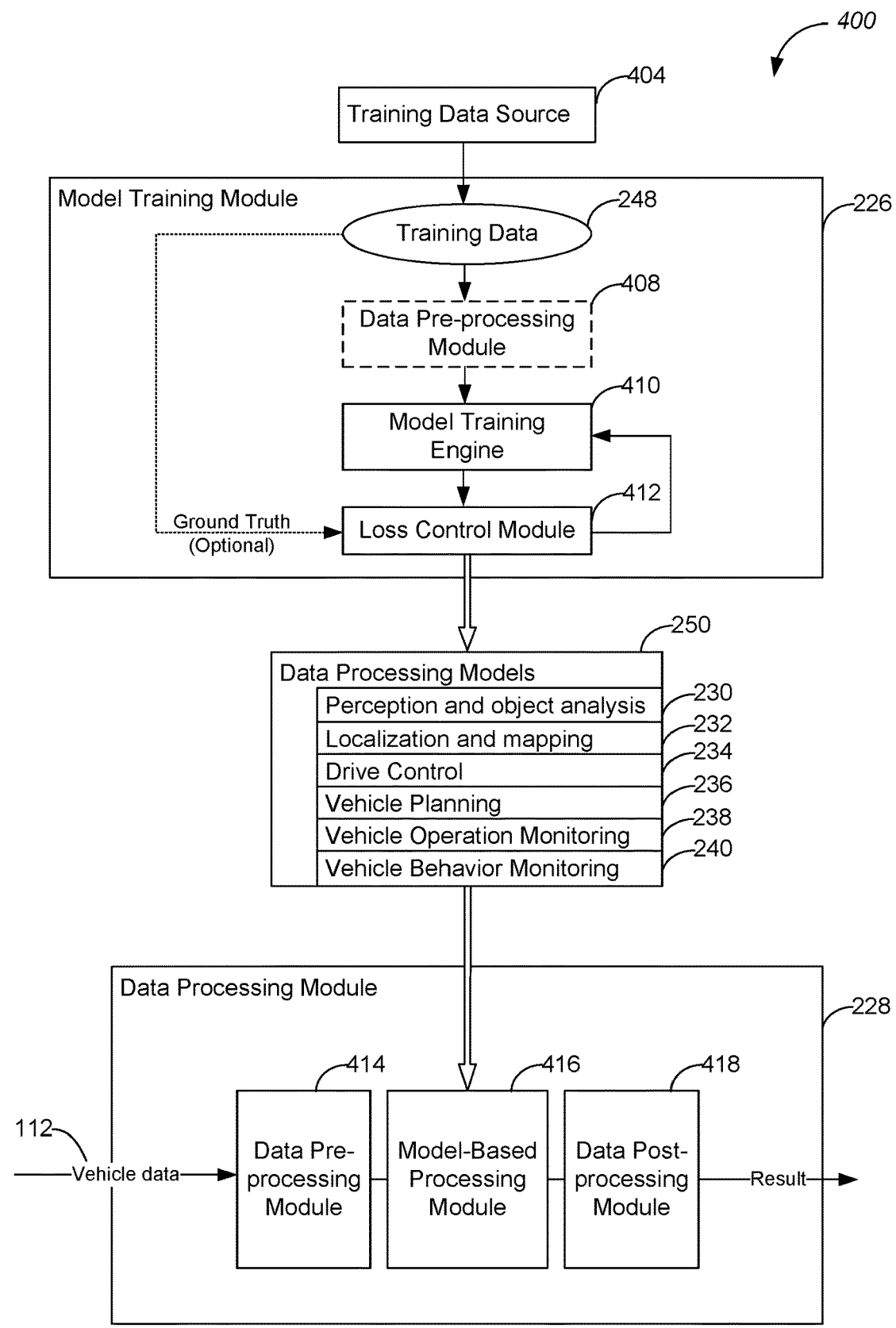
FIG. 4 is a block diagram of a machine learning system for training and applying vehicle data processing models for facilitating at least partial autonomous driving of a vehicle, in accordance with some embodiments.
Figure 5A:
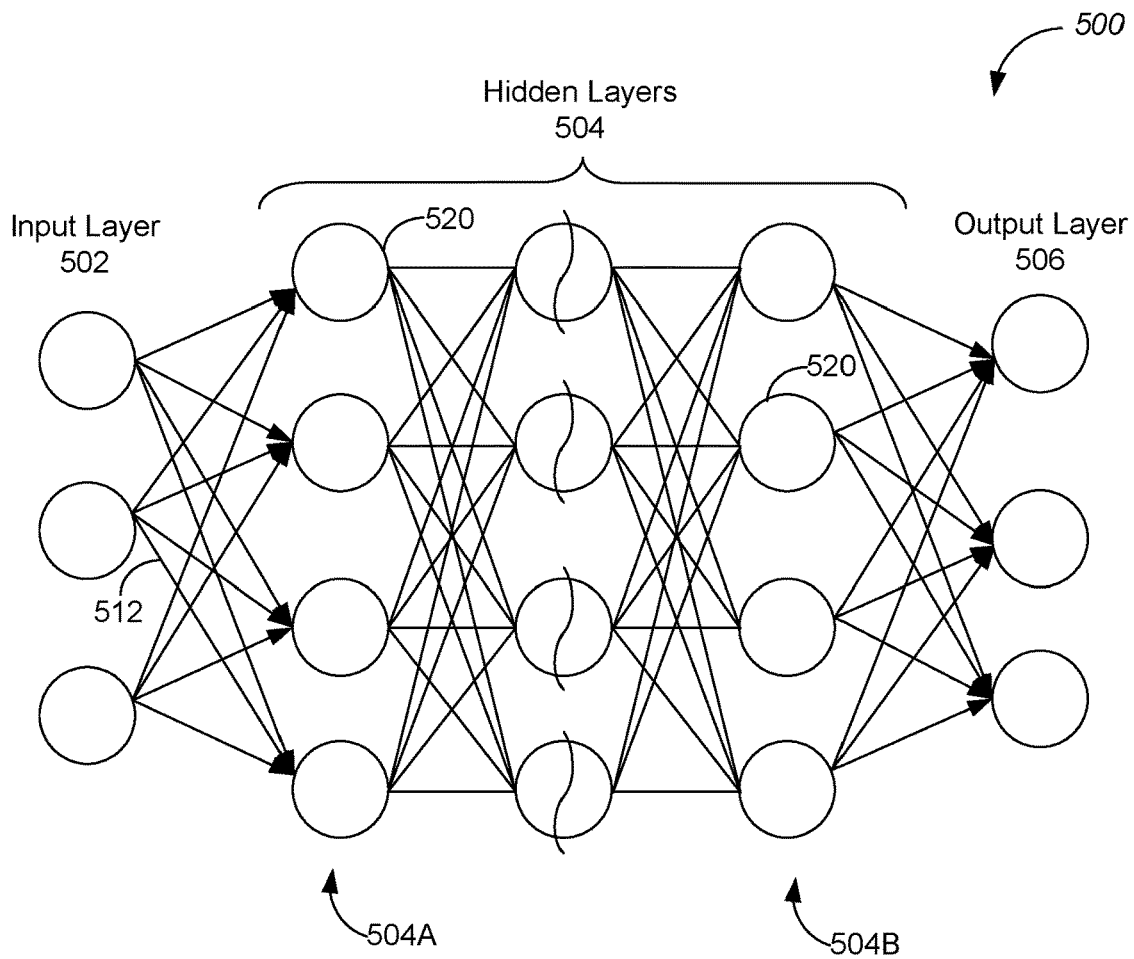
FIG. 5A is a structural diagram of an example neural network applied to process vehicle data in a vehicle data processing model, in accordance with some embodiments.
Figure 5B:
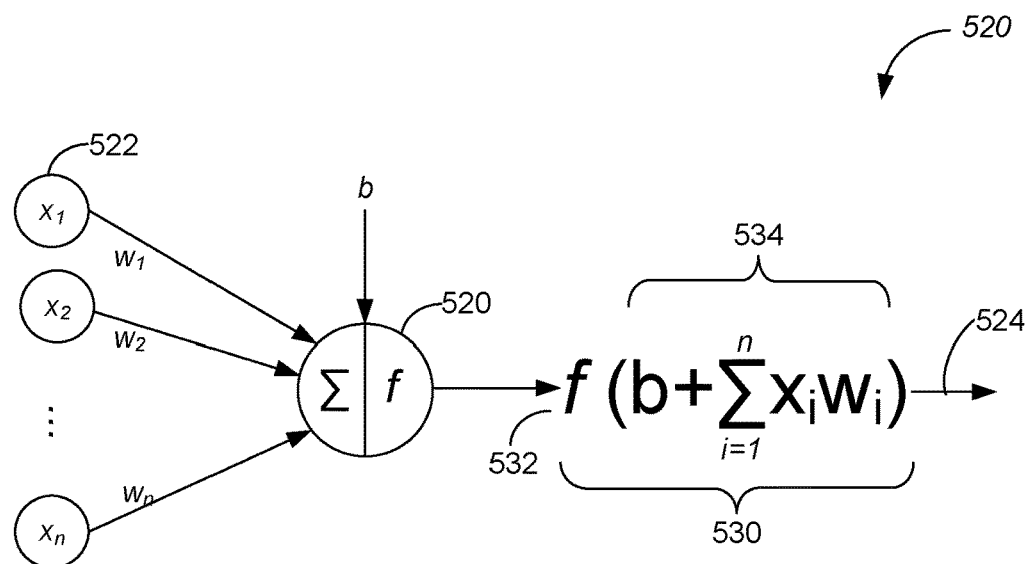
FIG. 5B is an example node in the neural network, in accordance with some embodiments.
Figure 6:
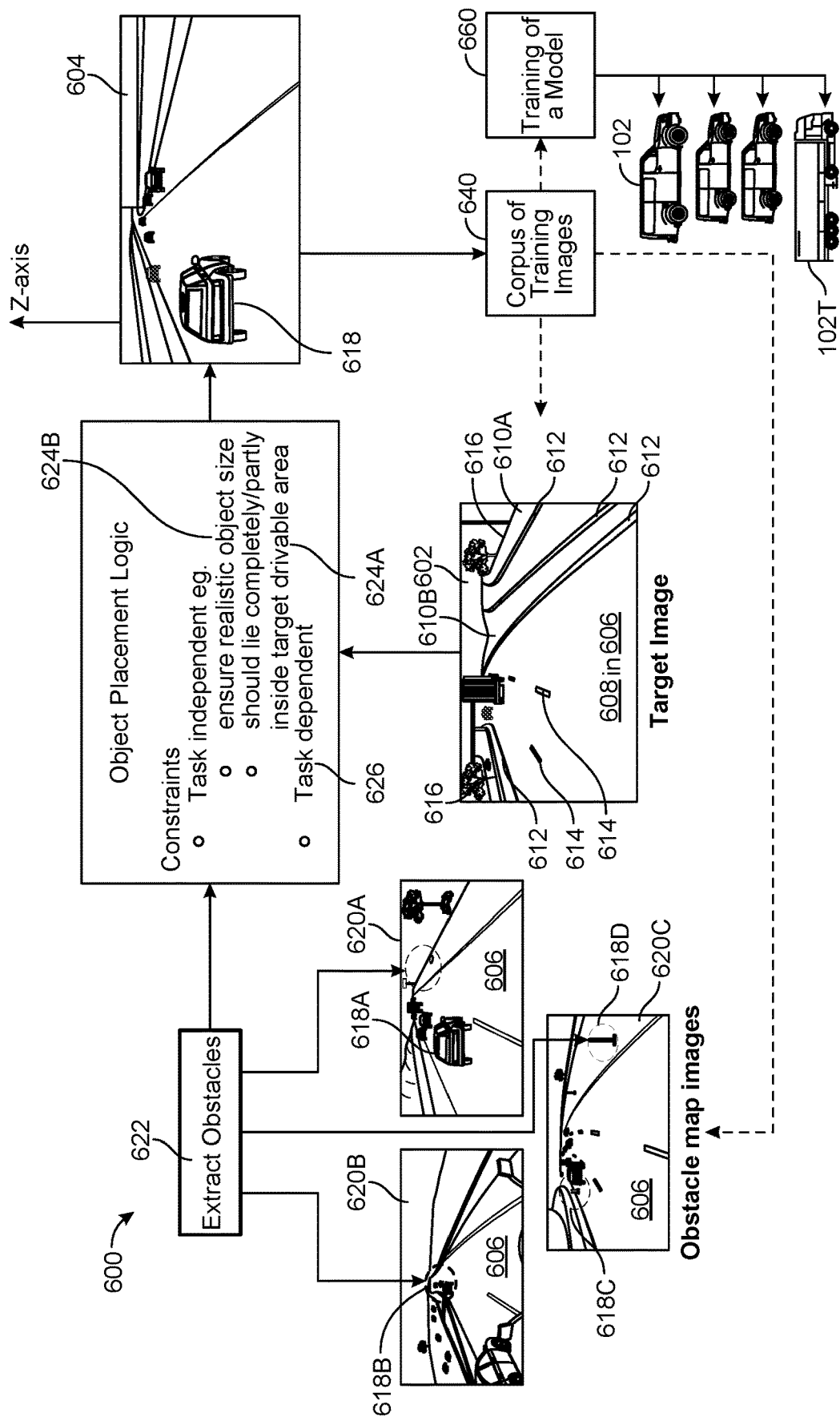
FIG. 6 is a flow diagram of an example process for augmenting training images by overlaying an image of an object on a drivable area of a road in an image, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying vehicle data processing models 250 for facilitating driving of a vehicle, in accordance with some embodiments. The machine learning system 400 includes a model training module 226 establishing one or more vehicle data processing models 250 and a data processing module 228 for processing vehicle data 112 using the vehicle data processing model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from a another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train vehicle data processing models 250. In some embodiments, the training data 248 includes vehicle data 112 and/or additional vehicle information 114, which is collected from one or more vehicles 102 that will apply the vehicle data processing models 250 or collected from distinct vehicles 102 that will not apply the vehicle data processing models 250. The vehicle data 112 further includes one or more of sensor data 254, road mapping and location data 256, and control data 258. Further, in some embodiments, a subset of the training data 248 is modified to augment the training data 248. The subset of modified training data is used in place of or jointly with the subset of training data 248 to train the vehicle data processing models 250.

In some embodiments, the model training module 226 includes a model training engine 410, and a loss control module 412. Each vehicle data processing model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle driving behavior monitoring 240. Specifically, the model training engine 410 receives the training data 248 corresponding to a vehicle data processing model 250 to be trained, and processes the training data to build the vehicle data processing model 250. In some embodiments, during this process, the loss control module 412 monitors a loss function comparing the output associated with the respective training data item to a ground truth of the respective training data item. In these embodiments, the model training engine 410 modifies the vehicle data processing models 250 to reduce the loss, until the loss function satisfies a loss criteria (e.g., a comparison result of the loss function is minimized or reduced below a loss threshold). The vehicle data processing models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a vehicle data processing model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained vehicle data processing model 250 provided by the model training module 226 to process the pre-processed vehicle data 112. In some embodiments, the model-based processing module 416 also monitors an error indicator to determine whether the vehicle data 112 has been properly processed in the vehicle data processing model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

FIG. 5A is a structural diagram of an example neural network 500 applied to process vehicle data in a vehicle data processing model 250, in accordance with some embodiments, and FIG. 5B is an example node 520 in the neural network 500, in accordance with some embodiments. It should be noted that this description is used as an example only, and other types or configurations may be used to implement the embodiments described herein. The vehicle data processing model 250 is established based on the neural network 500. A corresponding model-based processing module 416 applies the vehicle data processing model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a vehicle data processing model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the vehicle data processing model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same vehicle data processing model 250 to process the vehicle data jointly.

The training process is a process for calibrating all of the weights wi for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Drivable-area assisted Synthetic Image Patching

FIG. 6 is a flow diagram of an example process 600 for augmenting training images by overlaying an image of an object on a drivable area of a road in an image 602, in accordance with some embodiments. As explained above, a vehicle 102 has a plurality of sensors 260 including one or more cameras 266. When the vehicle 102 drives on a road, a camera 266 facing forward captures a sequence of images of the road. In some embodiments, the images of the road are processed to identify one or more road features on the road. For example, the system uses an object detection model to determine position, depth, or motion information of one or more road features in the images. Such position, depth, or motion information can be further applied to create a three-dimensional (3D) map of a scene where the vehicle 102 drives and to locate a position of a camera that captures a respective image in the scene. A corpus of training images 640 stores a plurality of training images applied to train models (e.g., the object detection model). The models are applied to process the images of the road and facilitate vehicle driving. In some embodiments, the corpus of training images 640 include a plurality of road images that were previously captured by vehicles 102. In some embodiments, the corpus training images include one or more images 604 augmented from existing road images, and the existing road images may or may not be included in the corpus training images.

The process 600 is implemented at a computer system (e.g., part of a vehicle 102 or a server 104). The computer system obtains a first image 602 of a road and identifies a drivable area 606 of the road within the first image 602. The drivable area 606 of the road is a portion of the road on which a vehicle 102 can drive. The drivable area 606 of the road is visible and not occluded by any vehicle 102 or other object on the first image 602. The drivable area 606 of the road includes a road area 608 and a shoulder area 610 (e.g., areas 610A and 610B). In some embodiments, the road area 608 is defined by solid edge markings 612. Further, in some embodiments, the road area 608 is divided to a plurality of drive lanes by one or more broken lane markings 614. In some embodiments, the drivable area 606 of the road has an edge overlapping a shoulder barrier structure 616, and a shoulder area 610A of the road is located between the shoulder barrier structure 616 and a solid edge marking 612. In an example, a shoulder area 610B of the road is located between two solid edge marking 612 (e.g., at a highway exit).

The computer system obtains an image of an object 618. In some embodiments, the object includes a vehicle 102, and an image of the vehicle 618A is extracted (622) from a drivable area 606 of a road in a first road image 620A. In some embodiments, the object includes a plurality of vehicles 102 located at different depths of a second road image 620B. An image of the plurality of vehicles 618B is extracted (622) from a drivable area 606 of a road in the second road image 620B. In some embodiments, the object includes one or more traffic safety objects (e.g., a barrel and a delineator). Two images of traffic safety objects 618C and 618D are extracted (622) from a drivable area 606 of a road in the third road image 620C. In some embodiments, each image of an object 618 corresponds to one or more rectangular bounding boxes in the corresponding road image 620 (e.g., in image 620A, 620B, or 620C). The road image 620 is cropped according to the one or more rectangular bounding boxes to generate the image of the object 618. Further, in some embodiments, a background portion of the image of the object 618 is made transparent, while a foreground portion of the image of the object 618 remains opaque, containing visual information concerning the object.

The computer system generates a second image 604 from the first image 602 by overlaying the image of the object 618 over the drivable area 606 (e.g., the road area 608 or the shoulder area 610) of the road in the first image 602. A first set of pixels corresponding to a bottom surface of the object are aligned on a z-axis with a second set of pixels corresponding to a second location of the drivable area 606 of the road in the first image 602, such that the first set of pixels of the image of the object 618 are placed immediately adjacent to or overlap the second set of pixels of the drivable area 606 in the first image 602. The object lies (624A) at least partially inside the drivable area 606 of the first image 602. In some situations, the object lies entirely within the drivable area 606, while in some situations, at least a portion of the object lies externally outside the drivable area 606 in the first image 602. In some embodiments, one or more of a size, the orientation, the aspect ratio, the brightness level, the contrast level, and the pixel resolution of the image of the object 618 are adjusted (624B) to ensure a realistic effect and fit into the first image 602. For example, an image of a vehicle 102 is rotated slightly to align a body of the vehicle 102 with adjacent lane markings 614 of the drivable area 606 in the first image. After the second image 604 is generated from the first image 602, the second image 604 is added to the corpus of training images 640 to be used by a machine learning system to generate a model for facilitating driving of a vehicle 102, e.g., at least partially autonomously.

In some embodiments, the road image 620 from which the image of the object 618 is extracted is distinct from the first image 602. Alternatively, in some embodiments, the road image 620 from which the image of the object 618 is extracted is the first image 602. The image of the object 618 is extracted from a first location of the drivable area 606 of the road in the first image 602 and added to a second location of the drivable area 606 of the road in the first image 602 to generate the second image 604. The second location is different from the first location. When the image of the object 618 is added to the second location, the image of the object 618 remains at the first location of the drivable area 606 of the road in the first image 602. In some embodiments, the second location is determined (626) based on a task of the model to be trained using the second image 604. In an example, the task of the model is to control an ego vehicle 102 to respond to an obstacle vehicle cutting into the same lane as the ego vehicle 102. The second location is substantially close to the camera 266 in a corresponding field of view and could be anywhere from an adjacent lane to the same lane of the ego vehicle 102. In another example, the task of the model is to control a truck 102T to respond to an obstacle vehicle 102 parked in the shoulder area 610, and the second location is in the shoulder area 610. Upon adding to the first image 602, the obstacle vehicle 102 has a distance from a solid road marking 612 or overlaps the solid edge marking 612 based on the task, so the distance is adjusted in accordance with a requirement of the task.

In some embodiments, the corpus of training images 640 further includes the first image 602 from which the second image 604 is generated, and both the first and second images 602 and 604 are applied to train a model 250 to facilitate vehicle driving. Alternatively, in some embodiments, the corpus of training images 640 does not include the first image 602 from which the second image 604 is generated. In some embodiments, the corpus of training images 640 further includes the road image 620 from which the image of the object 618 is generated, and both the second and road images 604 and 620 are applied to train the model for facilitating vehicle driving. Alternatively, in some embodiments, the corpus of training images 640 does not include the road image 620.

In some embodiments, the computer system uses machine learning to train (660) the model using the corpus of training images 640, including the second image 604, and distributes the model to one or more vehicles 102, including a first vehicle 102T. In use, the model is configured to process road images captured by the first vehicle 102T to facilitate driving the first vehicle (e.g., at least partially autonomously). In some situations, the first vehicle 102T uses the model to process the road image in real time (i.e., having a latency that is within a vehicle tolerance) as the road images are captured by the first vehicle 102T. After data augmentation, the corpus of training images 640 includes a large number of training images that are applied to train the model thoroughly, allowing the model to provide accurate real-time data that makes it possible to drive the first vehicle 102T safely and autonomously on road.

Figure 7A:
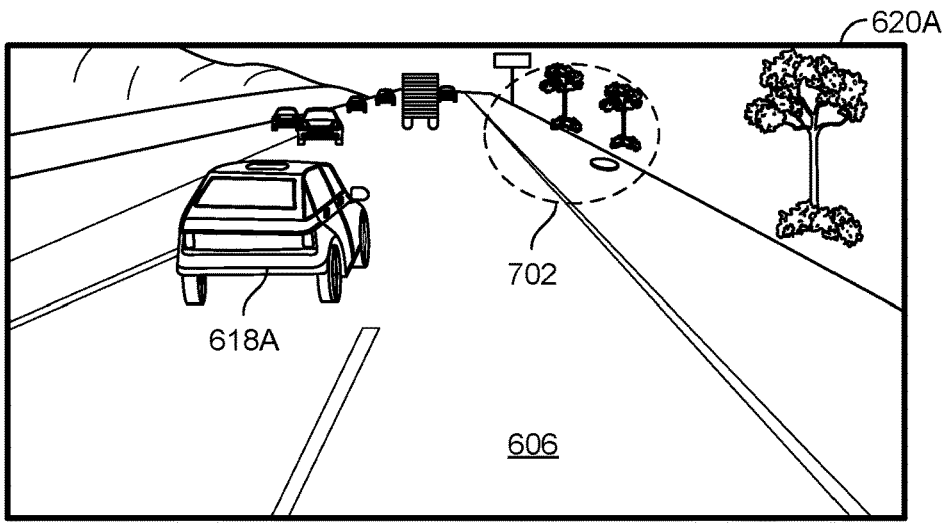
FIGS. 7A-7C are three images in which each drivable area is marked and images of objects are extracted, in accordance with some embodiments.
Figure 7B:
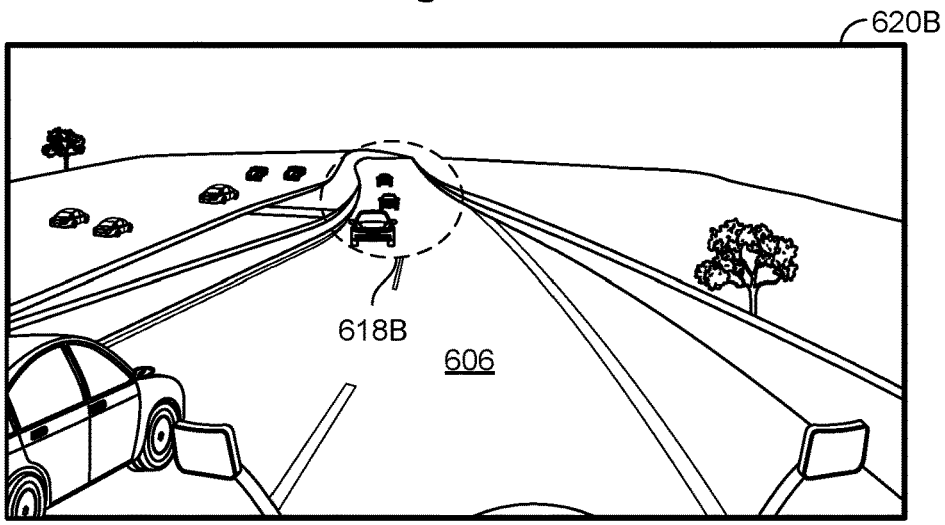
Figure 7C:
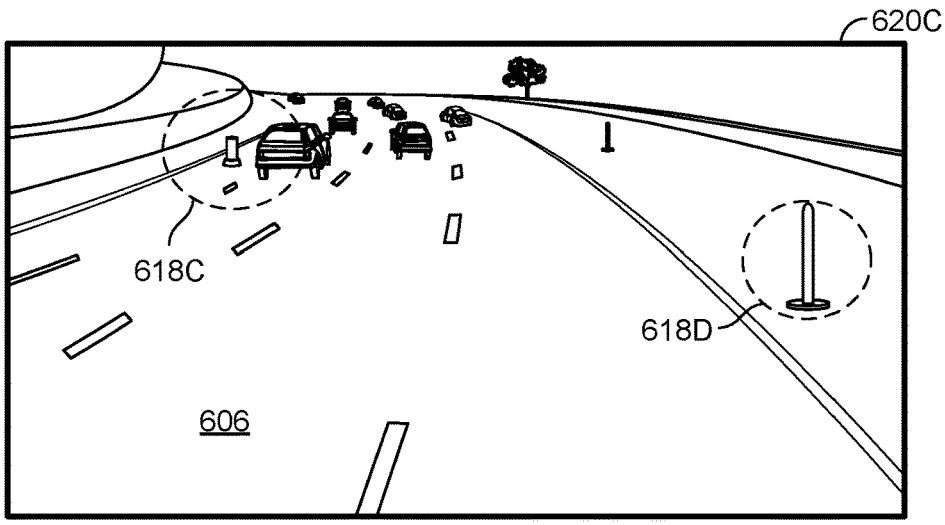

FIGS. 7A-7C are three images 620 in which a drivable area 606 is marked and images of objects 618 (e.g., objects 618A, 618B, 618C, and 618D) are extracted, in accordance with some embodiments. The image of the object 618 is extracted from a road image 620 (e.g., images 620A-620C). Referring to FIG. 7A, in some embodiments, the object includes a vehicle 102, and the image of the vehicle 618A is extracted from a drivable area 606 of a road in a first road image 620A. Alternatively, in some situations, the object includes one or more objects 702 existing on a shoulder area 610 of the road, and the image of one or more objects 702 is extracted from the drivable area 606 of the road in the first road image 620A. Referring to FIG. 7B, in some embodiments, the object includes a plurality of vehicles 102 located at different depths of a second road image 620B. A single image of the plurality of vehicles is extracted from a drivable area 606 of a road in the second road image 620B. The plurality of vehicles 618B is overlaid on a drivable area 606 of a road in a first image 602 using the single image of the vehicles 618B. Referring to FIG. 7C, in some embodiments, the object includes one or more traffic safety objects (e.g., a barrel and a delineator), and the image of the traffic safety object 618C or 618D is extracted from a drivable area 606 of a road in the third road image 620C.

In some embodiments, the image of the object 618 corresponds to one or more rectangular bounding boxes in the road image 620. The road image 620 is cropped according to the one or more rectangular bounding boxes to generate the image of the object 618. Further, in some embodiments, a background portion of the image of the object 618 is made transparent, while a foreground portion of the image of the object 618 remains opaque.

In some embodiments, a drivable area detection model is applied to identify a shoulder area 610 in the road image 620 and generate a segmentation mask identifying one or more vehicles 102 in the road image 620. In an example, the segmentation mask has the same resolution as the road image 620, and includes a plurality of elements, each of which indicates a class of a corresponding pixel of the road image 620. In another example, the segmentation mask has a lower resolution than the road image 620, and includes a plurality of elements, each of which indicates a class of a corresponding set of neighboring pixel of the road image 620. In some embodiments, the class is one of: a vehicle, a traffic sign, a drivable area, a shoulder area, or other road feature. Based on the segmentation mask, a plurality of regions of pixels in the road image 620 is classified as one or more vehicles 102, and an obstacle vehicle (e.g., the vehicle 618A in FIG. 7A) is selected from the one or more vehicles 102 identified by the segmentation mask as the object 618. In some situations, the obstacle vehicle (e.g., the vehicle 618A in FIG. 7A) is selected from the one or more vehicles 102 in the road image 620 for creating more training images, in accordance with a determination that the obstacle vehicle 102 is not occluded or truncated. The image of the object 618 is extracted based on a portion of the segmentation mask identifying the selected obstacle vehicle.

Figure 8A:
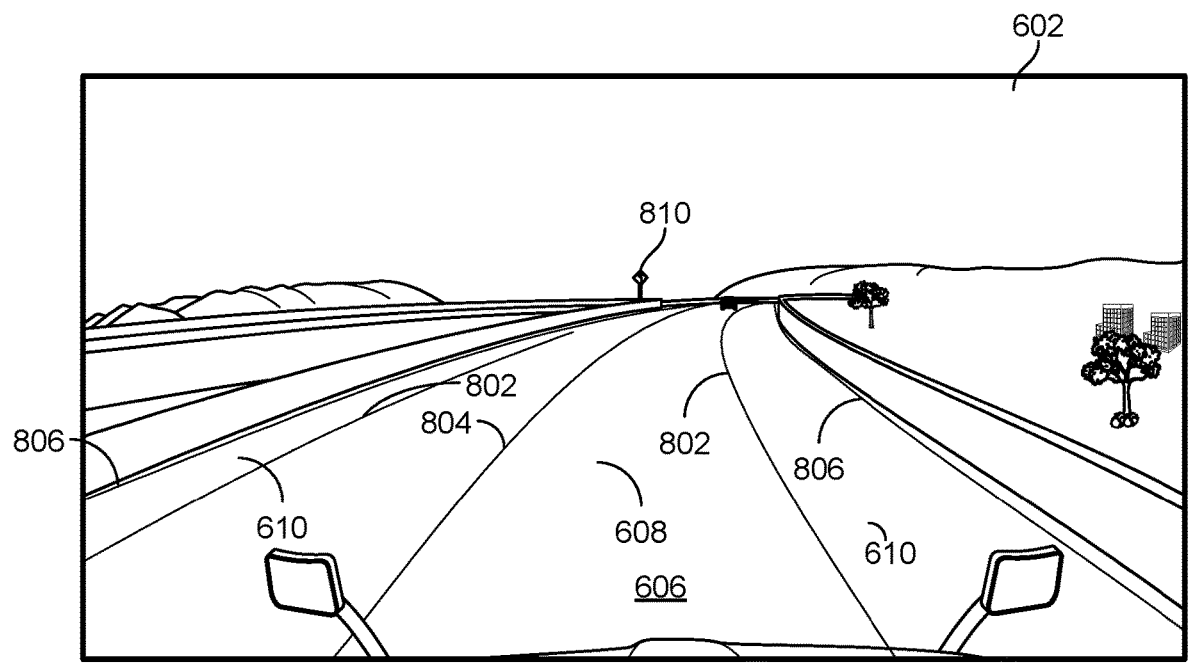
FIG. 8A is a first image having a drivable area of a road marked with a plurality of road markings, in accordance with some embodiments.
Figure 8B:
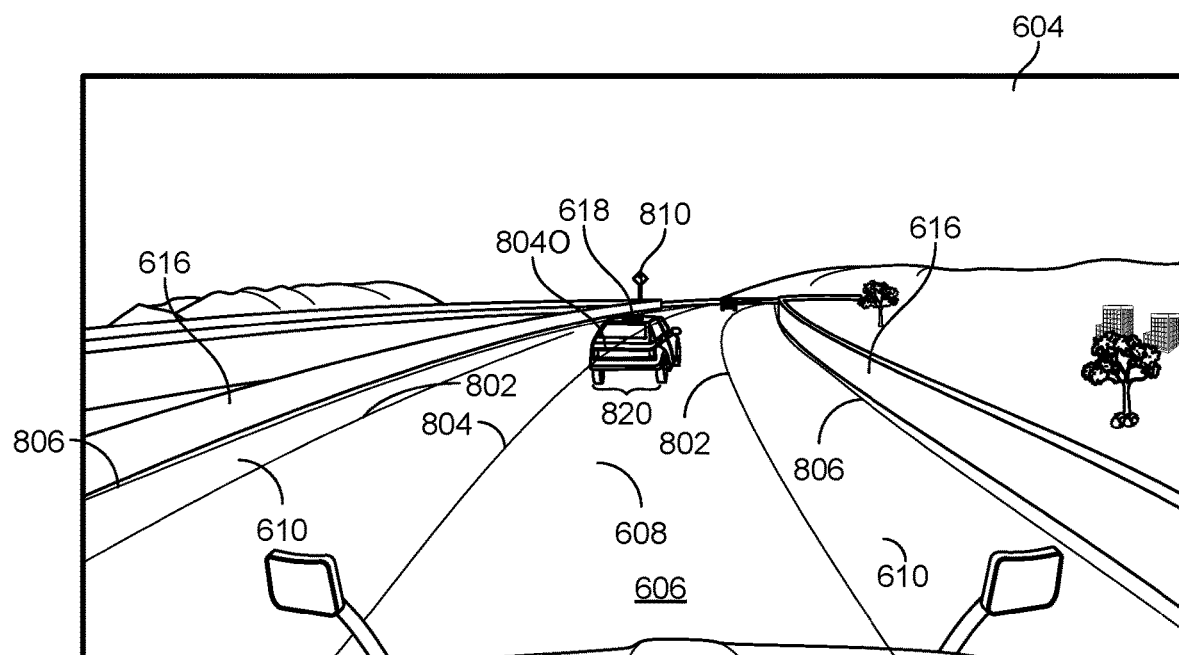
FIG. 8B is a second image that is generated from the first image, including an image of an obstacle vehicle, in accordance with some embodiments.

FIG. 8A is a first image 602 having a drivable area 606 of a road marked with a plurality of road markings, in accordance with some embodiments, and FIG. 8B is a second image 604 that is generated from the first image 602. The second image includes an image of an obstacle vehicle 618, in accordance with some embodiments. A computer system obtains the first image 602 of a road captured from the perspective of a camera 266 mounted on a vehicle 102 (e.g., an ego vehicle measuring the environment around itself via a plurality of sensors 260 including the camera 266). The drivable area 606 of the road is identified within the first image 602. The drivable area 606 of the road is the portion of the road on which a vehicle 102 can drive. The drivable area 606 of the road is visible and not occluded by any vehicle or object on the first image 602. The drivable area 606 of the road includes a road area 608 and a shoulder area 610. Referring to FIG. 6, in some embodiments, the road area 608 is defined by solid edge markings 612 and divided to a plurality of drive lanes by one or more broken lane markings 614. In many situations, both the solid edge markings and broken lane markings are painted on the road. In some embodiments, the drivable area 606 of the road is bound by an edge overlapping a shoulder barrier structure 616, and the shoulder area 610 of the road is located between the shoulder barrier structure 616 and a solid edge marking 612 or between two solid edge marking 612.

In some embodiments, a drivable area detection model is applied to identify the drivable area 606 of the road (including a shoulder area 610) in the first image 602 and to generate a segmentation mask identifying the drivable area 606 or one or more road features in the first image 602. The segmentation mask includes a plurality of elements, each of which indicates the class of one or more pixels of the first image 602. In some embodiments, the class is one of: a vehicle 102, a traffic sign 810, a drivable area 606, a road area 608, a shoulder area 610, an edge marking 612, a lane marking 614, a shoulder barrier structure 616, or another road feature.

In some embodiments, each solid edge marking 612, broken lane marking 614, or shoulder barrier structure 616 is recognized, and associated with a respective edge line 802, lane line 804, and shoulder line 806, respectively. The drivable area 606 of the road is bound by two edge lines 802 in the first and second images 602 and 604. Each of the edge line 802, the lane line 804, and the shoulder line 806 is associated with a set of pixels of the first image 602 that is marked with the respective line 802, 804, or 806. The pixel locations of the edge lines 802, lane lines 804, and shoulder lines 806 form the first ground truth associated with the first image 602. The image of the object 618 (e.g., an image of a vehicle 102) is added at a second location 820 of the drivable area 606 of the road in the first image 602 to generate the second image 604 in FIG. 8B. In some embodiments, the size of the image of the object 618 is maintained while it is overlaid at the second location 820 of the drivable area 606. Alternatively, in some embodiments, a size of the image of the object 618 is scaled while it is overlaid at the second location 820 of the drivable area 606

In some embodiments, after the image of the object 618 is added, the first ground truth associated with the first image 602 is updated to generate second ground truth associated with the second image 604. The second ground truth includes the second location 820 of the drivable area 606 of the road where the image of the object 618 is added. During training, the computer system trains, by the machine learning system, a model (e.g., a vehicle detection model) using the second image 604 and second ground truth in a supervised manner.

In some embodiments, the second ground truth further includes the first ground truth, specifying locations of one or more road features in the second image 604. The one or more road features include one or more solid edge markings 612, broken lane markings 614, shoulder barrier structures 616, traffic lights, traffic signs 810, and/or traffic safety objects (e.g., a cone, a delineator, a barrel, a flasher, or a reflector). For example, in some situations, a traffic sign is held by a construction worker and shows "SLOW" or "STOP" as chosen by the construction worker. The first ground truth includes a label associated with the traffic sign captured in the first image 602.

Referring to FIGS. 8A and 8B, the image of the object 618 occludes a portion of the lane line 8040. The second ground truth associated with the second image 604 includes the occluded portion of the lane line 8040, independently of occlusion of the portion of the lane line 804. During training, the computer system trains the model to interpolate an occluded portion of a corresponding broken lane marking 614 with reference to the second ground truth, including the occluded portion 8040 of the lane line. Specifically, in some embodiments, the computer system detects an occluded portion 8040 of the lane line in the second image 604 using the model and compares the detected portion 8040 of the lane line with the second ground truth. Weights of neural networks of the model are adjusted to match the detected portion 8040 of the lane line with the second ground truth. By these means, the model is trained to recognize or interpolate the occluded portion 8040 of the lane line accurately, allowing the vehicle 102 to be controlled to drive on a drive lane safely.

In some embodiments, the drivable area detection model is applied to recognize the drivable area 606 of the road, a road area 608, and a shoulder area 610. Further, in some embodiments, the drivable area detection model is applied to identify one or more of solid edge markings 612, broken lane markings 614, and shoulder barrier structures 616 and apply them to define the drivable area 606, road area 608, and shoulder area 610 of the road. The lines outputted by the drivable area detection model include an edge line 802, lane line 804, and shoulder line 806 representing the solid edge marking 612, broken lane marking 614, and shoulder barrier structure 616, respectively. Space between the edge line 802 and lane line 804 corresponds to a rightmost or leftmost drive lane. Space between two edge lines 802 corresponds to a single lane road or a shoulder area 610. Space between two lane lines 804 corresponds to an intermediate lane. Space between the edge line 802 and shoulder line 806 corresponds to the shoulder area 610 of the road.

The edge line 802, lane line 804, and shoulder line 806 are distinct from each other. In some embodiments, each of the edge line 802, lane line 804, and shoulder line 806 corresponds to a respective distinct line color (e.g., red, green, and blue). Alternatively, in some embodiments, each of the edge line 802, lane line 804, and shoulder line 806 corresponds to a respective distinct line style (e.g., solid, dashed, dotted). Alternatively, in some embodiments, each of the edge line 802, lane line 804, and shoulder line 806 corresponds to a respective distinct line thickness. Alternatively, in some embodiments, every two of the edge line 802, lane line 804, and shoulder line 806 are distinct in at least one of line color, style and thickness. Further, in some embodiments, an occluded line portion 902 is represented with a distinct line color, style or thickness from the edge line 802, lane line 804, and shoulder line 806.

Figure 9A:
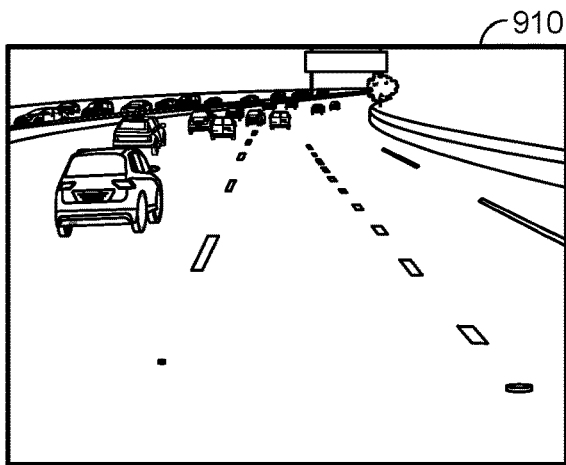
FIG. 9A is an image having a plurality of vehicles on a drivable area of a road, in accordance with some embodiments.
Figure 9D:
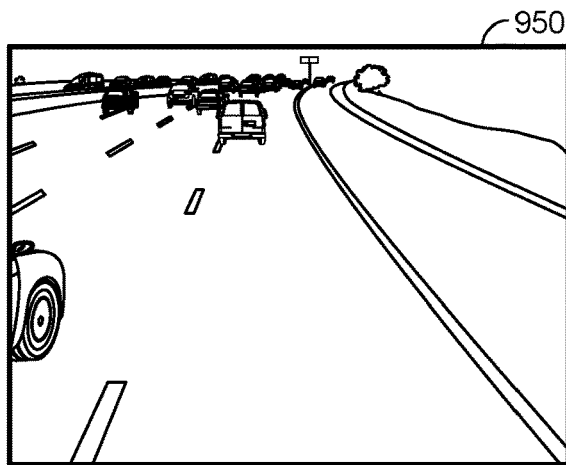
FIG. 9D is an image having a plurality of vehicles on a drivable area, in accordance with some embodiments.
Figure 9B:
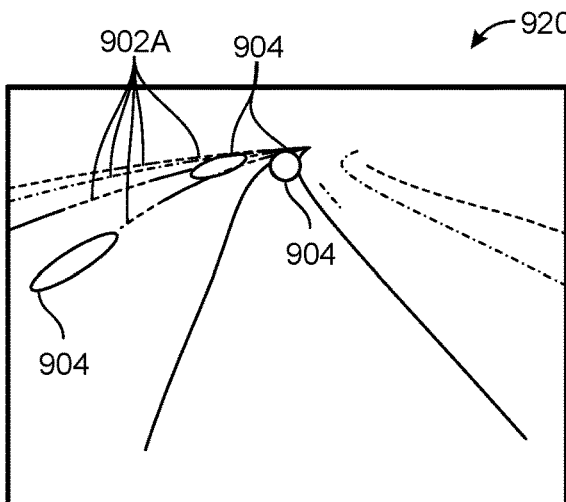
FIG. 9B is a diagram of result lines recognized from the image using a drivable area detection model that is trained without synthetic patching.
Figure 9E:
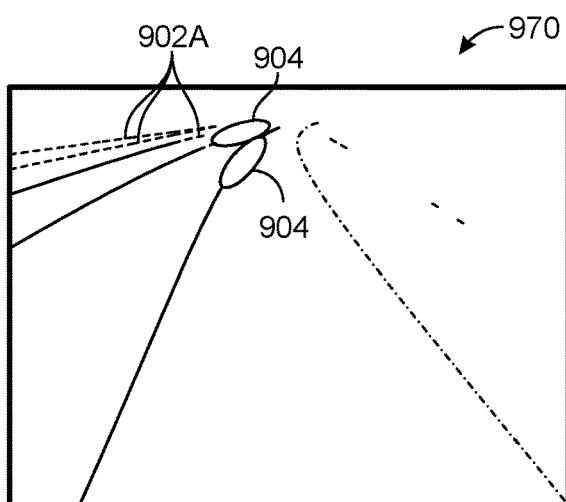
FIG. 9E is a diagram of result lines recognized from the image using a drivable area detection model that is trained without synthetic patching.
Figure 9C:
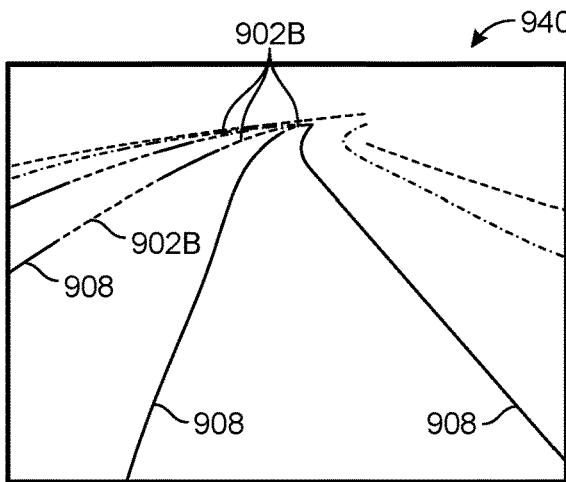
FIG. 9C is a diagram of result lines recognized from the image using a drivable area detection model that is trained with synthetic patching, in accordance with some embodiments.
Figure 9F:
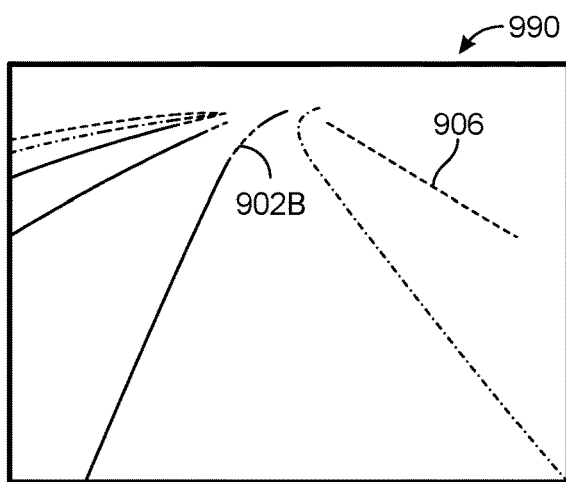
FIG. 9F is a diagram of result lines recognized from the image using a drivable area detection model that is trained with synthetic patching, in accordance with some embodiments.

FIG. 9A is a first image 910 having a plurality of vehicles 102 on a drivable area 606 of a road, in accordance with some embodiments. FIG. 9B is a first diagram 920 of result lines recognized from the first image 910 using a drivable area detection model that is trained without synthetic patching, and FIG. 9C is a second diagram 940 of result lines recognized from the first image 910 using a drivable area detection model that is trained with synthetic patching (i.e., with a second image 604 that is augmented from a first image 602), in accordance with some embodiments. FIG. 9D is a second image 950 having a plurality of vehicles 102 on a drivable area 606, in accordance with some embodiments. FIG. 9E is a third diagram 970 of result lines recognized from the second image 950 using a drivable area detection model that is trained without synthetic patching, and FIG. 9F is a fourth diagram 990 of result lines recognized from the second image 950 using a drivable area detection model that is trained with synthetic patching (i.e., with a second image 604 that is augmented from a first image 602), in accordance with some embodiments.

Referring to FIGS. 9B and 9E, a plurality of first line portions 902A are occluded by vehicles 102 and recognized by machine learning using the drivable area detection model. The drivable area detection model applied to generate the lines does not involve synthetic patching. That is, the model was not trained with images 604 augmented by adding images of objects 618 on drivable areas 606 of roads in images 602. A plurality of portions 904 of the drivable area 606 of the road are occluded by vehicles 102. The drivable area detection model fails to identify an edge line 802, a lane line 804, or a shoulder line 806 in each of the plurality of portions 904 of the drivable area 606. Referring to FIGS. 9C and 9F, a drivable area detection model applied to generate the lines is trained using images involving synthetic patching, (i.e., using images 604 augmented by adding images of objects 618 on drivable areas 606 of roads in images 602). While the plurality of portions 904 of the drivable area 606 of the road are occluded by vehicles 102, the drivable area detection model identifies one or more second line portions 902B of the edge line 802, the lane line 804, or the shoulder line 806 in each of the plurality of portions 904 of the drivable area 606. Additionally, a shoulder line 906 and a plurality of third line portions 908 are missing from FIGS. 9B and 9E, and can be identified using the drivable area detection model that is trained with images involving synthetic patching.

Figure 10A:
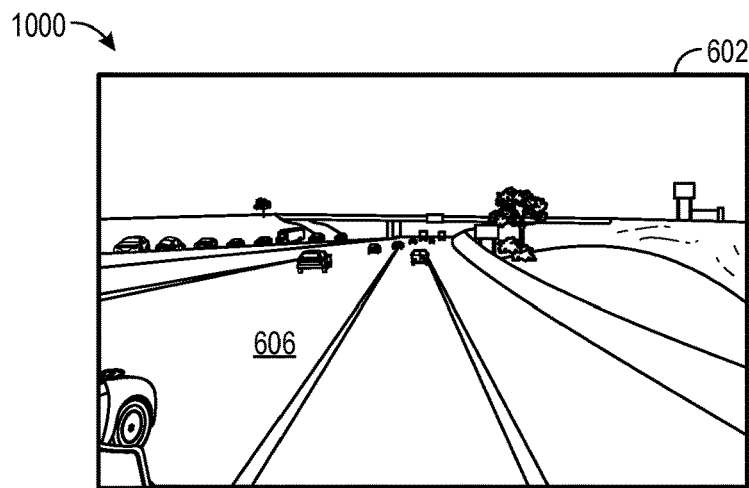
FIGS. 10A-10C are three images showing a process for adding one or more images of vehicles to a shoulder area of a road in a first image, in accordance with some embodiments.
Figure 10B:
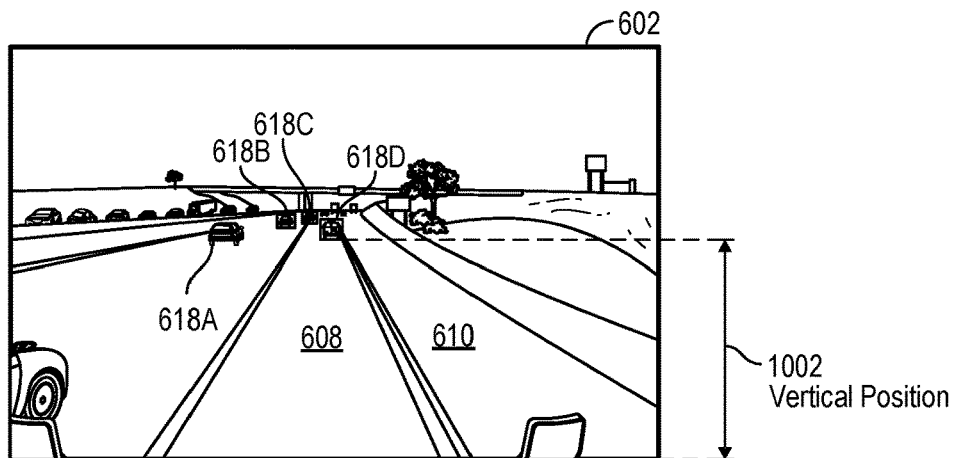
Figure 10C:
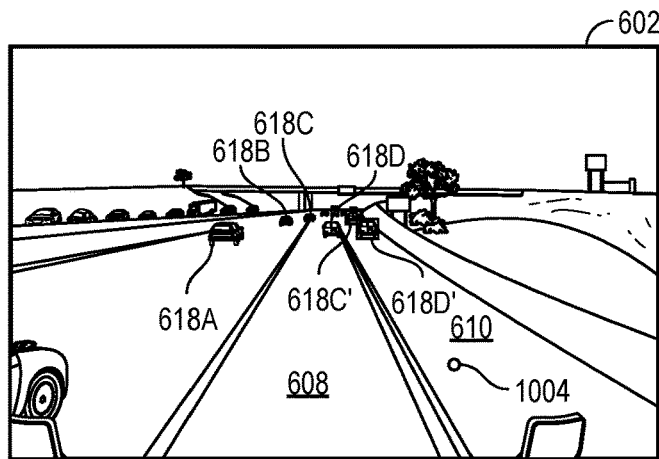

FIGS. 10A-10C are three images showing a process 1000 for adding one or more images of vehicles 618 to a shoulder area 610 of a road in a first image 602, in accordance with some embodiments. The one or more images of vehicles 618 are extracted from the same first image 602 and added to the shoulder area 610 of the road in the first image 602 to generate a second image 604. A drivable area 606 of the road is identified in the first image 602 and includes the shoulder area 610. In some embodiments, a drivable area detection model is applied to identify the drivable area 606 of the road (including the shoulder area 610) in the first image 602 and generate a segmentation mask identifying the drivable area 606 or one or more road features in the first image 602. The segmentation mask includes a plurality of elements, each of which indicates a class of one or more pixels of the first image 602. For the one or more pixels of the first image 602, the class is one of: a vehicle 102, a drivable area 606, a road area 608, a shoulder area 610, an edge marking 612, a lane marking 614, a shoulder barrier structure 616, or other road feature.

Sets of one or more pixels having the same class are adjacent to each other, and combined to form a region, which is identified to be associated with a corresponding road feature of the class. For example, four images of vehicles 618A-618D are identified on the drivable area 606 of the road in the first image 602. Each of the images of vehicles 618A-618D drives on a respective drive lane of the drivable area 606. Each vehicle image 618 has a respective depth measured from a camera 266 that captures the first image 602, and is shown with a respective size on the first image 602.

Two of the four images of vehicles 618A-618D are selected and added to the shoulder area 610. Referring to FIGS. 10C, a vehicle image 618C' is copied from the vehicle image 618C located at a first location of the drivable area 606 and added to a second location of the drivable area 606 corresponding to the shoulder area 610. The first and second locations corresponding to the vehicle images 618C and 618C' have the same depths measured from the camera 266 that captures the first image 602, and the images of vehicle 618C and 618C' have the same size. The vehicle image 618C' is added to the second location of the drivable area 606 in the first image 602 while the vehicle image 618C remains at the first location. Similarly, a vehicle image 618D' is copied from the vehicle image 618D and added to the drivable area 606 corresponding to the shoulder area 610. Locations corresponding to the vehicle images 618D and 618D' have the same depths measured from the camera 266, and the images of vehicle 618D and 618D' have the same size. The vehicle image 618D' is added to the drivable area 606 in the first image 602 while the vehicle image 618D remains at its location. In some embodiments, the first image 602 is captured by a camera 266 facing forward to a driving direction of an ego vehicle 102, and a depth of a vehicle is approximately measured by a vertical position 1002 on the first image 602.

In some embodiments not shown in FIGS. 10A-10C, the computer system determines a first depth of field corresponding to the first location of the vehicle image 618C and a second depth of field corresponding to the second location of the vehicle image 618C'. The size of the vehicle image 618C is scaled based on the ratio of the first and second depths of field to generate the vehicle image 618C'. Alternatively, in some embodiments, the computer system determines vertical positions 1002 corresponding to the first location of the vehicle image 618C and the second location of the vehicle image 618C', and the size of the vehicle image 618C is scaled based on a ratio of the vertical positions 1002 to generate the vehicle image 618C'. The vehicle image 618C' having the scaled size is overlaid at the second location of the drivable area 606, e.g., at a location 1004 on the shoulder area 610. In some embodiments, at least one of the orientation, the aspect ratio, the brightness level, the contrast level, or the pixel resolution of the vehicle image 618C is adjusted to generate the vehicle image 618C' that is added to the first image 602.

Figure 11A:
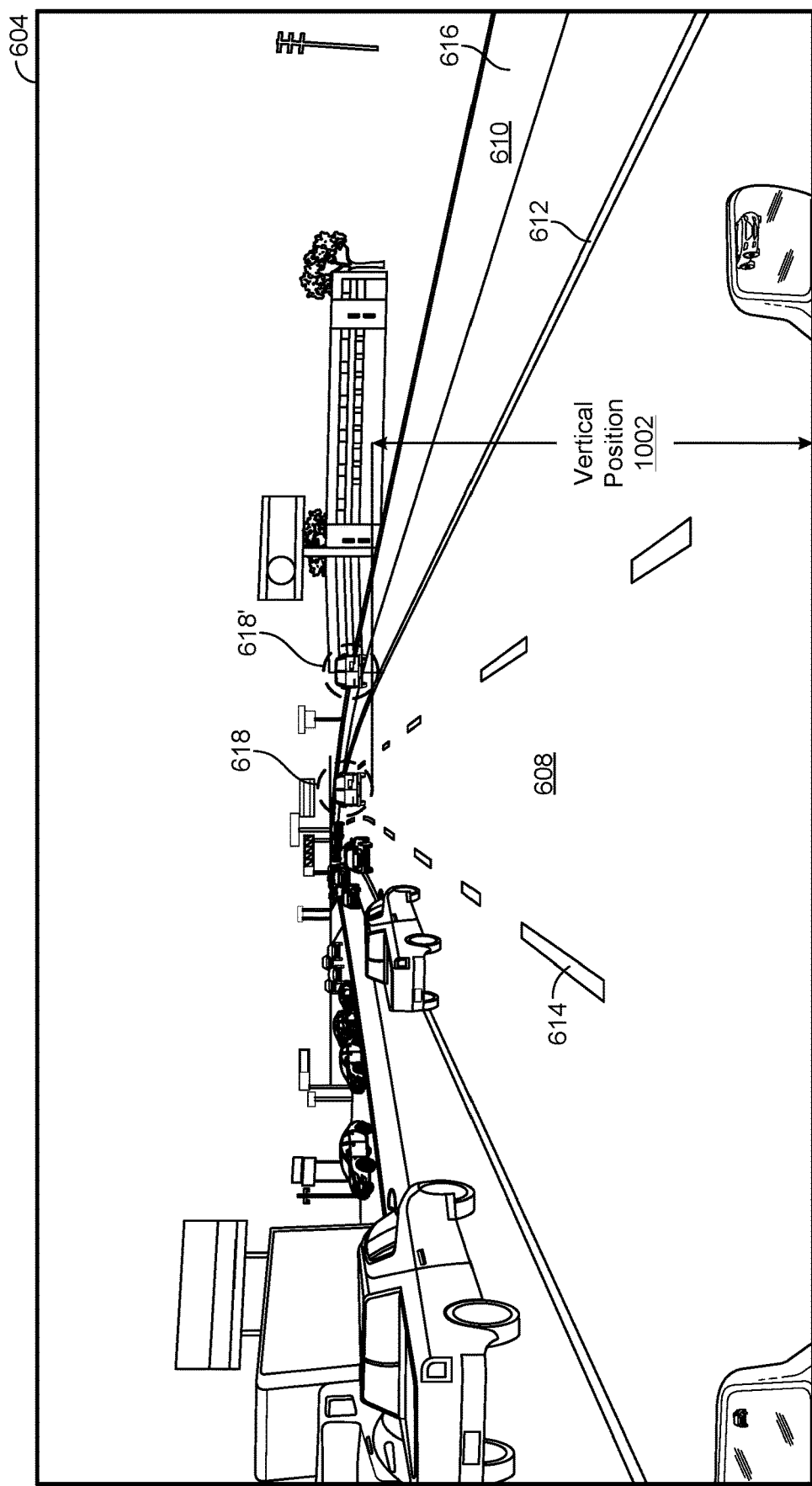
FIG. 11A is an example image showing that a vehicle image located on a road area is copied and added to a shoulder area, in accordance with some embodiments.
Figure 11B:
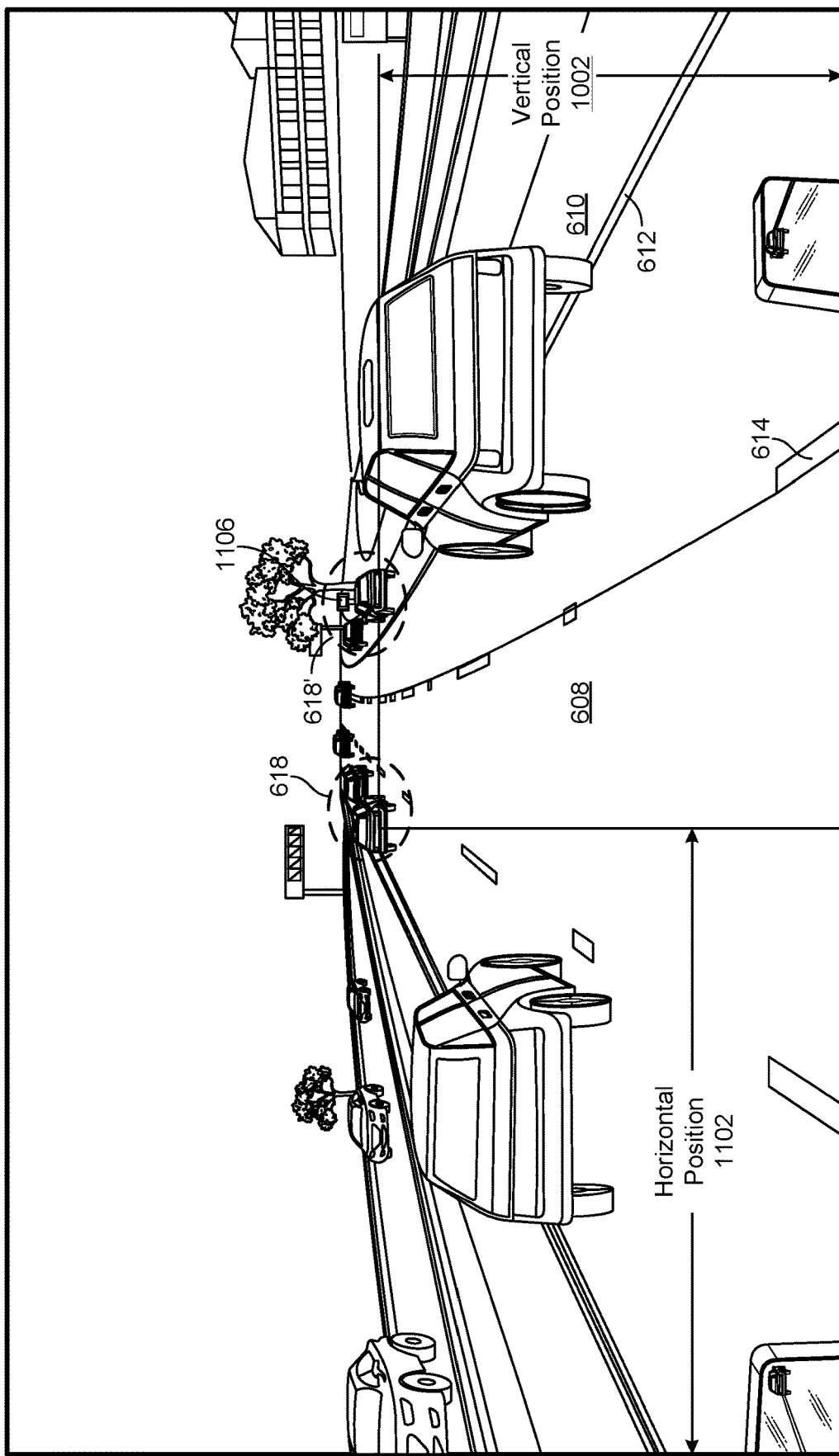
FIG. 11B is another example image 604 showing that one or more images of vehicles located on a road area are copied and added to a shoulder area, in accordance with some embodiments.

FIG. 11A is an example image 604 showing that a vehicle image 618 located on a road area 608 is copied and added to a shoulder area 610, in accordance with some embodiments, and FIG. 11B is another example image 604 showing that one or more images of a vehicle 618 located on a road area 608 are copied and added to the shoulder area 610, in accordance with some embodiments. In accordance with the process 1000 as described above with reference to FIGS. 10A-10C, the vehicle image 618 is identified in a first image 602, copied or modified to a vehicle image 618', and added to the shoulder area 610 of a road in the first image 602 to generate a second image 604. Specifically, a deep learning model (e.g., a drivable area detection model) is applied to identify a drivable area 606 of the road (including a road area 608 and the shoulder area 610) and one or more road features (e.g., a vehicle 102) in the first image 602. The shoulder area 610 is defined between a shoulder barrier structure 616 and a solid edge marking 612. In some embodiments, a plurality of adjacent vehicle pixels are identified as belonging to a class of vehicle by the deep learning model, and thereby grouped to form a corresponding vehicle image 618. In some embodiments, the vehicle image 618 has a rectangular shape and a background of the vehicle 102 is transparent in the vehicle image 618. The vehicle image 618 is copied to another vehicle image 618'. In some embodiments, the size of the vehicle image 618' is adjusted based on a first depth of a first location of the drivable area 606 where the vehicle image 618 is extracted and a second depth of a second location of the drivable area 606 where the vehicle image 618' will be added. In some embodiments, one or more of the orientation, the aspect ratio, the brightness level, the contrast level, and the pixel resolution of the vehicle image 618 are adjusted to generate the vehicle image 618' to match image characteristics at the second location of the drivable area 606. The vehicle image 618' is added to the second location of the drivable area 606 (e.g., to the shoulder area 610).

Referring to FIG. 11A, the vehicle image 618 includes a single vehicle, and is added to the shoulder area 610 of the road in the first image 602. Referring to FIG. 11B, an image of two vehicles 618 is separately extracted as two vehicles from a road area 608 of the road in the first image 602. Each of the two vehicle images is extracted from a first location of the road area 608 and is added to a second location on the shoulder area 610 having the same depth as the first location. Stated another way, vertical positions 1002 of the first and second locations are consistent, while relative horizontal positions 1102 are swapped in the two vehicle images 618' compared with the two vehicle image 618. Alternatively, in some embodiments not shown, a single vehicle image includes more than one vehicle, and the vehicle image is extracted from a first image and added to a second image. The vehicles are adjusted and added jointly while keeping their relative positions with respect to each other.

In some embodiments, the vehicle image 618 occludes a portion of a road feature in the second image 604. The road feature is one of: a road area 608, a shoulder area 610, a road marking 612 or 614 defining an ego lane in which the ego vehicle is driving, a road marking 612 or 614 defining an adjacent lane to the ego lane, an edge marking 612 defining a shoulder area, a road divider dividing the road, a traffic light, a traffic sign, or a temporary road marking defined by a plurality of traffic safety objects. For example, the vehicle image 618 occludes a portion of a shoulder barrier structure 616 in FIGS. 11A and 11B and a signpost supporting a traffic sign 1106 in FIG. 11B. Additionally, the image of the object 618 added to the first image 602 is not limited to an image of a vehicle 102. In some embodiments, the objects include one or more road features that are commonly seen, such as a lane area, a shoulder area, an edge marking, a lane marking, a shoulder barrier structure, a road divider, a traffic light, a traffic sign, a pedestrian, a bicycle, or a traffic safety object. Alternatively, in some embodiments, the object is not commonly seen in the context of vehicle driving. For example, an image of a deer, a chair, a cabinet, an airplane, a TV set, or a bear is added to the drivable area 606 of the road of the first image 602 to generate the second image 604. The second image 604 is used to train a model that facilitates vehicle driving when uncommonly seen objects appear on the drivable area 606 of the road.

Figure 12:
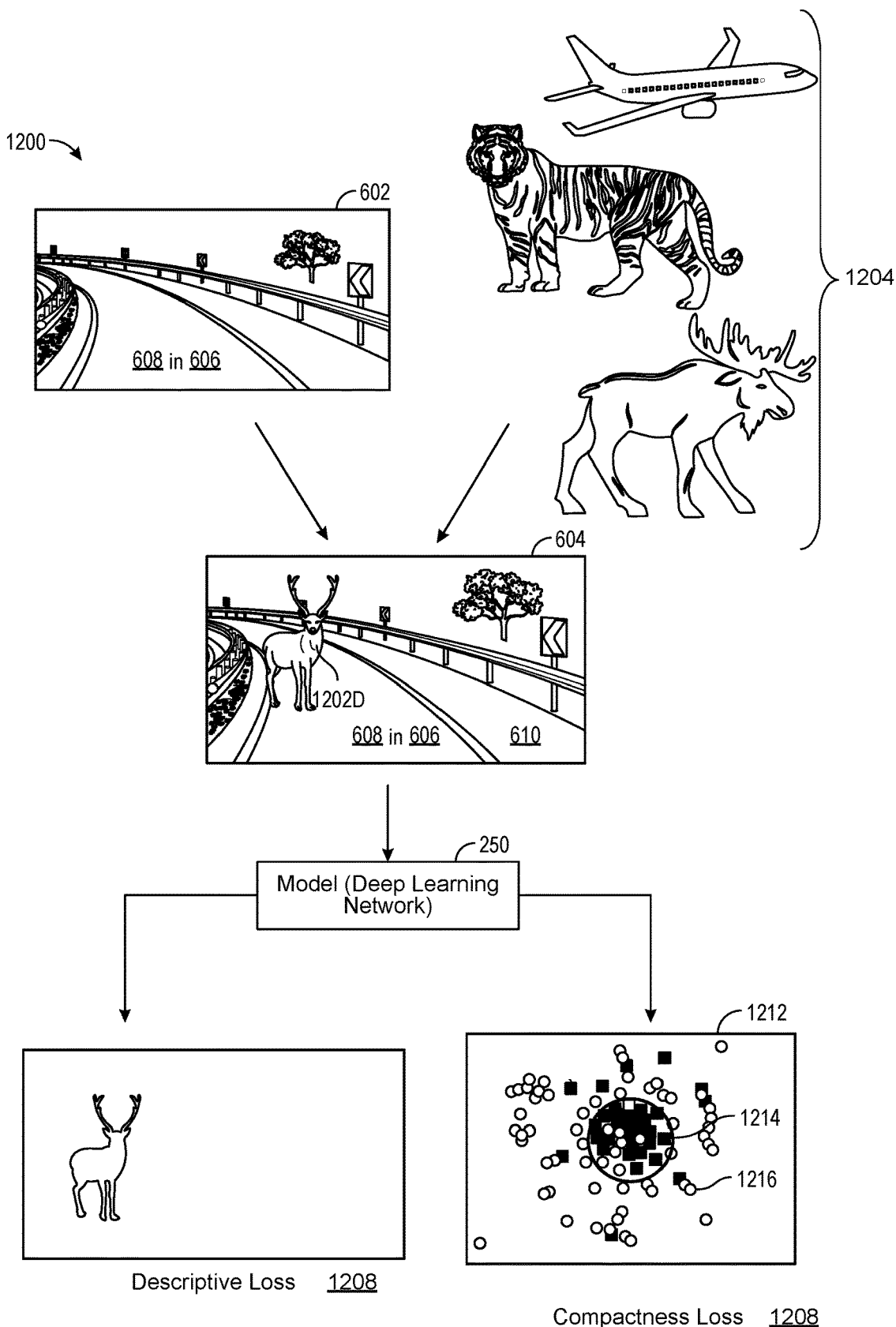
FIG. 12 is a flow diagram of a process for adding an uncommonly seen object onto an image, in accordance with some embodiments.

FIG. 12 is a flow diagram of a process 1200 for adding an uncommonly seen object 1202 onto an image 602, in accordance with some embodiments, and FIG. 13A-13E are five images 1300-1340 including distinct example images of uncommonly seen objects added on a drivable area 606 of a road, in accordance with some embodiments. The object 1202 is selected from a plurality of known uncommon objects 1204 and marked with a predefined label that is used for all of the uncommon objects 1204. In some embodiments, each of the plurality of known objects 1204 is marked with the same predefined label (e.g., "uncommon object"). The plurality of known uncommon objects 1204 is grouped in contrast with a set of commonly seen road features, such as a lane area, a shoulder area, an edge marking, a lane marking, a shoulder barrier structure, a road divider, a traffic light, a traffic sign, a pedestrian, a bicycle, or a traffic safety object. The plurality of known uncommon objects 1204 includes objects that are not commonly seen on a drivable area 606 of a road.

The image of the object 1202 is added to the first image 602 to generate the second image 604. The second image 604 is added to a corpus of training images 640 used to train a model 250 that facilitates vehicle driving. In some embodiments, the model 250 is constructed based on one-class learning and trained using the corpus of training images 640 to detect a first type of road features (e.g., road markings 612 and 614) and a second type of outlier objects (e.g., the uncommonly seen object 1202). The second type of outlier objects includes the plurality of uncommonly-seen objects. The model 250 is trained to detect the uncommonly-seen objects to facilitate driving a vehicle 102 with at least partial autonomy when one of the uncommonly-seen objects is present on the drivable area 606 in front of the vehicle 102.

In some embodiments, during training, a machine learning system of a computer system (e.g., a model training module 226 of a server 104) trains the model 250 using the corpus of training images 640 by extracting a feature of the uncommon object 1202 in the second image 604 using the model 250. The feature of the uncommon object 1202 is compared with second ground truth of the second image 604. The second ground truth includes the predefined label of the uncommon object 1202. Weights of the model 250 are adjusted to match the feature of the uncommon object 1202 with the second ground truth. Specifically, the machine learning system determines whether the extracted feature of the uncommon object matches the second ground truth based on a weighted loss combining a descriptive loss 1208 and a compactness loss 1210. The descriptive loss 1208 indicates a distinction of the second type of outlier objects and the first type of road features, such as the accuracy level of discriminating a patched object 1202 from a common road scene. The compactness loss 1210 is associated with the first type of road features (e.g., road markings 612 and 614). The model 250 is trained to focus on differentiating different road feature representations, rather than the second type of outlier objects (i.e., the uncommon objects 1204). In some embodiments, referring to a cluster plot 1212, the road features are compact and substantially belong to one representation 1214, thereby helping identify new uncommon object features that are outliers 1216 to the representation 1214.

Figure 13A:
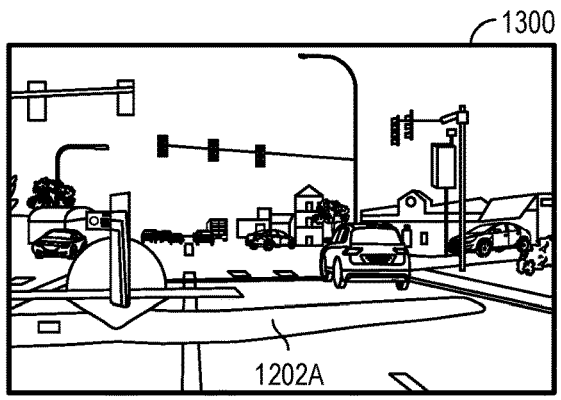
FIGS. 13A-13E are five images including distinct example images of uncommonly seen objects added onto a drivable area of a road, in accordance with some embodiments.
Figure 13B:
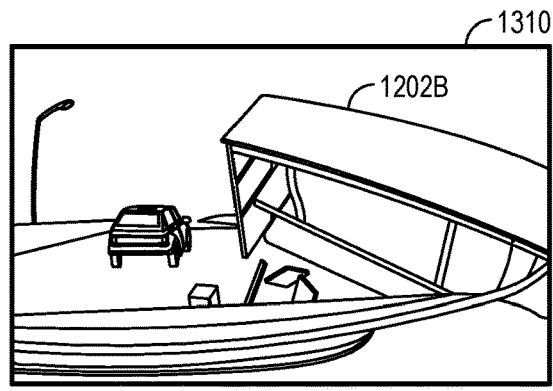
Figure 13C:
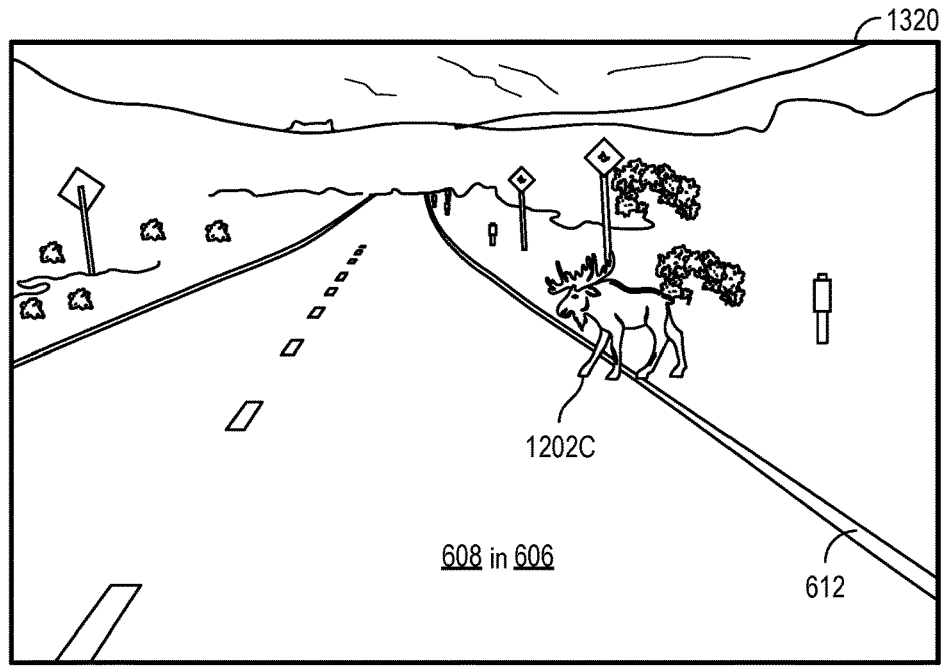
Figure 13D:
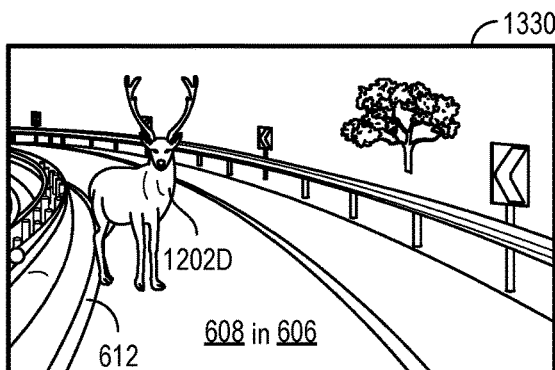
Figure 13E:
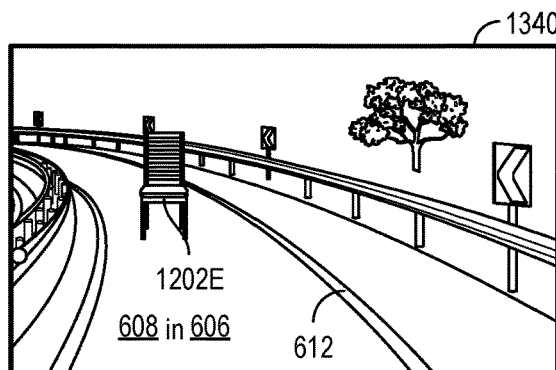

Examples of the uncommonly seen object 1202 include a deer, a chair, a cabinet, an airplane, a TV set, and a bear. Referring to FIG. 13A, an image of an airplane 1202A is added on a drivable area 606 in front of traffic lights. Referring to FIG. 13B, an image of a cabinet 1202B is added on or above a drivable area 606. It appears that the cabinet 1202B just fell off another vehicle 102 that drives in front of an ego vehicle 102 from which a first image 602 is captured. In the image 1310, the cabinet is substantially close to the camera 266, blocks half of a corresponding field of view of the ego vehicle 102, and could hit a front window of the ego vehicle 102 at any time. Referring to FIG. 13C, an image of a deer 1202C is added on a drivable area 606 at night when headlights of the ego vehicle 102 illuminates the drivable area 606 for only a few feet in front of the ego vehicle 102. The deer is exposed to the illumination of the headlights, and has partially entered the road area 608 of the drivable area 606 of the road. Referring to FIG. 13D, an image of an elk 1202D is added on a drivable area 606, and partially occludes a solid edge marking 612. Referring to FIG. 13E, an image of a chair 1202E is added in the middle of a drive lane on a drivable area 606, partially occluding a solid edge marking 612. Each of the image 1300-1340 is used to train a model 250 to respond to an emergency situation, so that the model 250 is configured to generate an output that enables a vehicle control instruction (e.g., an emergency stop command) and controls the ego vehicle 102 to address this emergency situation (e.g., by slowing down the ego vehicle 102 and adjusting a driving direction to avoid hitting the object 1202).

FIG. 14 is a flow diagram of an example method 1400 for augmenting training data used for vehicle driving modelling, in accordance with some embodiments. In some embodiments, the method 1400 is governed by instructions that are stored in a non-transitory computer readable storage medium and are executed by one or more processors of a computer system (e.g., one or more processors 302 of a server 104). Each of the operations shown in FIG. 14 may correspond to instructions stored in the computer memory or computer readable storage medium (e.g., the memory 306 in FIG. 3) of the server 104. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1400 may be combined and/or the order of some operations may be changed.

The computer system obtains (1402) a first image 602 of a road and identifies (1404) within the first image 602 a drivable area 606 of the road. In some embodiments, the drivable area 606 of the road is a portion of the road on which a vehicle can drive, and is not occupied by a vehicle 102 or other objects. The drivable area 606 of the road is visible and not occluded by any vehicle 102 or object on the first image 602. In some embodiments, the drivable area 606 of the road includes a shoulder area 610 of the road. The computer system obtains (1406) an image of an object 618 (e.g., a vehicle), and generates (1408) a second image 604 from the first image 602 by overlaying the image of the object 618 over the drivable area 606. The computer system adds (1410) the second image 604 to a corpus of training images 640 to be used by a machine learning system to generate a model 250 for facilitating driving of a vehicle 102. In some situations, the model facilitates at least partial autonomously driving the vehicle. The model performs one or more of a plurality of on-vehicle tasks including, but not limited to, perception and object analysis 230, vehicle localization and environment mapping 232, vehicle drive control 234, vehicle drive planning 236, and local operation monitoring 238. In some embodiments, the corpus of training images 640 includes (1412) the first image 602. In some embodiments, the corpus of training images 640 includes the second image 604, and does not include the first image 602.

In some embodiments, the computer system trains (1414) the model using machine learning. Training the model uses the corpus of training images 640, including the second image 604 and distributes (1416) the model to one or more vehicles, including a first vehicle 102A. In use, the model is configured to process road images captured by the first vehicle to facilitate driving the first vehicle 102A (e.g., at least partially autonomously). In some embodiments, the model processes the road images in real time (i.e., having a latency that is within a vehicle tolerance) as the road images are captured by the first vehicle 102A. During this course of real time image processing, the training data that are augmented by the second image 604 helps the model provide accurate real-time data that makes it possible to drive the first vehicle 102A at least partially autonomously.

In some embodiments, the computer system generates the second image 604 by extracting (1418) the image of the object 618 from the first image 602 at a first location within the first image 602, selecting (1420) a second location in the drivable area 606, and overlaying (1422) the image of the object 618 at the second location of the drivable area 606. The image of the object 618 is retained at the first location, while it is duplicated to the second location. Specifically, a first set of pixels corresponding to a bottom surface of the object are aligned on a z-axis with a second set of pixels corresponding to the second location of the drivable area 606 of the road, such that the first set of pixels of the object is placed immediately adjacent to or overlap the second set of pixels of the drivable area 606. In some embodiments, the first and second locations are identified based on depths measured with reference to a camera location. Alternatively, in some embodiments, the first image 602 is divided to a plurality of rows and columns, and the first and second locations are identified based on a vertical (row) position 1002, a horizontal (column) position 1102, or both on the first image 602.

In some embodiments, the computer system maintains the size of the image of the object 618 while overlaying the image of the object 618 at the second location of the drivable area 606. For example, the computer system determines that the first location and the second location are at the same depth of field in the second image 604, and the size of the image of the object 618 remains the same in the second image 604 (see, e.g., FIGS. 11A and 11B). Alternatively, in some embodiments, the computer system determines a first depth of field corresponding to the first location and a second depth of field corresponding to the second location. The size of the image of the object 618 is scaled based on a ratio of the first and second depths of field, and the image of the object 618 having a scaled size is overlaid at the second location of the drivable area 606 of the second image 604.

In some embodiments, the computer system generates the second image 604 by obtaining (1424) the image of the object 618 from a source that is distinct from the first image 602, selecting (1420) the second location in the drivable area 606, and overlaying (1422) the image of the object 618 at the second location of the drivable area 606.

In some embodiments, independently of a source of the image of the object 618, the computer system adjusts one or more of: the size, the orientation, the aspect ratio, the brightness level, the contrast level, or the pixel resolution of the image of the object 618, before the image of the object 618 is overlaid on the drivable area 606 of the road in the first image 602 to generate the second image 604.

In some embodiments, the computer system obtains first ground truth associated with the first image 602. After overlaying the image of the object 618 on the drivable area 606, the computer system updates the first ground truth to generate a second ground truth associated with the second image 604. For example, the second ground truth includes the second location and other information of the object 618. The computer system uses the machine learning system to train the model using the corpus of training images 640, including the second image 604, in a supervised manner. Further, in some embodiments, the first ground truth specifies at least locations of one or more road features in the first image 602, and the one or more road features include one or more of: a vehicle 102, a bicycle, a pedestrian, a drivable area 606, a road area 608, a shoulder area 610, an edge marking 612, a lane marking 614, a road divider, a shoulder barrier structure 616, a traffic light, a traffic sign, or a traffic safety object. In some situations, the one or more road features have some labels. For example, a traffic sign held by a construction worker may be labeled as "SLOW" or "STOP" as chosen by the construction worker. The first ground truth includes a label associated with the traffic sign captured in the first image 602.

Additionally, in some embodiments, the object is a first object. In an example, the first object is a vehicle 102 parked on a shoulder area 610, immediately adjacent to an ego lane where the vehicle 102 is driving. The first object occludes a portion of the one or more road features in the second image 604. The second ground truth associated with the second image 604 includes the same information of the first ground truth, independently of occlusion of the portion of the one or more road features. More details about the impact of occlusion on the first ground truth are explained with reference to FIGS. 8 and 9A-9F. Further, in some embodiments, the computer system trains the model using the corpus of training images 640 by detecting the occluded portion of the one or more road features (e.g., part of a lane marker defining a lane) in the second image 604 using the model, comparing the detected portion of the one or more road features with the second ground truth, and adjusting the model to match the detected portion of the one or more road features with the second ground truth.

In some embodiments, the first image 602 is captured from a perspective of an ego vehicle 102, and the object includes a vehicle 102 that is distinct from the ego vehicle 102. Further, in some embodiments, the object occludes a portion of a road feature in the second image 604. The road feature is one of: a lane area, a shoulder area 610, a road marking defining an ego lane in which the ego vehicle 102 is driving, a road marking defining an adjacent lane to the ego lane, an edge marking 612 defining a shoulder area, a road divider dividing the road, a traffic light, a traffic sign, or a temporary road marking defined by a plurality of traffic safety objects.

In some embodiments, the computer system applies a drivable area detection model to identify a shoulder area 610 in the first image 602 and generates a segmentation mask identifying one or more vehicles in the first image 602. An obstacle vehicle is selected from the one or more vehicles 102 identified by the segmentation mask as the object (e.g., when the obstacle vehicle is not occluded or truncated). The computer system extracts the image of the object 618 based on a portion of the segmentation mask identifying the selected obstacle vehicle, selects a second location in the shoulder area 610, and overlays the image of the object 618 at the second location. The image of the obstacle vehicle remains at a first location of the first image 602 corresponding to the portion of the segmentation mask. Alternatively, in some embodiments, the computer system extracts the image of the object 618 from another image distinct from the first image 602 using a segmentation mask. The computer system selects a second location in the shoulder area of the first image 602, and overlays the image of the object at the second location of the first image 602 to generate the second image 604. More details on adding the image of the object on the shoulder area are explained above with reference to FIGS. 10A-10C and 11A-11B.

In some embodiments, the object is an uncommon object 1202 that is selected from a plurality of known objects 1204. Further, in some embodiments, the uncommon object 1202 is marked (1428) with a predefined label for the plurality of known objects 1204, and the predefined label indicates that the known objects 1204 are not commonly seen on a drivable area 606 of a road. Stated another way, the plurality of known objects 1204 are uncommon in contrast to the plurality of road features (e.g., traffic signs, traffic lights, pedestrians, parked vehicles), which are commonly seen in a vehicle driving environment 100. In some embodiments, the model is trained to detect one or more of a plurality of uncommonly-seen objects to facilitate driving the ego vehicle with at least partial autonomy, and the plurality of uncommonly-seen objects includes the plurality of known objects 1204. In an example, the model does not need to identify each uncommonly-seen object accurately. Rather, the model determines whether the uncommonly-seen object belongs to the plurality of uncommonly-seen objects. Examples of the plurality of uncommonly-seen objects include, but are not limited to, an airplane 1202A, a cabinet 1202B, a deer 1202C, an ELK 1202D, a chair 1202E, a TV set, and a bear.

Additionally, in some embodiments, the model is constructed (1430) based on one-class learning and trained using the corpus of training images 640, including the second image 604, to detect a first type of road features and a second type of outlier objects, and the second type of outlier objects include the plurality of uncommonly-seen objects.

Further, in some embodiments, during training, the computer system extracts a feature of the uncommon object in the second image 604 using the model and compares the feature of the uncommon object with the second ground truth of the second image 604. The second ground truth includes the predefined label. The computer system adjusts the weights of the model and determines whether the extracted feature of the uncommon object matches the second ground truth based on a weighted loss combining a descriptive loss 1208 and a compactness loss 1210. The descriptive loss 1208 indicates the distinction between the second type of outlier objects and the first type of road features. The compactness loss 1210 is associated with the first type of road features. More details about adding an uncommon object to a drivable area 606 of a road in an image are explained above with reference to FIGS. 12 and 13A-13E.

It should be understood that the particular order in which the operations in FIG. 14 have been described are merely exemplary and are not intended to indicate that the described order is the only order in which the operations could be performed. One of ordinary skill in the art would recognize various ways to augmenting vehicle training data (e.g., related to a drivable area 606 of a road). Additionally, it should be noted that details described with respect to FIGS. 1-13E and 15-27 are also applicable in an analogous manner to the method 1400 described above with respect to FIG. 14. For brevity, these details are not repeated here.

Background Augmentation Using Foreground Extraction for Driver Monitoring

Training images can be augmented and used to train a data processing model 250 for monitoring a driver or passenger of a vehicle 102 accurately. In some embodiments, a vehicle 102 includes a camera 266 facing an interior of the vehicle 102, and the camera 266 is configured to capture images used to monitor the driver or a passenger sitting inside the vehicle 102. The model 250 is trained using training images and applied to process the images captured in real time by the camera 266, thereby enabling the vehicle 102 to determine whether a vehicle driver is looking forward at a road or distracted. Distractions include looking away from the front, closing one's eyes, or talking. A set of training images is captured from different camera angles to show different drivers sitting in different vehicles 102. These training images are oftentimes captured from the interior of the vehicles 102 while the vehicles 102 are stationary, and therefore, have limited variations on background and lighting conditions. Such a set of training images tends to overfit the data processing model 250 with limited accuracy. To address these issues, the set of training images is augmented to include new training images by combining existing training images with additional background images. The additional background images are captured directly by the cameras 266 mounted in the vehicles 102 or provided by diverse image sources (e.g., an online image database). In general, the ground truth information of these new training images is automatically derived from that of the existing training images, and does not require human labelling. More importantly, the data processing model 250 is trained using the set of training data, including the new training images to monitor the driver or passenger reliably. Such a training data augmentation technique helps improve the robustness level of a corresponding driver monitoring system (DMS) as driver backgrounds vary with different vehicles and under different lighting conditions.

Figure 15:
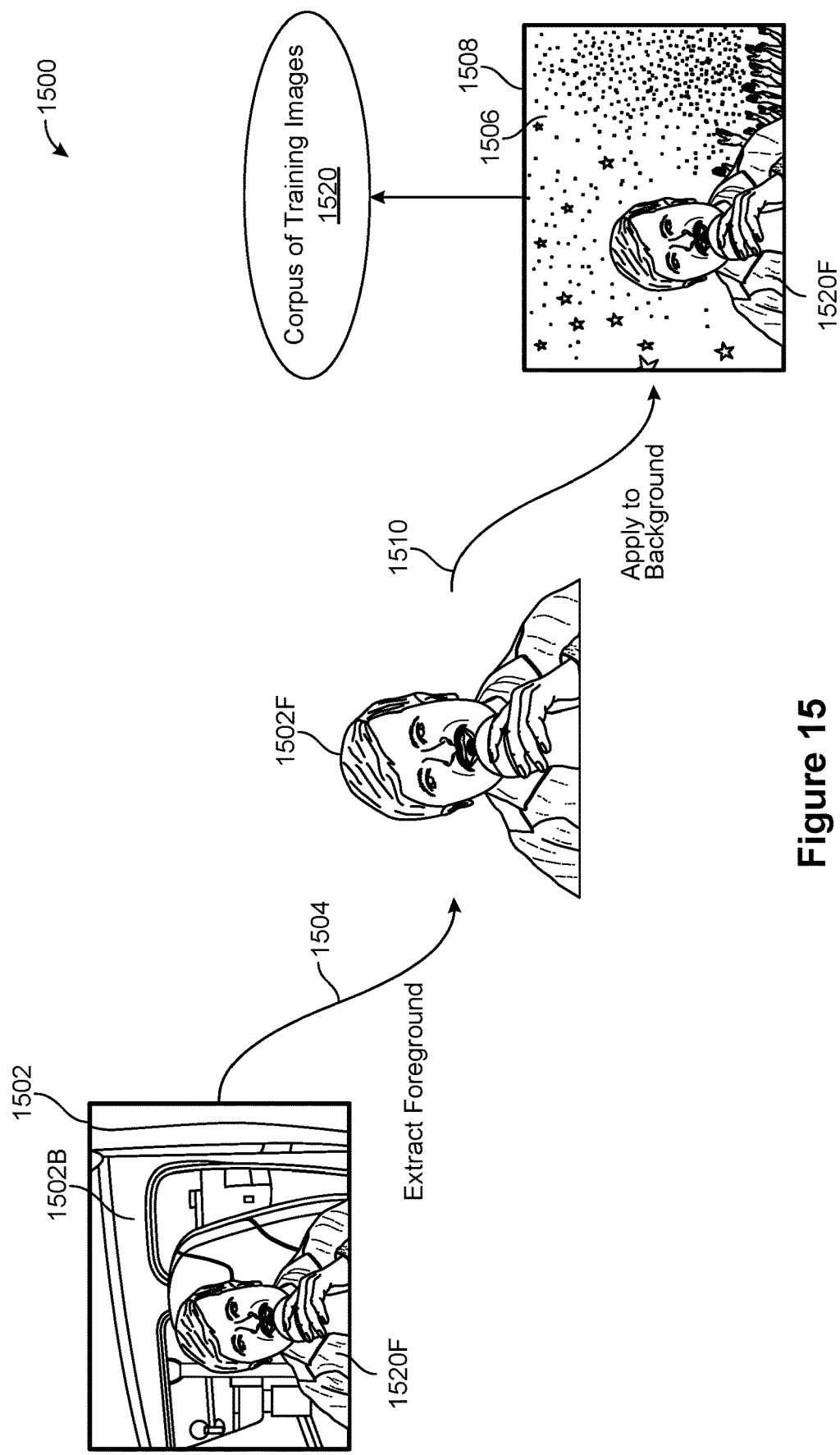
FIG. 15 is a flow diagram of an example process for augmenting a training image by replacing a background image of the training image, in accordance with some embodiments.

FIG. 15 is a flow diagram of an example process 1500 for augmenting a training image 1502 by replacing a background image 1502B of the training image 1502, in accordance with some embodiments. The training image 1502 is used to generate a model 250 for autonomously monitoring vehicle drivers or passengers. The training image 1502 includes the background image 1502B and a foreground driver image 1502F overlaid on the background image 1502B. In some embodiments, the model 250 is applied to autonomously monitor vehicle drivers to determine whether a vehicle driver is looking forward at a road ahead of a vehicle 102. In some embodiments, the model 250 is applied to monitor vehicle drivers to determine whether a vehicle driver is looking forward at a road, looking to the left, looking to the right, looking down, has closed eyes, or is talking. In this example, a vehicle driver shown in the foreground driver image 1502F is drinking from a bottle, and the model 250 is applied to monitor whether the vehicle driver could possibly drink alcohol. In some situations, in accordance with a determination that the chance of the vehicle driver drinking alcohol exceeds a threshold probability level, the vehicle 102 generates an alert message to the vehicle driver (or to a central hub).

Training data augmentation is implemented at a computer system (e.g., a server 104). The computer system obtains an image 1502 of a first driver in an interior of a first vehicle 102 and separates (1504) the foreground driver image 1502F from the background image 1502B of the interior of the first vehicle 102. The computer system obtains a second background image 1506, and generates a second image 1508 by overlaying (1510) the foreground driver image 1502F onto the second background image 1506, e.g., at a position corresponding to a driver seat. The second image 1508 is added to a corpus of training images 1520 to be used by a machine learning system to generate the model 250 for autonomously monitoring vehicle drivers. In some embodiments, the corpus of training images 1520 includes the image 1502, and the model 250 is trained by both the image 1502 and the second image 1508. Alternatively, in some embodiments, the corpus of training images 1520 does not include the image 1502. The model 250 is trained by the second image 1508, while the image 1502 is not used to train the model 250.

Referring to FIG. 15, in some embodiments, the second background image 1506 includes an image of an interior of a second vehicle 102 that is distinct from the first vehicle 102 captured in the background image 1502B. The second background image 1506 is captured by a camera 266 that faces a driver of the second vehicle 102 in the interior of the second vehicle 102. Alternatively, in some embodiments not shown, the second background image 1506 does not include an image of an interior of a vehicle 102. For example, the second background image 1506 includes a natural view to be captured as a convertible roof of a convertible car is open.

In some embodiments, prior to overlaying the driver image 1502F onto the second background image 1506, the computer system adjusts one or more image properties (e.g., brightness or contrast) of at least one of the driver image 1502F and the second background image 1506 to match lighting conditions of the driver image 1502F and the second background image 1506. For example, a first brightness level is determined for the background image 1502B, and a second brightness level is determined for the second background image 1506. An image property scale factor is determined based on the first and second brightness levels, and applied to scale the brightness level of the driver image 1502F before the driver image 1502F is overlaid on the second background image 1506. In some embodiments, the computer system normalizes at least one of the driver image 1502F and the second background image 1506 to match average brightness levels of the driver image 1502F and the second background image 1506. In some embodiments, the computer system scales at least one of the driver image 1502F and the second background image 1506. For example, the size of the driver image 1502F is enlarged before it is overlaid on the second background image 1506. In some embodiments, the computer system adjusts the location of the driver image 1502F on the second background image 1506, e.g., on a driver seat or on a passenger seat. Further, in some embodiments, a combination of a subset of the one or more image properties, the image size, and the driver image location is adjusted for one of the driver image 1502F and the second background image 1506. In some embodiments, both the driver image 1502F and the second background image 1506 are adjusted, while the same property or different properties are adjusted for the driver image 1502F and the second background image 1506. For example, the size of the driver image 1502F is adjusted, and the contrast level of the second background image 1506 is adjusted, so that the driver image 1502F and the second background image 1506 are matched to each other in size and in light conditions.

Figure 16:
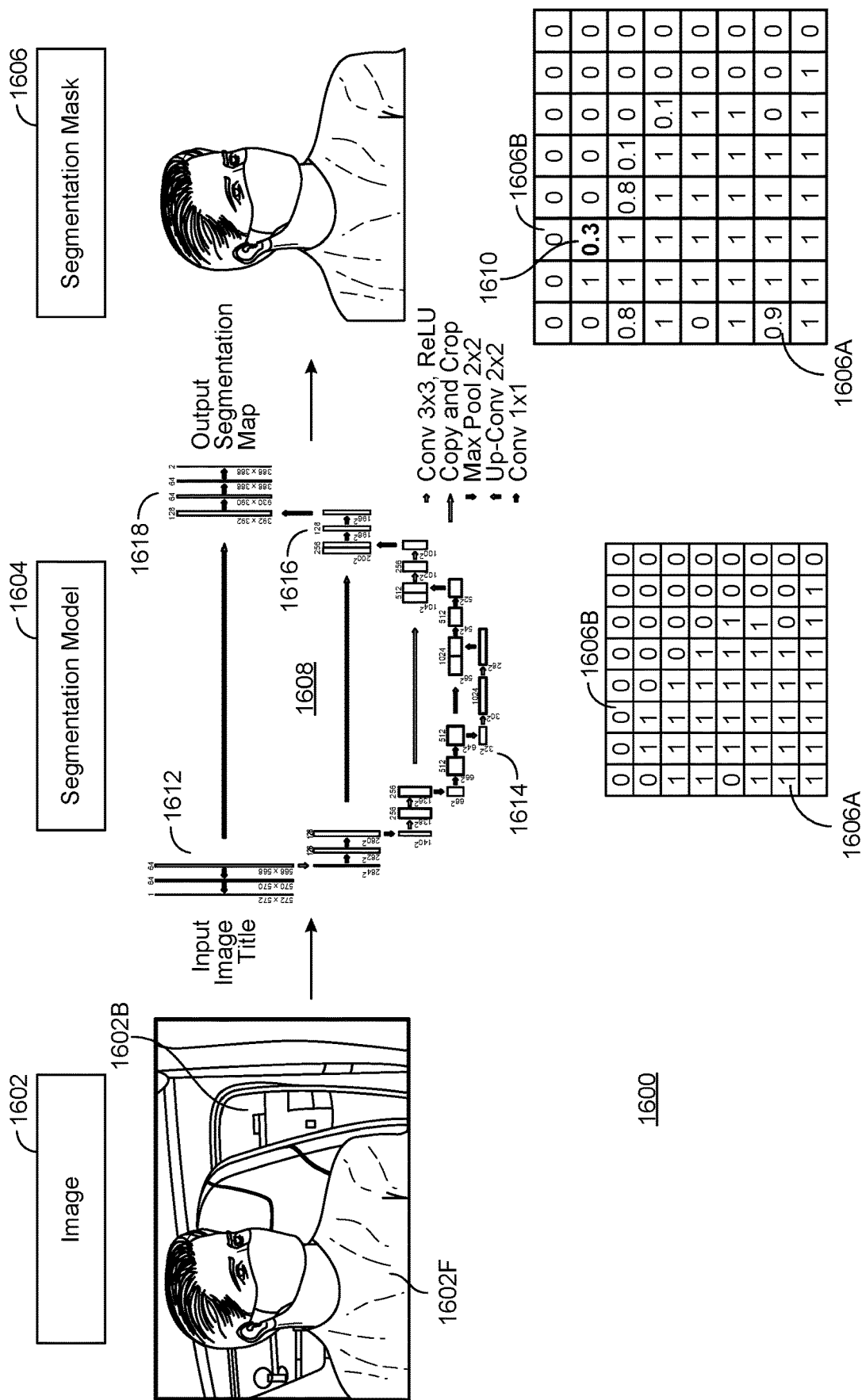
FIG. 16 is a flow diagram of an example process for separating a foreground driver image from a first image using a segmentation model, in accordance with some embodiments.

FIG. 16 is a flow diagram of an example process 1600 for separating a foreground driver image 1602F from a first image 1602 using a segmentation model 1604, in accordance with some embodiments. The segmentation model 1604 is applied to generate a segmentation mask 1606 that associates a plurality of first pixels of the first image with the first driver image 1602F or a plurality of second pixels of the first image with a first background image 1602B. The first background image 1602B is complementary to the foreground driver image 1602F, so the plurality of first pixels is complementary to the plurality of second pixels. Stated another way, there is no single pixel belonging to both the plurality of first pixels and the plurality of second pixels.

In some embodiments, the segmentation mask 1606 includes a plurality of first elements 1606A corresponding to the plurality of first pixels of the driver image 1602F and a plurality of second elements 1606B corresponding to the plurality of second pixels of the first background image 1602B. In some embodiments, each element of the segmentation mask 1606 represents a first probability of a corresponding pixel of the first image 1602 being a first pixel associated with the driver image 1602F. For each element, when the first probability is greater than a respective threshold probability (e.g., 0.6), it is determined that the corresponding pixel of the first image 1602 is associated with the driver image 1602F. When the first probability is lower than or equal to the respective threshold probability (e.g., 0.6), it is determined that the corresponding pixel of the first image 1602 is associated with the first background image 1602B. For example, an element 1610 of the segmentation mask 1606 has a value of 0.3, indicating that the probability of being associated with the driver image 1602F is 0.3. The probability of the corresponding pixel of the first image 1602 being associated with the first background image 1602B is therefore 0.7. As such, the element 1610 of the segmentation mask 1606 is associated with the first background image 1602B.

Alternatively, in some embodiments not shown, each element of the segmentation mask 1606 stores the probability of a corresponding pixel being associated with the first background image 1602B. For each element, when the second probability is greater than a respective threshold probability (e.g., 0.6), it is determined that the corresponding pixel of the first image 1602 is associated with the first background image 1602B, and when the second probability is lower than or equal to the respective threshold probability (e.g., 0.6), it is determined that the corresponding pixel of the first image 1602 is associated with the driver image 1602F.

Additionally, in some embodiments, the segmentation mask 1606 has a resolution lower than that of the first image 1602. Each element of the segmentation mask 1606 corresponds to a respective set of neighboring pixels (e.g., 3×3 pixels). In some embodiments, each element represents a first probability of a corresponding set of pixels of the first image 1602 being associated with the driver image 1602F. For each element, when the first probability is greater than a respective threshold probability (e.g., 0.6), it is determined that the corresponding set of pixels of the first image 1602 is associated with the driver image 1602F. When the probability is lower than or equal to the respective threshold probability (e.g., 0.6), it is determined that the corresponding set of pixels of the first image 1602 is associated with the first background image 1602B. Alternatively, in some embodiments not shown, each element represents a second probability of a corresponding set of pixels of the first image 1602 being associated with the first background image 1602B.

In some embodiments, each element of the segmentation mask 1606 is a binary probability, and is equal to one of two predefined values (e.g., 0 or 1). In some embodiments, each element of the segmentation mask 1606 represents a first probability of a corresponding single pixel or a corresponding set of pixels of the first image 1602 being associated with the driver image 1602F. For example, the first elements 1606A are equal to 1, indicating that a corresponding first region of the first image 1602 is associated with the driver image 1602F. The second elements 1606B are equal to 0, indicating that a corresponding second region of the first image 1602 is associated with the first background image 1602B. Alternatively, in some embodiments not shown, each element of the segmentation mask 1606 represents a second probability of a corresponding single pixel or a corresponding set of pixels of the first image 1602 being associated with the first background image 1602B. For example, each element is equal to 1 or 0, indicating that a corresponding region of the first image 1602 is associated with the first background image 1602B or the driver image 1602F, respectively.

In some embodiments, the segmentation model 1604 is a U-Net 1608, which is constructed based on a fully convolutional network. The U-Net 1608 includes an encoder-decoder network having a series of encoding stages 1612, a bottleneck network 1614 coupled to the series of encoding stages 1612, and a series of decoding stages 1616 coupled to the bottleneck network 1614. The series of decoding stages 1616 includes the same number of stages as the series of encoding stages 1612. In an example, the encoder-decoder network has four encoding stages 1612 and four decoding stages 1616. The bottleneck network 1614 is coupled between the encoding stages 1612 and decoding stages 1616. The first image 1602 is successively processed by the series of encoding stages 1612, the bottleneck network 1614, the series of decoding stages 1616, and a pooling layer 1618 to generate the segmentation mask 1606.

The series of encoding stages 1612 includes an ordered sequence of encoding stages 1612 and has an encoding scale factor. Each encoding stage 1612 applies successive Rectified Linear Units (ReLUs) to generate an encoded feature map having a feature resolution and a number of encoding channels. Between every two encoding stages, the feature resolution is scaled down and the number of encoding channels is scaled up according to the encoding scale factor (e.g., using a max pooling layer). The bottleneck network 1614 bridges the encoding and decoding stages, and includes successive ReLUs. The series of decoding stages 1616 includes an ordered sequence of decoding stages 1616 and has a decoding upsampling factor. Each decoding stage 1616 applies successive ReLUs to generate a decoded feature map having a feature resolution and a number of decoding channels. Between every two decoding stages, the feature resolution is scaled up and the number of decoding channels is scaled down according to the decoding upsampling factor (e.g., using an up conversion layer). Each encoding stage 1612 provides an encoded feature map to a corresponding decoding stage 1616 via a skipped connection, such that each decoding stage 1616 combines an input from a corresponding encoding stage 1612 with an input from a preceding decoding stage 1616 or bottleneck network 1614.

Figure 17:
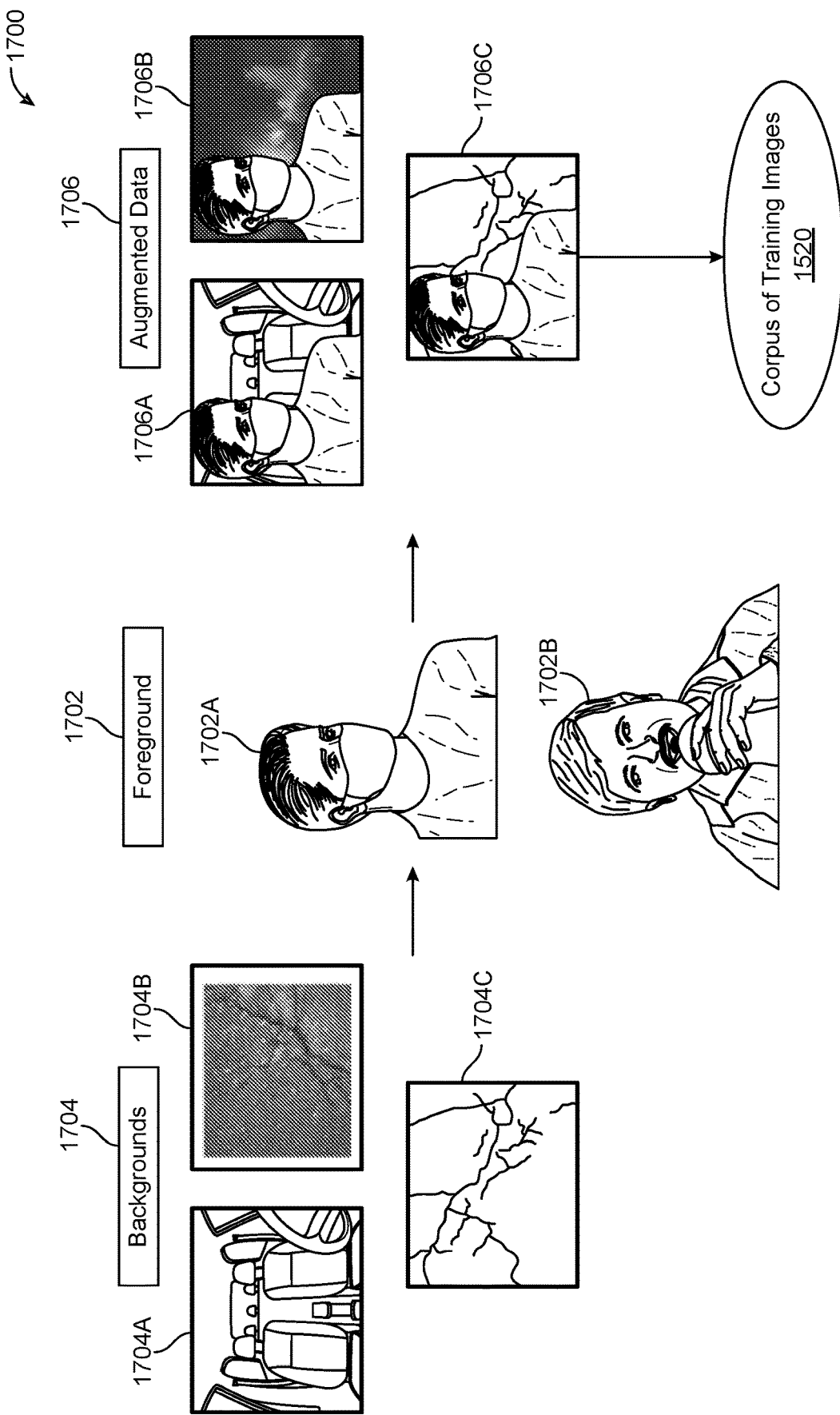
FIG. 17 is a flow diagram of an example process for augmenting driver images, in accordance with some embodiments.

FIG. 17 is a flow diagram of an example process 1700 for augmenting driver images 1702, in accordance with some embodiments. The driver images 1702 include a first driver image 1702A that is separated from a first background image of a first image not shown in FIG. 17. In some embodiments, the first image is captured in an interior of a first vehicle 102. Alternatively, in some embodiments, the first image is obtained for the purposes of providing the first driver image 1702A, and therefore, captured in a scene distinct from the interior of the first vehicle 102. A computer system obtains one or more background images 1704, such as a first background image 1704A of an interior of a second vehicle 102, a second background image 1704B of a starry night sky, and a third background image 1704C of a ground surface. Stated another way, each of the one or more background images 1704 is captured by a camera 266 within or independently of an interior of a corresponding vehicle 102. In some embodiments, one of the one or more background images 1704 are extracted from an image database (e.g., downloaded from an online image database, and may or may not include the interior of a corresponding vehicle 102).

The first driver image 1702A is overlaid on each of the one or more background images 1704 to form a corresponding second image 1706 (e.g., images 1706A, 1706B, and 1706C). In some embodiments, during the course of generating the corresponding second image 1706, at least one of the first driver image 1702A or respective background image 1704 is adjusted according to one or more image properties, normalized, or scaled in size to make the first driver image 1702A and respective background image 1704 match each other.

In some embodiments, the driver images 1702 include a second driver image 1702B of a second driver that is distinct from the driver of the first driver image 1702A. The second driver image 1702B is separated from a respective background image of a third image not shown in FIG. 17. The second driver image 1702B is overlaid onto one of the one or more background images 1704 to generate a fourth image. The fourth image is also added into the corpus of training images 248 to be used by a machine learning system to generate the model 250 for monitoring vehicle drivers. In some embodiments, two driver images 1702 and three background images 1704 are combined to generate at least six training images. Further, in some embodiments, one or both of the first driver image 1702A or respective background image 1704 is adjusted according to one or more image properties or relative location, normalized, or scaled in size to create a plurality of variations of the resulting training images. By these means, the model 250 for monitoring vehicle drivers is trained using these training images to provide accurate driver information concerning driver states in a reliable manner when different drivers are driving different vehicles 102 under different lighting conditions.

Figure 18:
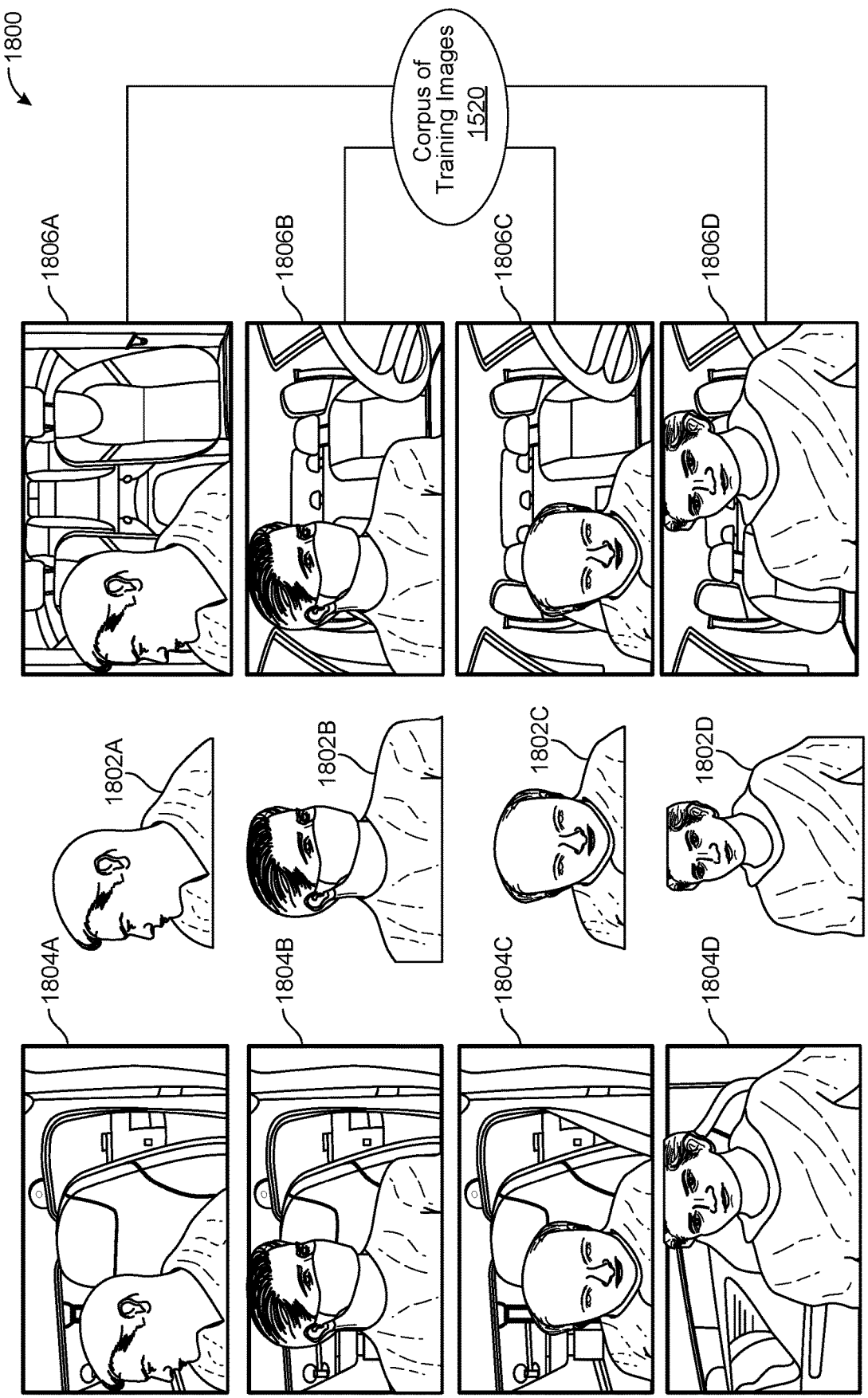
FIG. 18 is a flow diagram of another example process for augmenting driver images, in accordance with some embodiments.

FIG. 18 is a flow diagram of another example process 1800 for augmenting driver images 1802, in accordance with some embodiments. The driver images 1802 include a first driver image 1802A, a second driver image 1802B, a third driver image 1802C, and a fourth driver image 1802D. Each of the driver images 1802 is separated from a respective background image in a respective image 1804. For example, each driver image 1802A, 1802B, 1802C, or 1802D is separated from the respective background image in the respective image 1804A, 1804B, 1804C, or 1804D, respectively. In some embodiments, each of the driver images 1802 is associated with a distinct driver. In some embodiments, a subset of the driver images 1802 is associated with the same driver having different driver states (e.g., action, location, or direction of view). In an example, referring to FIG. 18, the four driver images 1802 capture four distinct drivers. The first driver image 1802A shows a driver looking to the right and facing away from a camera 266. The second driver image 1802B shows a driver who wears a face mask covering his nose and mouth and is looking slightly towards his left shoulder. The third driver image 1802C shows a driver looking down (e.g., at a mobile phone or at a control panel of his vehicle 102), and the fourth driver image 1802D shows a driver looking slightly to the right.

Each of the driver images 1802 is overlaid on a respective background image to generate a respective training image 1806. In some embodiments, each of the background images is distinct. In some embodiments, a subset of the background images is identical, while the driver images 1802 to be combined with the subset are distinct from each other. In this example, the first training image 1806A corresponds to a first background image, and the training images 1806B-1806D correspond to the same background image that is distinct from the first background image used in the first training image 1806A. Although the training images 1806B-1806D correspond to the same background image, the driver images 1802B, 1802C, and 1802D are overlaid at different relative locations of the same background image. For example, the driver images 1802B and 1802C are overlaid on a passenger seat of the background image of the training images 1806B and 1806C. The driver image 1802D is overlaid on a driver seat of the background image of the training image 1806D. The first driver image 1802A is overlaid on a passenger seat of the background image of the training image 1806A. It is noted that the steering wheel is located on the left side of a vehicle in various embodiments of this application (e.g., the standard in the United States).

In some embodiments, the model 250 for monitoring vehicle drivers is trained to determine whether each driver image 1802 is associated with a driver or a passenger (e.g., based on the location on which the respective driver image 1802 is overlaid with respect to the corresponding background image). The model 250 is further trained to determine whether a person in each driver image 1802 is distracted and whether to issue an alert message. This is in accordance with a determination of whether a driver image 1802 is associated with a driver or a passenger. For example, the model 250 is trained to classify a person in the training image 1806A or 1806C as a distracted passenger without issuing any alert message. However, when the person in the training image 1806A or 1806C is placed on the driver seat, the model 250 is trained to classify the person in the training image 1806A or 1806C as a distracted driver and enables issuing of an alert message. From a different perspective, in some embodiments, a single driver image 1802 and a single background image are combined based on different relative locations to generate a plurality of training images 1806.

The training images 1806A-1806D are added to a corpus of training images 248 applied to train the model 250 for monitoring drivers or passengers. In some embodiments, the corpus of training images 248 further includes a subset or all of the images 1804 from which the driver images 1802 are extracted. In some embodiments, the corpus of training images 248 includes a plurality of training images 1806 generated from the same driver image 1802 and the same background image. Each of the plurality of training images 1806 includes a distinct combination of image properties, sizes, scale factors, and relative locations of the same driver image 1802 and the same background image.

Figure 19:
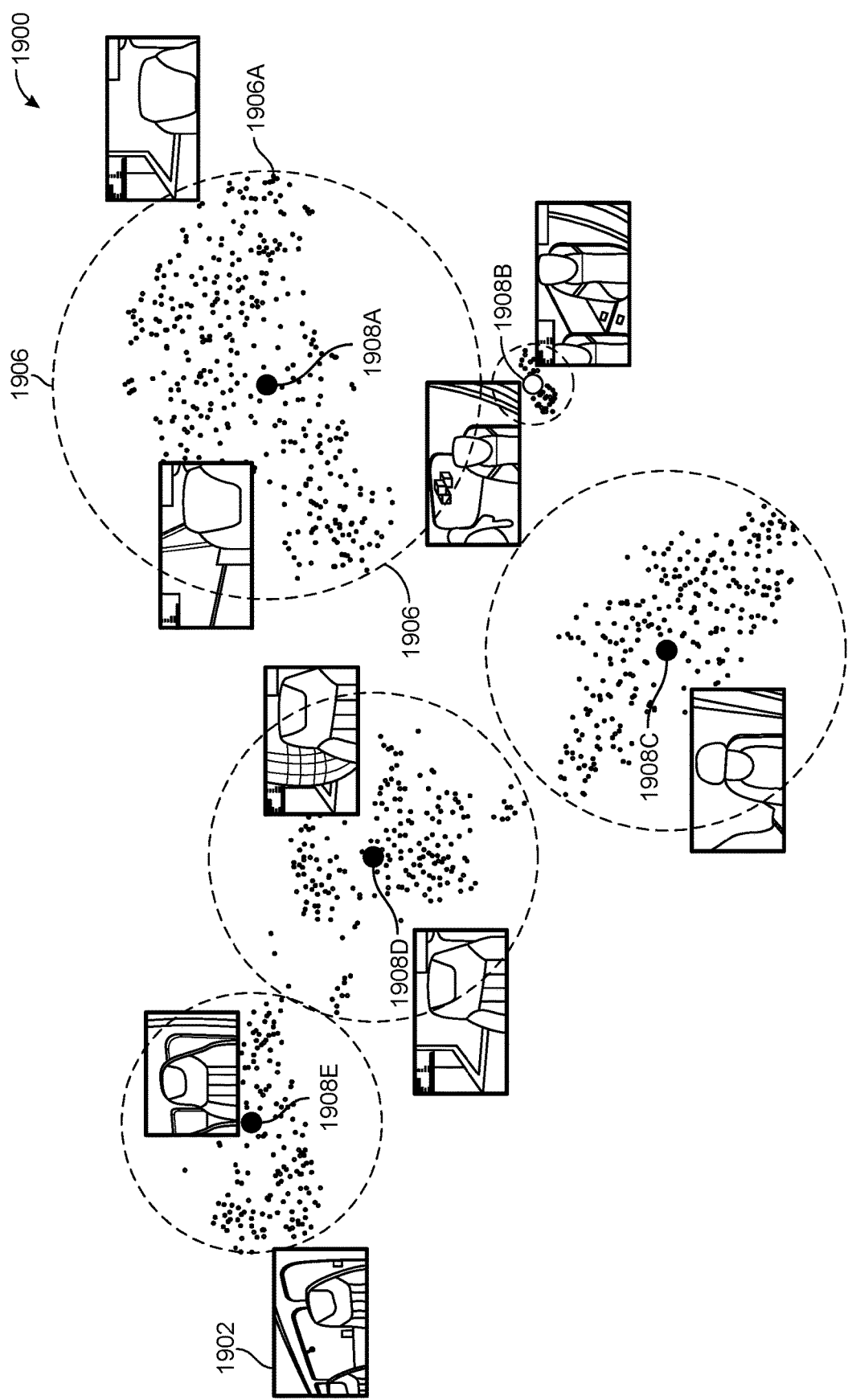
FIG. 19 is a two-dimensional (2D) clustering plot showing an example distribution of representations of a plurality of background images, in accordance with some embodiments.

FIG. 19 is a two-dimensional (2D) clustering plot 1900 showing an example distribution of representations of a plurality of background images 1902, in accordance with some embodiments. A computer system (e.g., a server 104) collects the plurality of background images 1902, for example, by receiving a first subset of background images from cameras 266 of vehicles 102 or retrieving a second subset of background images from an image database. Each of the plurality of background images 1902 is mapped onto a respective point in a multidimensional space having a distance metric d. In an example, the multidimensional space is represented by the 2D cluster plot 1900 having two axes, and the two axes correspond to two properties (e.g., a contrast level and a brightness level) of each of the plurality of background images 1902. Each dot on the cluster plot 1900 represents a respective background image 1902 located on the clustering plot 1900 via a first axis value and a second axis value. Two dots represent two distinct background images 1902 on the cluster plot 1900. In some embodiments, the distance between dots is a Euclidean distance determined based on the first and second axis values of the two dots. More generally, the points may be placed in an n-dimensional space, with each of the n dimensions corresponding to a respective image property.

The plurality of background images 1902 are clustered using the distance metric d to form a plurality of image clusters 1904 (e.g., the cluster 1904A). For each of the image clusters 1904, one or more background images 1906 are identified in the image cluster 1904 to be the most distant (e.g., from a centroid (or center) 1908, according to the distance metric d). The computer system forms a set of candidate background images including the identified one or more most distant background images 1906 in each of the image clusters 1904. A second background image (e.g., image 1506 in FIG. 15, images 1704 in FIG. 17) is selected from the set of candidate background images. The second background image is combined with a driver image to generate a training image that is added into a corpus of training images 248 for training a model 250 for monitoring vehicle drivers.

In some embodiments, K-means clustering is applied to form the plurality of image clusters 1904 from the plurality of background images 1902 based on the distance metric d. In accordance with K-means clustering, a computer system selects a positive integer number K and selects K cluster centers (also called centroids) 1908. In an example not shown, the selected integer number K is equal to 1. In the example shown in FIG. 19, the selected integer number K is equal to 5, and the cluster centers 1908A, 1908B, 1908C, 1908D, and 1908E are selected (e.g., at random locations to get started). For each of the plurality of background images 1902, the computer system determines a distance of a respective background image 1902 from each of the cluster centers 1908 (e.g., 1908A-1908E). The respective background image 1902 is assigned to a respective image cluster 1904 associated with a respective cluster center 1908 to which the respective background image 1902 has a shortest distance (i.e., the distance between the respective background image 1902 and the respective cluster center 1908 of the respective image cluster 1904 is shorter than any other distance of the respective background image 1902 and a remaining cluster center 1908). For example, the distance between the background image 1906A and the cluster center 1908A is shorter than any other distance between the background image 1906A and the remaining cluster centers 1908B, 1908C, 1908D, or 1908E. Therefore, the background image 1906A is assigned to the image cluster 1904A corresponding to the cluster center 1908A.

Further, in some embodiments, the computer system iteratively adjusts each of the K cluster centers 1908 based on positions of the background images 1902 assigned to a respective image cluster 1904 and reassigns each background image 1902 to a respective image cluster 1904 associated with a respective cluster center 1908 to which the respective background image 1902 has a shortest distance, until positions of the K cluster centers 1908 do not change on the clustering plot 1900 (e.g., until changes of the positions of the K cluster centers 1908 are within a pre-defined tolerance).

Stated another way, in some embodiments, the plurality of background images 1902 are collected and mapped onto respective points in the multidimensional space (e.g., the 2D clustering plot 1900) having the distance metric d. In accordance with the distance metric d, the plurality of background images 1902 are clustered to form a plurality of image clusters 1904. For each of the plurality of background images 1902, a respective distance is determined between the respective background image 1902 and a corresponding cluster center 1908 of an image cluster 1904 to which the respective background image 1902 belongs. The second background image is selected from the plurality of background images based on the respective distance between the second background image and the corresponding cluster center 1908. Further, in some embodiments, for each image cluster 1904, a respective subset of candidate images is selected in accordance with a determination that a distance of each candidate image and a respective cluster center 1908 is greater than a threshold distance or in accordance with a determination that the distance is greater than corresponding distances of a threshold percentage of background images in the same image cluster 1904. For example, each candidate image is selected if a distance of the candidate image and the respective cluster center 1908 is greater than the corresponding distances of 95% of the background images in the same image cluster 1904. As such, the second background image is selected from the candidate images (i.e., distant or remote background images 1906 in each image cluster 1904) to augment the corpus of training images 248 with a high diversity level. Because the model 250 for monitoring vehicle drivers is trained using such diverse training images 248, the model 250 provides accurate monitoring results in a reliable manner.

FIG. 20 is a flow diagram of an example method 2000 for augmenting training images used for generating a model 250 for monitoring vehicle drivers, in accordance with some embodiments. In some embodiments, the method 2000 is governed by instructions that are stored in a non-transitory computer readable storage medium and are executed (2002) by one or more processors of a computer system (e.g., one or more processors 302 of a server 104). Each of the operations shown in FIG. 20 may correspond to instructions stored in the computer memory or computer readable storage medium (e.g., the memory 306 in FIG. 3) of the server 104. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 2000 may be combined and/or the order of some operations may be changed.

The computer system obtains (2004) a first image of a first driver in an interior of a first vehicle and separates (2006), from the first image, a first driver image from a first background image of the interior of the first vehicle. The computer system obtains (2008) a second background image and generates (2010) a second image by overlaying the first driver image onto the second background image. The computer system adds (2012) the second image to a corpus of training images 248 to be used by a machine learning system to generate a model 250 for autonomously monitoring vehicle drivers. Referring to FIG. 15, a driver image 1502F is separated from a first background image 1502B and overlaid onto a second background iamge 1506 to generate a second image 1508. The second image 1508 is added to the corpus of training images 248 to be used to generate the model 250.

In some embodiments, the model 250 is trained (2014) for autonomously monitoring vehicle drivers to determine whether a vehicle driver is looking forward at a road ahead of a vehicle 102. In some embodiments, the model 250 is trained (2016) for autonomously monitoring vehicle drivers to determine whether a vehicle driver is looking forward at a road, looking to the left, looking to the right, looking down, closing his/her eyes, or talking.

In some embodiments, referring to FIG. 16, the computer system applies (2018) a segmentation model 1604 to generate a segmentation mask 1606 that associates a plurality of first pixels with the first driver image and associates a plurality of second pixels of the first image with the first background image. Further, in some embodiments, the segmentation model 1604 includes (2020) a U-Net 1608 that is based on a fully convolutional network.

In some embodiments, prior to overlaying the first driver image onto the second background image, the computer system performs (2022) one or more of: (i) adjusting one or more image properties (e.g., the brightness level or the contrast level) of at least one of the first driver image and the second background image to match lighting conditions of the first driver image with the second background image, (ii) normalizing at least one of the first driver image and the second background image to match average brightness levels of the first driver image and the second background image, and (iii) scaling at least one of the first driver image and the second background image.

In some embodiments, the second background image does not include an image of an interior of a vehicle. Alternatively, in some embodiments, the second background image includes an image of an interior of a second vehicle. The second background image is captured by a camera 266 that faces a driver of the second vehicle in the interior of the second vehicle. Further, in some embodiments, the computer system obtains a third image of a second driver, and the first and second drivers are distinct from each other. The computer system processes the third image to separate a second driver image from a third background image and generates a fourth image by overlaying the second driver image onto the second background image. The fourth image is added to the corpus of training images 248 to be used by the machine learning system to generate the model for monitoring vehicle drivers.

In some embodiments, referring to FIG. 19, the computer system collects (2024) a plurality of background images 1902 and maps (2026) each of the background images 1902 onto a respective point in a multidimensional space having a distance metric d. The plurality of background images 1902 is clustered (2028) using the distance metric d to form a plurality of image clusters 1904. For each of the image clusters 1904, the computer system identifies two or more background images 1906 in the image cluster 1904 that are most distant from each other according to the distance metric d and forms a set of candidate background images including the identified most distant background images 1906 in each of the image clusters 1904. The second background image is selected from the set of candidate background images. Further, in some embodiments, the computer system clusters the plurality of background images 1902 by selecting a positive integer number K (e.g., 5) and selecting K cluster centers. For each of the plurality of background images 1902, the computer system determines (2030) the distance of the respective background image 1902 from each of the cluster centers 1908 and assigns the respective background image 1902 to a respective image cluster 1904 associated with a respective cluster center 1908 to which the respective background image 1902 has a shortest distance.

Stated another way, in some embodiments, the computer system collects (2024) a plurality of background images 1902 and maps (2026) each of the background images 1902 onto a respective point in a multidimensional space having a distance metric d. The plurality of background images 1902 is clustered (2028) using the distance metric d to form a plurality of image clusters 1904. For each of the plurality of background images 1902, the computer system determines (2030), on a clustering plot 1900, a respective distance between the respective background image 1902 and a corresponding cluster center 1908 of an image cluster 1904 to which the respective background image 1902 belongs. The second background image is selected from the plurality of background images 1902 based on the respective distance between the second background image and the corresponding cluster center 1908.

In some embodiments, the first driver image is overlaid at a first location of the second background image. The computer system generates an alternative image by overlaying the first driver image at a second position of the second background image and adds the alternative image into the corpus of training images 248 jointly with the second image.

In some embodiments, the computer system trains the model 250 for autonomously monitoring vehicle drivers to determine whether a vehicle driver is sitting on a driver seat or a passenger seat and, in accordance with a determination of whether the vehicle driver is sitting on the driver seat or a passenger seat, classify the vehicle driver as a distracted driver or a distracted passenger.

It should be understood that the particular order in which the operations in FIG. 20 have been described are merely exemplary and are not intended to indicate that the described order is the only order in which the operations could be performed. One of ordinary skill in the art would recognize various ways to augmenting training data (e.g., related to driver or passenger monitoring). Additionally, it should be noted that details described with respect to FIGS. 1-19 and 21-27 are also applicable in an analogous manner to the method 2000 described above with respect to FIG. 20. For brevity, these details are not repeated here.

Data Augmentation with Traffic Safety Object Based Lane Definition

Under some circumstances, removable traffic safety objects (e.g., road cones) are placed on a drivable area of a road (e.g., where there is road work) to guide traffic temporarily. Examples of a traffic safety object include, but are not limited to, a delineator post 2110-1, a cone 2110-2, and a barrel 2110-3, as shown below in FIG. 22. Vehicle data processing models 250 (FIG. 2) are created and trained to recognize traffic conditions that include such removable traffic safety objects. Images of real road conditions are captured by vehicle cameras 266 (FIG. 2) and applied to train the vehicle data processing models 250 (FIG. 2). However, such images only cover a limited number of real road conditions, and the vehicle data processing models 250 trained with these images may not be used to generate models that accurately anticipate all road conditions including different arrangements of removable traffic safety objects. Some embodiments are augmented to include images of traffic safety objects. The images of the traffic safety objects are optionally extracted from a database of arbitrary object primitives and overlaid on a drivable area of a road image to generate augmented training images. The augmented training images represent realistic detour lanes that can be used train autonomous vehicle driving models. In some embodiments, the augmented training images are used to create a scalable object-guided lane dataset (e.g., including a corpus of training images), which is leveraged to train a vehicle data processing model 250 (FIG. 2) to recognize object-guided drive lanes (e.g., detour lanes) in real road images captured by vehicles 102 (FIG. 1).

Figure 23:
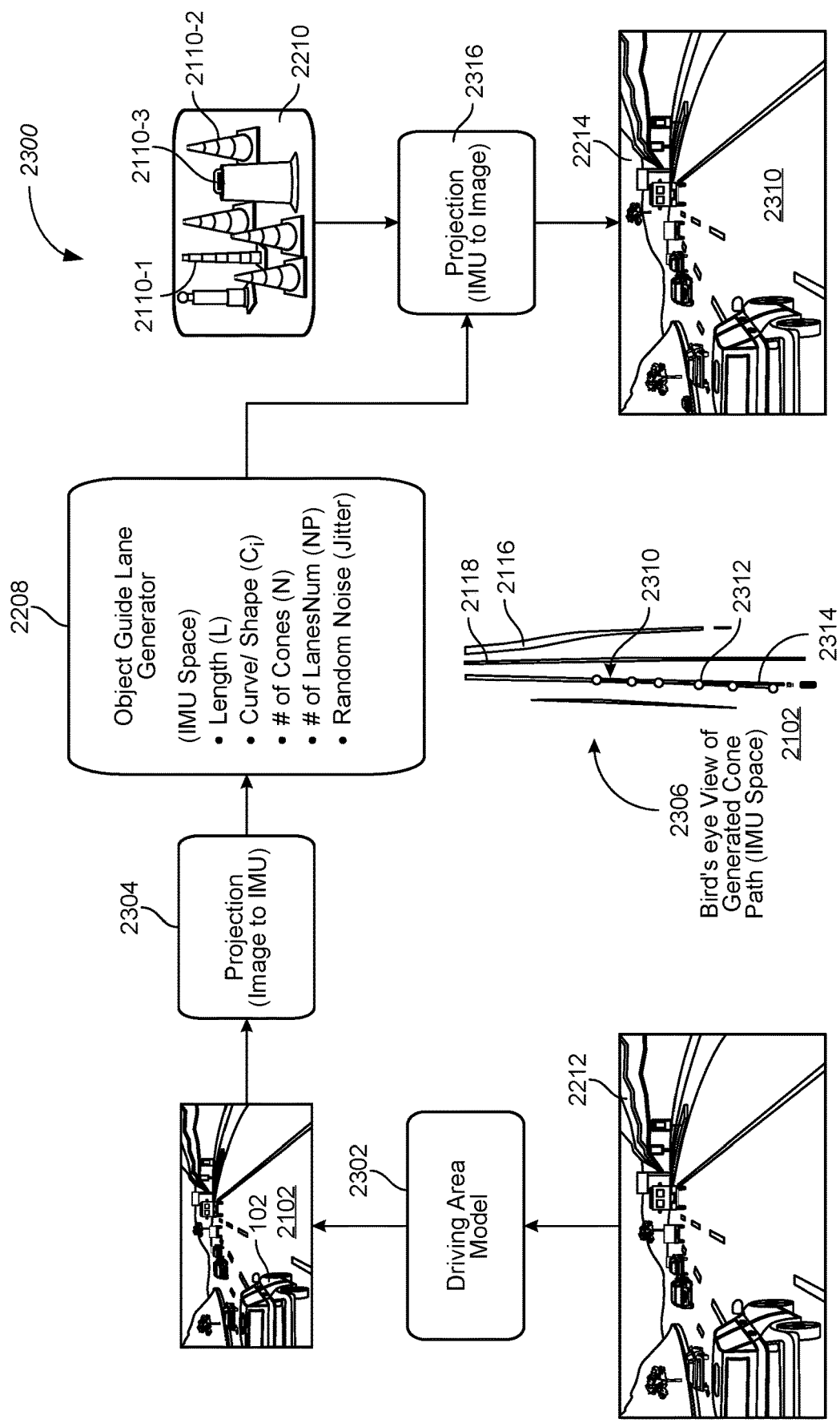
FIG. 23 is a flow diagram of an example process for augmenting training images by overlaying images of traffic safety objects on a drivable area of a road in an image, in accordance with some embodiments.

Object-guided drive lanes are distinct from permanent drive lanes, e.g., those defined by solid and dashed lane markings marked on a drivable area of a road. The object-guided drive lanes are used to guide traffic temporarily. In some embodiments, an object-guided drive lane is defined by a single line of traffic safety objects. In some embodiments, an object-guided drive lane is defined jointly by a line of traffic safety objects and a solid or dashed lane marking existing on the drivable area. In some embodiments, an object-guided drive lane is defined by two substantially parallel lines of traffic safety objects. In some embodiments, each line of traffic safety objects consists of a single type of traffic safety object. In some embodiments, each line of traffic safety objects includes more than one type of traffic safety object, e.g., a mix of delineator posts 2110-1 and cones 2110-2 (FIG. 23).

Different object-guided drive lanes exhibit different characteristics and have different lane curvatures, lane widths, object spacings, object types, or lighting conditions. At the time of driving, a data processing module 228 (FIG. 2) of a vehicle 102 has to accurately detect the different characteristics of the object-guided drive lanes because the different characteristics determine a driving path of the vehicle 102. A model applied by the data processing module 228 is preferably trained with training images showing different road conditions, so that when applied by the data processing module 228, the model recognizes a real-time input image to facilitate at least partially autonomous driving of the vehicle 102. However, due to the rarity of some road conditions, it is difficult to locale images showing rare road conditions, such as images including object-guided drive lanes. In various embodiments of this application, existing images are augmented with images of traffic safety objects to provide images with object-guided drive lanes having different characteristics, thereby providing an efficient solution to generate training images having different object-guided drive lanes. After being trained with these training images, the model provides accurate road information to facilitate at least partially autonomous driving of the vehicle 102.

Figure 21:
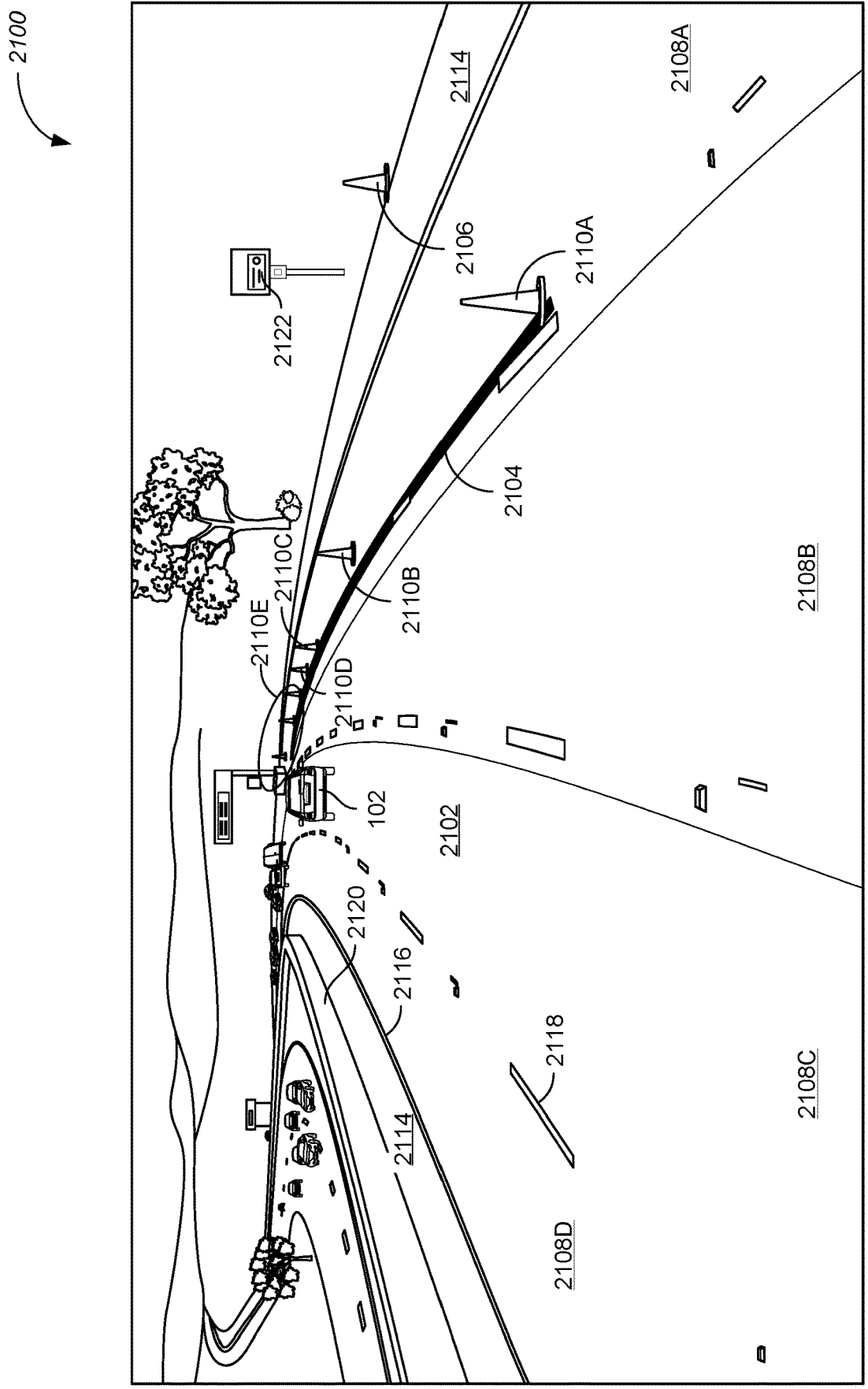
FIG. 21 is an example training image showing a drivable area of a road onto which copies of an image of a traffic safety object are placed, in accordance with some embodiments.

FIG. 21 is an example training image 2100 showing a drivable area 2102 of a road onto which copies of an image of a traffic safety object 2110 are placed, in accordance with some embodiments. The training image 2100 is generated from a first image after the copies of the image of the traffic safety object 2110 are adaptively overlaid on a plurality of positions of the first image along a detour lane line 2104. In other words, the training image 2100 is a combination of the first image and the copies of the image of the traffic safety object 2110. The detour lane line 2104 is applied to generate the training image 2100 from the first image and used jointly with the training data 2100 as a ground truth. The detour lane line 2104 is not shown in the first image and the training image 2100, but is labeled data associated with the training image 2100. In some embodiments, the image of the traffic safety object 2110 has a transparent background so that it can be overlaid on the first image when a copy of the traffic safety object 2110 is placed onto the drivable area 2102 of the road in the first image 2100. In some embodiments, the image of the traffic safety object 2110 is extracted from an existing portion 2106 of the same first image including the image of the traffic safety object 2110. In some embodiments, the image of the traffic safety object 2110 is extracted from a distinct image including the image of the traffic safety object 2110. In some embodiments, the image of the traffic safety object 2110 is obtained from a database, independently of whether the first image includes the image of the traffic safety object 2110.

The first image includes a plurality of road features, such as a lane area 2108, a vehicle 102, shoulder areas 2114, edge markings 2116, lane markings 2118, a shoulder barrier structure 2120, and a road sign 2122. In some embodiments not shown, the plurality of road features further includes one or more of a road divider, a traffic light, a traffic sign, and a pedestrian and a bicycle. The positions of the traffic safety object 2110 are determined based on information for the plurality of road features.

Referring to FIG. 21, the lane area 2108 is divided to four lanes 2108A, 2108B, 2108C, and 2108D by three lane markings 2118. The detour lane line 2104 starts from a first lane 2108A and cuts through a second lane 2108B that is immediately adjacent to the first lane 2108A. The copies of the image of the traffic safety object 2110 are placed along the detour lane line 2104 (which is temporarily added on the first image), thereby creating a road condition in which a sequence of traffic safety objects 2110A-2110E are distributed in the first and second lanes 2108A and 2108B. The sequence of traffic safety objects 2110A-2110E are configured to guide traffic on the drivable area 2102 towards third and fourth lanes 2108C and 2108D. In some embodiments, the training image 2100 is applied to train and generate a model for facilitating at least partial autonomous driving of a vehicle 102 on roads with traffic safety objects. In an example, the detour lane line 2104 is a ground truth associated with the training image 2100. The model includes a plurality of neural network layers associated with a plurality of weights. The model is trained using the training image 2100 to derive the detour lane lines 2104 from a sequence of traffic safety objects. Weights of the model are adjusted to match an output lane line recognized by the model as a detour lane line, e.g., within a tolerance.

The training image 2100 augments from the first image, rather than being captured from a real road condition. The first image is optionally captured by a camera 266 of a vehicle, extracted from a database, or modified from another image. In some embodiments, the training image 2100 is applied to train the model, and the first image that does not include a sequence of traffic safety objects, is not applied to train the model. The model is trained based on one or more augmented images. Alternatively, in some embodiments, both the first image and the training image 2100 are applied to train the model for facilitating at least partial autonomous driving of a vehicle 102. The model is optionally trained based on a combination of real and augmented images.

Figure 22:
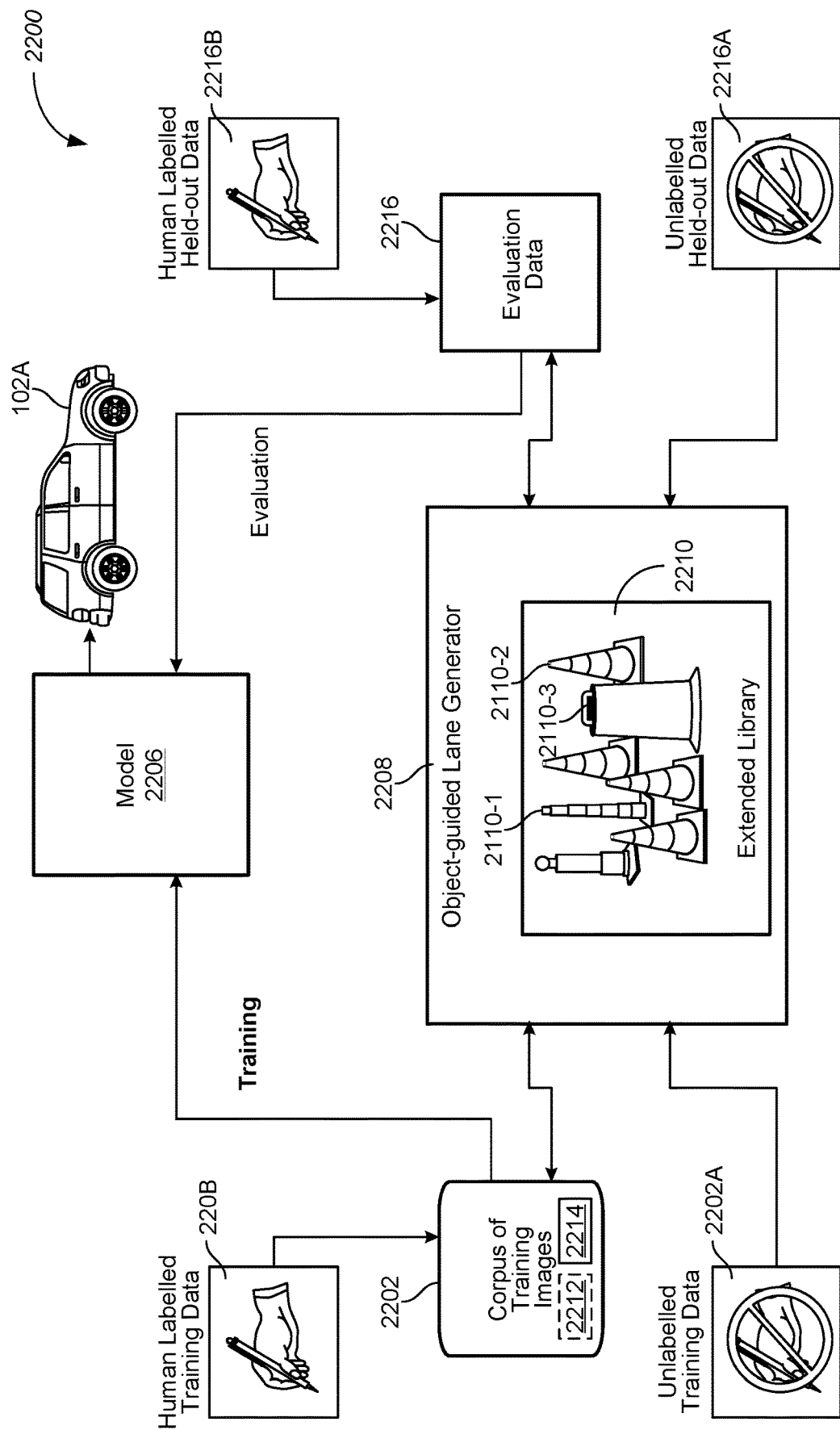
FIG. 22 is a flow diagram of an example process for augmenting training images with traffic safety objects and training a model using the training images, in accordance with some embodiments.

FIG. 22 is a flow diagram of an example process 2200 for augmenting training images with traffic safety objects and training a model 2206 using the training images, in accordance with some embodiments. The process 2200 is implemented by a training data augmentation module 328 (FIG. 3) of a model training module of a server 104 (e.g., in FIG. 3). Specifically, the training data augmentation module 328 includes an object-guided lane generator 2208, which further includes or is coupled to an extendable library 2210 of traffic safety objects 2110. The object-guided lane generator 2208 obtains a first image 2212 (e.g., from a corpus 2202 of training images) and obtains an image of a traffic safety object 2110 from the library 2210. The object-guided lane generator 2208 further determines a detour path 2310 on a drivable area on the first image 2212 and positions of plurality of traffic safety objects 2110 to be placed adjacent to the detour path 2310. The object-guided lane generator 2208 generates a second image 2214 (e.g., the training image 2100 in FIG. 21) from the first image 2212 by adaptively overlaying a respective copy of the image of the traffic safety object 2110 at each of the determined positions.

The second image 2214 is added to the corpus 2202 of training images to be used by a machine learning system to generate a model 2206 for facilitating at least partial autonomous driving of a vehicle 102. In some embodiments, the corpus 2202 of training images includes a subset of unlabeled images 2202A used for unsupervised training. In some embodiments, the corpus 2202 of training images includes a subset of labeled images 2202B used for supervised training. For example, the second image 2214 is added into the corpus 2202 of training images with information of the detour path 2310 (e.g., a location of a detour lane line 2104 in FIG. 21), and the second image 2214 and the information of the detour path 2310 are applied jointly to train the model 2206 in a supervised manner. After the model 2206 is trained, the model 2206 is used to process unlabeled held-out data 2216A and/or labeled held-out data 2216B and facilitate at least partially autonomous driving of a first vehicle 102A.

The model 2206 includes a vehicle data processing model 250 (e.g., an autonomous vehicle driving model) for performing one or more of a plurality of on-vehicle tasks including, but not limited to, perception and object analysis 230, vehicle localization and environment mapping 232, vehicle drive control 234, vehicle drive planning 236, and local operation monitoring 238 in FIG. 2. In some embodiments, the model 2206 is trained using the corpus 2202 of training images, including the second image 2214, and distributed to one or more vehicles 102 including the first vehicle 102A. In use, the model 2206 is configured to process road images captured by the first vehicle 102A, e.g., in real time, to facilitate at least partially autonomously driving the first vehicle 102A. In some situations, each of a subset or all of the road images captured by the first vehicle 102A includes one or more traffic safety objects 2110. The model 2206 facilitates driving the first vehicle 102A along a detour path that is at least partially defined by a plurality of traffic safety objects. Alternatively, in some situations, none of the images captured by the first vehicle 102A includes any traffic safety object 2110.

In some embodiments, the object-guided lane generator 2208 obtains the image of a traffic safety object 2110 from the extendable library 2210, applies a realistic effect onto the image of the traffic safety object 2110, and overlays the image of the traffic safety object 2110 on the first image 2212 to generate the second image 2214. Specifically, in some embodiments, the object-guided lane generator 2208 applies the realistic effect by scaling a respective size of the respective copy of the image of the traffic safety object 2110 based on a respective position where the respective traffic safety object 2110 is to be placed, adjusting an orientation of the respective copy of the image of the traffic safety object 2110 based on a direction normal to the drivable area 2102 at the respective position, and/or adjusting one or more image properties (e.g., brightness, contrast) of the respective copy of the image of the traffic safety object 2110. Alternatively or additionally, in some embodiments, the object-guided lane generator 2208 adjusts one or more image properties (e.g., brightness, contrast) of the first image 2212 on which the respective copy of the image of the traffic safety object 2110 is overlaid to match lighting conditions of the first image 2212 and the respective copy of the image of the traffic safety object 2110.

In some embodiments, each type of traffic safety object 2110 corresponds to a primitive that is processed to enable the realistic effect of the image of the traffic safety object 2110. For example, the image of the cone-based traffic safety object 2110-2 is generated from an original image having a cone structure. The cone structure is selected from the original image using a snipping tool. The image of the cone-based traffic safety object 2110-2 is created in a standard image editing tool, and has a transparent background. The cone-based traffic safety object 2110-2 has a predefined cone height (e.g., 28 inch). The image of the cone-based traffic safety object 2110-2 is stored in the extended library 2210 with geometric information (e.g., the predefined cone height).

In some embodiments, to ensure realism, the traffic safety object 2110 appears to be part of a scene in the first image 2212. A base of the traffic safety object 2110 on the copy of the image of the object 2110 is aligned with, and overlaps, corresponding pixels of the drivable area 2102 corresponding to a position where a corresponding copy of the image of the traffic safety object 2110 is overlaid. Sizes of a sequence of the traffic safety objects 2110 (e.g., objects 2110A-2110E in FIG. 21) are adjusted based on perceived depths of the traffic safety objects 2110, optionally without explicitly knowing a depth of a scene where the traffic safety objects 2110 are located.

Independently of whether the first image 2212 includes any traffic safety object 2110, the first image 2212 is applied to generate the second image 2214 based on traffic safety objects 2110 stored in the extendable library 2210. This allows for the possibility of creating an corpus 2202 of large amounts of training images from various real images of various road conditions. The resulting augmented corpus 2202 of training images can be further applied to train the model 2206 to recognize real-world object-guided drive lanes under complicated road conditions and facilitate autonomous driving that takes into account object-guided drive lanes.

FIG. 23 is a flow diagram of an example process 2300 for augmenting training images by overlaying images of traffic safety objects 2110 on a drivable area 2102 of a road in an image, in accordance with some embodiments. The process 2300 for augmenting training images is implemented at a computer system (e.g., a server 104 in FIGS. 1 and 3). The computer system obtains a first image 2212 and generates a second image 2214 from the first image 22012 by adding a plurality of traffic safety objects 2110 on a drivable area 2102 of a road in the first image 2212. For example, the plurality of traffic safety objects 2110 include one or more delineator posts 2110-1, one or more cones 2110-2, one or more barrels 2110-3, or a combination thereof. Referring to FIG. 23, in this example, the plurality of traffic safety objects 2110 includes a plurality of delineator posts 2110-1 (e.g., 6 unblocked delineator posts 2110-1) in the second image 2214.

In accordance with the process 2300, the drivable area 2102 is identified in the first image 2212, e.g., using a drivable area model 2302. For example, all areas between curbs where are no objects are identified as the drivable area 2102. In some embodiments, positions of the drivable area 2102 in a two-dimensional (2D) image coordinate system of the first image 2212 are projected (2304) onto a three-dimensional (3D) camera coordinate system and a 3D inertial measurement unit (IMU) coordinate system (or any other reference plane/point on the vehicle 102) successively. The computer system includes an object-guided lane generator 2208, which further includes or is coupled to an extendable library 2210 of traffic safety objects 2110. The object-guided lane generator 2208 determines a detour path 2310 on the drivable area 2102 of the road in the 3D IMU coordinate system (or other suitable coordinate system) based on the projected positions of the drivable area 2102 in the 3D IMU coordinate system. Positions 2312 for a plurality of traffic safety objects 2110 are further identified on the drivable area 2102 in the 3D IMU coordinate system. In some embodiments, the detour path 2310 is defined by at least one detour lane line 2314 on the drivable area 2102 of the road. In some embodiments, the positions 2312 of the traffic safety objects 2110 in the 3D IMU coordinate system are further projected (2316) onto the 3D camera coordinate system and the 2D image coordinate system successively. For each of the plurality of traffic safety objects 2110, a copy of an image of the respective traffic safety object 2110 is extracted from the extendable library 2210, adaptively adjusted, and overlaid on the first image 2212 based on the respective projected location in the 2D image coordinate system of the first image 2212. By these means, copies of the image of the traffic safety object 2110 can be placed adjacent to the detour path 2310 on the second image 2214.

In some embodiments, the drivable area model 2302 is applied to identify the drivable area 2102 of the road in the first image 2212. A segmentation mask is generated to identify the drivable area 2102. For example, the segmentation mask includes a binary segmentation mask having a plurality of elements each of which indicates whether a corresponding pixel or region of pixels in the first image 2212 correspond to the drivable area 2102 of the road. In some embodiments, the same segmentation mask, or a distinct segmentation mask, is generated to identify a plurality of road features in the first image 2212. The corresponding segmentation mask has a plurality of elements each of which indicates a class of one or more pixels of the first image 2212. In an example, the class is optionally one of: a lane area 2108, a vehicle 102, shoulder areas 2114, edge markings 2116, lane markings 2118, a shoulder barrier structure 2120, a road sign 2122, a road divider, a traffic light, a traffic sign, and a pedestrian, and a bicycle.

In some embodiments, the drivable area 2102 of the road includes an edge marking 2116 and lane markings 2118 from a bird's eye view 2306 of the IMU coordinate system. These markings 2116 and 2118 define a plurality of drive lanes on the drivable area 2102. The detour path 2310 is defined by the plurality of traffic safety objects 2110 to be superimposed on the plurality of drive lanes on the drivable area 2102. The detour path 2310 overrides the plurality of drive lanes on the drivable area 2102 (e.g., changes a width of a middle drive lane in the view 2306). In some embodiments, the computer system executes a training data augmentation application having a graphical user interface (GUI). The training data augmentation application is configured to display the first image 2212 or the bird's eye view 2306 on the GUI and receive a user input of at least one detour lane line 2314 to define the detour path 2310 thereon. Alternatively, in some embodiments, the computer system automatically generates the at least one detour lane line 2314 based on a data augmentation scheme. The computer system determines one or more object settings of: a total number of detour paths (NP), a length of the detour lane line 2314 (L), a number of objects 2110 on the detour lane line 2314 (N), object spacings between each two immediately adjacent traffic safety objects 2110 ($S_i$), curvatures of the first detour lane line at the plurality of traffic safety objects ($C_i$), and randomly generated deviations (also called jitters) from the detour lane line 2314. The positions of the plurality of traffic safety objects 2110 on the detour lane line 2314 are determined based on these object settings.

The positions of these traffic safety objects 2110 are determined in an inertial measurement unit (IMU) coordinate system in a vehicle 102, and converted to a position in the 3D camera coordinate system, and then to a position in the 2D image coordinate system. In some embodiments, the first image 2212 is obtained by the computer system with one or more of camera information, IMU information, information of camera-to-IMU transformation, and information of IMU—to camera transformation. The camera information includes a camera intrinsic parameter K that is applied to link coordinate values in the image coordinate system with coordinate values in the camera coordinate system. For each image captured by a camera 266 of an ego vehicle 102 (FIG. 2), the camera intrinsic parameter K is determined in a pixel space that defines projection of a 3D point into a 2D image plane. This corresponds to a pinhole projection model defined for an undistorted image or needs to specify distortion parameters, if the image is distorted. Examples of the camera intrinsic parameter K includes, but is not limited to, focal length, aperture, field-of-view, and resolution. For each image, the camera-to-IMU transformation corresponds to a process of transforming the 3D point in the camera coordinate system to the IMU coordinate system. The information of camera-to-IMU transformation is applied to transform a position of the 3D point in the camera coordinate system to a position in the IMU coordinate system. Conversely, the information of IMU-to-camera transformation is applied to transform a position of a 3D point in the IMU coordinate system to a position in the camera coordinate system.

The extendable library 2210 stores information of a plurality of traffic safety objects 2110 (e.g., a delineator post 2110-1, a cone 2110-2, a barrel 2110-3). The information of each traffic safety object 2110 includes a physical height $H_{TSO}$ of the respective traffic safety object 2110 in the real world. The object-guided lane generator 2208 extracts an image of a traffic safety object 2110 from the extended library 2210 with related information (e.g., the physical height $H_{TSO}$). The image of a traffic safety object 2110 has a different perspective from that of the first image 2212. The object-guided lane generator 2208 determines a first scale of the extracted image of the traffic safety object 2110 to align its perspective with the perspective of the first image 2212. In some embodiments, top-left and bottom-right corners of the traffic safety object 2110 are projected to [−0.5, −0.5, 1]$H_{TSO}$ and [0.5, 0.5, 1]$H_{TSO}$, respectively. A bottom-middle point of the traffic safety object 2110 is projected as [0, −0.5, 1]$H_{TSO}$. As such, if the traffic safety object 2110 exists in the front of the camera 266 (FIG. 2) capturing the first image 2212, the top-left corner, bottom-right corner, and bottom-middle point of the traffic safety object 2110 are represented with the above 3D coordinate values to form a 3D scaled image of the traffic safety object 2110 in an object-based coordinate system.

In some embodiments, the detour path 2310 is defined in the 3D IMU space (or any other suitable space) and corresponds to the positions of the traffic safety objects 2110 located on a flat ground plane where the drivable area 2102 of the road is located. The IMU has an approximate height (IMU height) from the drivable area of the road. In an example, the IMU coordinate system includes three orthogonal axes, an x-axis going forward, a y-axis going left, and a z-axis going up. A point of the drivable area 2102 is represented as a depth dx, an offset offset_y, and a curvature c, and a height Hz with respect to a location of the IMU. An example of a position on the drivable area 2102 correspond to a depth $D_{TSO}$ and a height—IMU height, and represented as $[D_{TSO}, \text{offset\_y} \pm D_{TSO}^2, -\text{IMU height}]$ in the IMU coordinate system. In some embodiments, a jitter is added in the depth and offset values to emulate real-world not perfectly aligned placement of cones.

The 3D scaled image of the traffic safety object 2110 is transformed rigidly to the camera coordinate system to make the bottom-middle point of the traffic safety object 2110 align with and overlap a point on the drivable area 2102 (specifically, on the corresponding detour lane line 2314 or position 2312 of the traffic safety object 2110). Each position on the detour lane line 2314 in the IMU coordinate system is represented as $P_{LANE}$. A 3D position of a bottom-middle point of the traffic safety object 2110 in the IMU coordinate system is M×Xbm, where Xbm is the 3D position of the bottom-middle point in the 3D camera coordinate system and M a camera-to-IMU conversion vector. In some embodiments, the 3D position (M×Xbm) of the bottom-middle point of the traffic safety object 2110 in the IMU coordinate system overlaps the detour lane line ($P_{LANE}$), and the 3D position (M×Xbm) of the bottom-middle point of the traffic safety object 2110 in the IMU coordinate system is shifted by an offset $P_{LANE}$–M×Xbm to the detour lane line ($P_{LANE}$). Corners of the traffic safety object 2110 are translated using the offset ($P_{LANE}$–M×Xbm) to provide coordinate values of corresponding positions. For example, a top-left corner, a bottom-right corner, and a bottom-middle point correspond to positions $X_{TL}$, $X_{BR}$, and M×Xbm in the IMU coordinate system, and are translated to $X_{TL\_LANE}$, $X_{BR\_LANE}$, and $X_{BM\_LANE}$, which are equal to $X_{TL}+(P_{LANE}-M\times Xbm)$, $X_{BR}+(P_{LANE}-M\times Xbm)$, and $P_{LANE}$, respectively.

The image of the traffic safety object 2110 that is merged with the first image 2212 in the IMU coordinate system is further converted to the camera coordinate system and the image coordinate system successively. The projected corners of the image of the traffic safety object 2110 provide a second scale and positions in a 2D image space. For example, a projection of the bottom middle point of the traffic safety object 2110 is determined as $K*\text{inv}(M)*X_{BM\_LANE}$ on a 2D image, where K is the camera intrinsic parameter. Projections of the top left corner and the bottom right corner of the traffic safety object 2110 are determined as $K*\text{inv}(M)*X_{TL\_LANE}$ LANE and $K*\text{inv}(M)*X_{BR\_LANE}$ on the 2D image, respectively.

Once the second scale and positions of the image of the traffic safety object 2110 are known, the image of the traffic safety object 2110 are combined with the first image 2212 (e.g., using a weighted average in an HSV (hue, saturation, value) color space). The plurality of traffic lane object 2110 are rendered with a decreasing depth (i.e. from far to near) to simulate a traffic safety object 2110 occluding another object if needed. Labels are generated, for example, to include the detour lane line 2314 connecting the bottom middle point of each traffic safety object 2110 in the first image. The labels are provided with the second image 2214 generated from the first image 2212 and applied as a ground truth during a training process. In some situations, if a portion of a bottom of the image of the traffic safety object 2110 needs to be projected outside the drivable area 2102 of the road, the traffic safety object 2110 is not rendered and the corresponding detour lane line 2314 is broken. In some embodiments, the plurality of traffic safety objects 2110 include only one or two traffic safety object 2110, and are rejected and not rendered on the first image 2212.

Stated another way, in some embodiments, positions for a plurality of traffic safety objects 2110 to be placed adjacent to the detour path 2310 on the first image 2212 are based on alternative positions of the plurality of traffic safety objects 2110 in a first coordinate system (e.g., the 3D IMU coordinate system). The computer system obtains the camera intrinsic parameter K and a conversion vector (e.g., M) between the first coordinate system and a camera coordinate system. Based on the camera intrinsic parameter K and the conversion vector, the alternative positions of the plurality of traffic safety objects 2110 in the first coordinate system are converted to the positions of the plurality of traffic safety objects 2110 in an image coordinate system.

In some embodiments, each traffic safety object 2110 has one or more reference nodes (e.g., a bottom-middle point, a bottom-right corner, a top-left corner). The computer system identifies the one or more reference nodes in the respective copy of the image of the traffic safety object, and determines a respective location of each of the one or more reference nodes in a first coordinate system (e.g., the 3D IMU coordinate system) corresponding to a first space. The computer system obtains the camera intrinsic parameter K and the conversion vector (e.g., M) between the first coordinate system and a camera coordinate system. Based on the camera intrinsic parameter K and the conversion vector M, the respective location of each of the one or more reference nodes in the first coordinate system is converted to a respective location near a position of the respective traffic safety object 2110 in the image coordinate system.

FIGS. 24A-24C are three example training images 2410, 2420, and 2430 including a plurality of traffic safety objects 2110, in accordance with some embodiments, and FIGS. 24D-24F are top views 2440, 2450, and 2460 of a drivable area 2102 of a road in the training images in FIGS. 24A-24C, in accordance with some embodiments. Each of the training images 2410, 2420, and 2430 is generated from a first image including a drivable area 2102 of a road. The first image is captured during the daytime. Each of the training images 2410, 2420, and 2430 includes a detour lane line 2314A, 2314B, or 2314C creating a distinct detour path 2310A, 2310B, or 2310C on the same drivable area 2102 of the road in the first image. Additionally, in FIG. 24C, the detour lane line 2314C creates another distinct detour path 2310D jointly with a detour lane line 2314D. For each of the detour lane lines 2314A-2314D, copies of an image of a respective traffic safety object 2110 are adaptively distributed adjacent to the detour path 2310A, 2310B, 2310C, or 2310D. Each detour path 2310 is defined using the same type of traffic safety object 2110 (e.g., cones 2210-2 in FIG. 24A, barrels 2210-3 in FIG. 24B, and delineator posts 2210-1 in FIG. 24C). In some embodiments not shown, the plurality of traffic safety objects 2110 defining the detour path 2310 include two or more types of traffic safety objects 2110.

Each of the training images 2410, 2420, and 2430 corresponds to a respective top view 2440, 2450, or 2460 of the drivable area 2102 of the road in a 3D IMU coordinate system (also called a 3D IMU space). The detour lane line 2314A crosses a rightmost lane 2108 and a shoulder area 2114. The detour lane line 2314B changes a width of a corresponding drive lane to form the detour path 2310B. The detour lane lines 2314C and 2314D change widths of two adjacent right drive lanes 2108 and redefine the detour lane 2310D to include part of the shoulder area 114.

In some embodiments, a server 104 (FIG. 3) of a computer system includes a training data augmentation module 328 in a model training module 326. The training data augmentation module 328 determines each of the detour lane lines 2314A-2314D that is adjacent to a respective detour path 2310 and configured to define the detour path 2310 on the drivable area. Positions 2312 for one or more of the plurality of traffic safety objects are identified on or near the respective detour lane line 2314. It is noted that a traffic safety object 2110 is optionally disposed on a corresponding detour lane line 2314 or within a distance (e.g., <0.5m) from the corresponding detour lane line 2314.

In some embodiments, the detour lane lines 2314A-2314D are not drawn on the training images 2410, 2420, and 2430. Rather, information of the detour lane lines 2314A-2314D or positions 2312 of the plurality of traffic safety objects 2110 is stored with the training images as the ground truth. During training, a model 2206 that facilitates vehicle driving is trained using the training images 2410, 2420, and 2430 and the corresponding ground truth. Specifically, the computer system iteratively recognizes, by a machine learning system, a lane line of the detour path using the model 2206 and compares the recognized lane line to a respective one of the detour lane lines 2314A-2314D of the ground truth. The model 2206 is adjusted to match the recognized detour lane line to the respective one of the detour lane lines 2314A-2314D of the ground truth. More specifically, weights of the model 2206 are adjusted to control a difference between the recognized detour lane line to the respective one of the detour lane lines 2314A-2314D of the ground truth within a tolerance.

In some situations, when copies of the image of the traffic safety object 2110 are placed on the drivable area 2102 of the road, the traffic safety object 2110 occludes a portion of the drivable area 2102. Further, in some embodiments, the detour path 2310 or detour lane line 2314 is adjacent to a road feature that is one of a vehicle 102, a person, a bike, a motorcycle, a traffic sign, a road sign, etc.. A base of the traffic safety object 2110 is posited on a visible portion of the drivable area 2102. The road feature may be partially occluded by a traffic safety object 2110 based on depth values of the road feature and the traffic safety object 2110, and the traffic safety object 2110 is overlaid partially on the road feature. For example, referring to FIG. 24B, the road feature includes a vehicle 102 that is partially occluded by an image of a barrel 2110T.

FIGS. 25A-25C are another three example training images 2510, 2520, and 2530 including a plurality of traffic safety objects 2110, in accordance with some embodiments, and FIGS. 25D-25F are top views 2540, 2550, and 2560 of a drivable area 2102 of a road in the training images in FIGS. 25A-25C, in accordance with some embodiments. Each of the training images 2510, 2520, and 2530 is generated from a first image including a drivable area 2102 of a road. The first image is captured at night. Each of the training images 2510, 2520, and 2530 includes a pair of detour lane lines 2314E, 2314F, or 2314G creating a distinct detour path 2310E, 2310F, or 2310G on the same drivable area 2102 of the road in the first image. For each pair of detour lane lines 2314E, 2314F, or 2314G, copies of an image of a respective traffic safety object 2110 are adaptively distributed adjacent to the detour path 2310E, 2310F, or 2310G. Each detour path 2310 is defined using the same type of traffic safety object 2110 (e.g., cones 2210-2 in FIG. 25A and two different types of delineator posts 2210-1 in FIGS. 25B and 25C).

Each of the training images 2510, 2520, and 2530 corresponds to a respective top view 2540, 2550, or 2560 of the drivable area 2102 of the road in a 3D IMU coordinate system (or other suitable coordinate system). While the detour path 2310E is substantially identical to the detour path 2310F, a left detour lane line 2314E is slightly longer and has more traffic safety objects 2110 than a left detour lane line 2314F, and a right detour lane line 2314E is slightly shorter and has less traffic safety objects 2110 than a right detour lane line 2314F. The detour path 2310G has an opposite direction or curvature to those of the detour paths 2310E and 2310F. A corresponding left detour lane line 2314G has more traffic safety objects 2110 (i.e., smaller object spacings) than any other lane lines 2314E and 2314F.

Each of the detour paths 2310E-2310G is defined by two substantially parallel detour lane lines 2314E, 2314F, or 2314G, and positions 2312 of one or more of the traffic safety objects 2110 are substantially on or near the detour lane lines 2314E, 2314F, or 2314G. Specifically, for each training image 2510, 2520, or 2530, the training data augmentation module 328 determines a first detour lane line 2314E, 2314F, or 2314G that is adjacent to a detour path 2310E, 2310F, or 2310G and configured to define the detour path 2310E, 2310F, or 2310G on the drivable area 2102. The training data augmentation module 328 further identifies the positions 2312 for one or more of the plurality of traffic safety objects 2110 on or near the first detour lane line 2314E, 2314F, or 2314F based on one or more object settings. Further, the training data augmentation module 328 (FIG. 3) determines a second detour lane line 2314E, 2314F, or 2314F that is adjacent to the detour path 2310E, 2310F, or 2310G and configured to define the detour path 2310E, 2310F, or 2310G on the drivable area 2102 jointly with the first detour lane line 2314E, 2314F, or 2314F. The training data augmentation module 328 further identifies the positions 2312 for one or more of the plurality of traffic safety objects 2110 on or near the second detour lane line 2314E, 2314F, or 2314F based on one or more object settings. Additionally, in some embodiments, the training data augmentation module 328 (FIG. 3) converts the positions 2312 of the plurality of traffic safety objects 2110 from the IMU coordinate system to the positions in a camera coordinate system. During this conversion, one or more reference nodes (e.g., a top-left corner, a bottom-right corner, and a bottom-middle point) in the respective copy of the image of the traffic safety object 2110 are used.

Referring to FIGS. 24A-24F and 25A-25C, different detour paths 2310 are virtually created on a road image that has a drivable area 2102 having one or more drive lanes or a shoulder area while not having any detour path. A single first image is augmented to multiple training images that correspond to complicated road conditions involving different types of detour paths 2310. As a result, engineers do not need to recreate the different detour paths in real life and can train a vehicle data processing model 250 efficiently and reliably using the augmented training images.

FIGS. 26A-26F are six training images 2610-2660 showing a drivable area 2102 of a road where copies of an image of a traffic safety object are placed to define distinct detour paths 2310, in accordance with some embodiments. In some embodiments, each training image 2610-2660 is augmented from a distinct first image. Alternatively, in some embodiments, two or more of the training images 2610-2660 are augmented from the same first image, when different road features are added and/or when image characteristics are adaptively adjusted. For each training image, copies of an image of a respective traffic safety object 2110 are added to create one or more detour paths 2310.

Referring to FIGS. 26A and 26B, the training images 2610 and 2620 show road conditions at night, and image properties of each copy of the image of the traffic safety object 2110-2 are adjusted according to a respective local lighting condition. In some embodiments, the first image from which the training image 2610 or 2620 is generated is captured in the daytime. Image properties of the first image is adjusted and a lighting effect 2670 is added to the first image to create the road conditions at night for the training image 2610 or 2620. Referring to FIGS. 26C and 26F, traffic safety objects 2110-2 are added along three or more detour lane lines 2314 on the first image, thereby creating complex routing patterns. Referring to FIG. 26D, the training image 2640 shows a raining weather condition in which the drivable area 2102 has a different contrast level. A front wiper blade 2672 appears in a field of view of the training image 2640. Copies of an image of a delineator post 2110-1 are aligned and placed along a detour lane line in the training image 2640. Referring to FIG. 26E, four copies of an image of a barrel 2110-3 are added adaptively in the first image to generate the training image 2640.

FIG. 27 is a flow diagram of another example method 2700 for augmenting training data used for generating autonomous vehicle driving modelling, in accordance with some embodiments. In some embodiments, the method 2700 is governed by instructions that are stored in a non-transitory computer readable storage medium and are executed by one or more processors of a computer system (e.g., one or more processors 302 of a server 104 in FIG. 3). Each of the operations shown in FIG. 27 may correspond to instructions stored in the computer memory or computer readable storage medium (e.g., the memory 306 in FIG. 3) of the server 104. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 2700 may be combined and/or the order of some operations may be changed.

The computer system obtains (2702) a first image 2212 of a road and identifies (2704) within the first image 2212 a drivable area 2102 of the road. The computer system obtains (2706) an image of a traffic safety object 2110 (e.g., a cone 2110-2, a delineator post 2110-1, a barrel 2110-3). In some embodiments, the image of the traffic safety object 2110 has a transparent background. In some embodiments, the image of the traffic safety object 2110 is extracted from an alternative image by removing a background of the alternative image. The computer system determines a detour path 2310 on the drivable area 2102 (2708) and positions for a plurality of traffic safety objects 2110 to be placed adjacent to the detour path 2310 (2710). The computer system generates (2712) a second image 2214 from the first image 2212 by adaptively overlaying a respective copy of the image of the traffic safety object 2110 at each of the determined positions. The second image 2214 is added (2714) to a corpus 2202 of training images to be used by a machine learning system to generate a model 2206 (e.g., a vehicle data processing model 250) for facilitating at least partial autonomous driving of a vehicle.

In some embodiments, the computer system trains (2716), using machine learning, the model 2206 using the corpus 2202 of training images, including the second image 2214. The model 2206 is distributed (2718) to one or more vehicles, including a first vehicle. In use, the model 2206 is configured to process (2720) road images captured by the first vehicle to facilitate at least partially autonomously driving the first vehicle. For example, the model 2206 performs one or more of a plurality of on-vehicle tasks including, but not limited to, perception and object analysis 230, vehicle localization and environment mapping 232, vehicle drive control 234, vehicle drive planning 236, and local operation monitoring 238. In some situations, the model 2206 processes the road images in real time, and the road images optionally have one or more traffic safety objects 2110 or do not have any traffic safety objects 2110.

In some embodiments, the computer system adaptively overlays a respective copy of the image of the traffic safety object 2110 at each of the determined positions by at least scaling (2722) a respective size of the respective copy of the image of the traffic safety object 2110 based on a respective position where the respective traffic safety object 2110 is to be placed. In some embodiments, the computer system adaptively overlays a respective copy of the image of the traffic safety object 2110 at each of the determined positions by at least adjusting (2724) an orientation of the respective copy of the image of the traffic safety object 2110 based on a direction normal to the drivable area 2102 at the respective position. In some embodiments, the computer system adaptively overlays a respective copy of the image of the traffic safety object 2110 at each of the determined positions by at least adjusting (2726) one or more image properties of the respective copy of the image of the traffic safety object 2110. In the above embodiments, the respective copy of the image of the traffic safety object 2110 is adjusted to match the first image 2212 on lighting conditions, a brightness level, a contrast level, relative sizes, relative positions.

In some embodiments, the computer system obtains information for a plurality of road features, including one or more of: a vehicle, a lane area, a shoulder area, an edge marking, a lane marking, a shoulder barrier structure, a road divider, a traffic light, a traffic sign, a road sign, a pedestrian, and a bicycle. The determined positions are determined based on the information for the plurality of road features.

In some embodiments, the detour path 2310 is defined (2728) by two substantially parallel detour lane lines 2314, and positions of one or more of the traffic safety objects 2110 are substantially on or near the detour lane lines 2314. For example, each the one or more of the traffic objects is within a predefined distance (e.g., less than 0.5 meter) from the detour lane lines 2314 to define the detour path 2310 properly.

In some embodiments, the computer system determines the detour path 2310 on the drivable area 2102 by determining (2730) a first detour lane line (e.g., left detour lane lines 2314E, 2314F, and 2314G in FIG. 25D-27F) that is adjacent to the detour path 2310 and configured to define the detour path 2310 on the drivable area 2102 and identify (2732) positions for one or more of the plurality of traffic safety objects 2110 on or near the first detour lane line. In an example, a traffic safety object 2110 is placed near the first detour lane line when it is disposed within a predefined distance (e.g., 0.5 meter) from the first detour lane line. In some embodiments, the first detour lane line is manually marked on the first image 2212 by hand. The computer system presents the first image 2212 to a user, and receives a user input defining the first detour lane line on the first image 2212. The first detour lane line is optionally solid or dashed.

Further, in some embodiments, the computer device determines the first detour lane line by determining one or more of: a total number of detour paths, a length of the first detour lane line, a number of objects on the first detour lane line, object spacings between each two immediately adjacent traffic safety objects 2110, curvatures of the first detour lane line at the plurality of traffic safety objects 2110, and randomly generated deviations from the first detour lane line.

Additionally, in some embodiments, the first detour lane line defines the detour path 2310 jointly with a second detour lane line. The second detour lane line optionally includes a solid or dashed lane marking that exists on the road. Alternatively, in some embodiments, the second detour lane line includes another detour lane line (e.g., right detour lane lines 2314E, 2314F, and 2314G in FIG. 25D-27F) defined to place another set of traffic safety objects 2110. Specifically, the computer device determines the second detour lane line parallel to the first detour lane line. The second detour lane line is configured to define the detour path 2310 on the road jointly with the first detour lane line. Positions are identified for a second plurality of traffic safety objects 2110 on or near the second detour lane line. The second detour lane line is optionally shorter than, longer than, or equal to the first detour lane line. In some embodiments, the second detour lane line exists in the first image 2212. In some embodiments, the second detour lane line is manually marked by hand.

In some embodiments, the second image 2214 is associated with a ground truth, and the ground truth includes the first detour lane line. The computer device iteratively recognizes, by the machine learning system, a lane line of the detour path 2310 using the model 2206, compares the recognized lane line to the first detour lane line of the ground truth, and adjusts the model 2206 to match the recognized detour lane line to the first detour lane line of the ground truth, e.g., using a loss.

In some embodiments, the detour path 2310 is adjacent to a road feature, and the road feature is one of a vehicle, a person, a bike, a motorcycle, a traffic sign, and a road sign. Further, in some embodiments, the computer device determines that the road feature is partially occluded by a first traffic safety object 2110 based on depth values of the road feature and the first traffic safety object 2110. The first traffic safety object 2110 is overlaid partially on the road feature. In an example, the first detour lane line crosses the road feature.

In some embodiments, the traffic safety object 2110 includes a cone structure that is otherwise known as a pylon, road cone, highway cone, safety cone, traffic cone, channelizing device, or construction cone.

In some embodiments, the computer system determines alternative positions of the plurality of traffic safety objects 2110 in a first coordinate system (e.g., an IMU coordinate system) and converts the alternative positions of the plurality of traffic safety objects 2110 in the first coordinate system to the positions of the plurality of traffic safety objects 2110 in a camera coordinate system. Further, in some embodiments, the computer system obtains a camera intrinsic parameter K and a conversion vector (e.g., M) between the first coordinate system and the camera coordinate system. Based on the camera intrinsic parameter K and the conversion vector M, the alternative positions of the plurality of traffic safety objects 2110 in the first coordinate system are converted to the positions of the plurality of traffic safety objects 2110 in an image coordinate system.

In some embodiments, for each of the plurality of traffic safety objects 2110, the computer system identifies one or more reference nodes in the respective copy of the image of the traffic safety object (e.g., a base center node of each cone), and determines a respective location of each of the one or more reference nodes in a first coordinate system corresponding to a first space, and converts the respective location of each of the one or more reference nodes in the first coordinate system to a respective location near a position of the respective traffic safety object 2110 in a camera coordinate system. Further, in some embodiments, the computer system further obtains a camera intrinsic parameter K and the conversion vector (e.g., M) between the first coordinate system and a camera coordinate system. Based on the camera intrinsic parameter K and the conversion vector, the respective location of each of the one or more reference nodes in the first coordinate system is converted to the respective location near the position of the respective traffic safety object 2110 in an image coordinate system.

It should be understood that the particular order in which the operations in FIG. 27 have been described are merely exemplary and are not intended to indicate that the described order is the only order in which the operations could be performed. One of ordinary skill in the art would recognize various ways to augmenting vehicle training data (e.g., related to a detour path 2310 arranged by a plurality of traffic safety objects 2110). Additionally, it should be noted that details described with respect to FIGS. 1-26F are also applicable in an analogous manner to the method 2700 described above with respect to FIG. 27. For brevity, these details are not repeated here.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for augmenting training images used for generating a model for autonomously monitoring vehicle drivers, comprising:
   at a computer system including one or more processors and memory:
      obtaining a first image of a first driver in an interior of a first vehicle;
      separating, from the first image, a first driver image from a first background image of the interior of the first vehicle;
      obtaining a second background image, wherein the second background image includes an image of an interior of a second vehicle;
      generating a second image by overlaying the first driver image onto the second background image; and
      adding the second image to a corpus of training images to be used by a machine learning system to generate a model for autonomously monitoring vehicle drivers.

2. The method of claim 1, wherein the separating comprises:
   applying a segmentation model to generate a segmentation mask that (1) associates a plurality of first pixels of the first image with the first driver image or (2) associates a plurality of second pixels of the first image with the first background image.

3. The method of claim 2, wherein the segmentation model includes a U-Net that is based on a fully convolutional network.

4. The method of claim 1, further comprising:
   training the model for autonomously monitoring vehicle drivers to determine whether a vehicle driver is looking forward at a road ahead of a vehicle.

5. The method of claim 1, further comprising:
   training the model for autonomously monitoring vehicle drivers to determine whether a vehicle driver is looking forward at a road, looking to the left, looking to the right, looking down, closing eyes, or talking.

6. The method of claim 1, further comprising, prior to overlaying the first driver image onto the second background image, implementing one or more of:
   adjusting one or more image properties of at least one of the first driver image and the second background image to match lighting conditions of the first driver image and the second background image;
   normalizing at least one of the first driver image and the second background image to match average brightness levels of the first driver image and the second background image; and
   scaling at least one of the first driver image and the second background image.

7. The method of claim 1, further comprising:
   obtaining a third image of a second driver, where the first and second drivers are distinct from each other;
   separating, from the third image, a second driver image from a respective background image;
   generating a fourth image by overlaying the second driver image onto the second background image; and
   adding the fourth image to the corpus of training images to be used by the machine learning system to generate the model for monitoring vehicle drivers.

8. The method of claim 1, further comprising:
   collecting a plurality of background images;
   mapping each of the background images onto a respective point in a multidimensional space having a distance metric d;
   clustering the plurality of background images using the distance metric d to form a plurality of image clusters;
   for each of the image clusters, identifying one or more background images in the image cluster that are most distant according to the distance metric d;
   forming a set of candidate background images comprising the identified one or more most distant background images in each of the image clusters; and
   selecting the second background image from the set of candidate background images.

9. The method of claim 8, wherein clustering the plurality of background images comprises:
   selecting a positive integer number K;
   selecting K cluster centers; and
   for each of the plurality of background images:
      determining a distance of the respective background image from each of the cluster centers; and
      assigning the respective background image to a respective image cluster associated with a respective cluster center to which the respective background image has a shortest distance.

10. The method of claim 1, further comprising:
    collecting a plurality of background images;
    mapping each of the background images onto a respective point in a multidimensional space having a distance metric d;
    clustering the plurality of background images using the distance metric d to form a plurality of image clusters;
    for each of the plurality of background images, determining, on a clustering plot, a respective distance between the respective background image and a corresponding cluster center of an image cluster to which the respective background image belongs, wherein the second background image is selected from the plurality of background images based on the respective distance between the second background image and the corresponding cluster center.

11. The method of claim 1, wherein the first driver image is overlaid at a first location of the second background image, further comprising:

generating an alternative image by overlaying the first driver image at a second position of the second background image; and adding the alternative image into the corpus of training images jointly with the second image.

12. The method of claim 1, further comprising training the model for autonomously monitoring vehicle drivers to determine:

whether a vehicle driver is sitting on a driver seat or a passenger seat; and in accordance with a determination whether the vehicle driver is sitting on the driver seat or the passenger seat, classify the vehicle driver as a distracted driver or a distracted passenger.

13. A computer system, comprising:

one or more processors; and memory storing one or more programs configured for execution by the one or more processors, the one or more programs comprising instructions for:

obtaining a first image of a first driver in an interior of a first vehicle;

separating, from the first image, a first driver image from a first background image of the interior of the first vehicle;

obtaining a second background image, wherein the second background image includes an image of an interior of a second vehicle;

generating a second image by overlaying the first driver image onto the second background image; and adding the second image to a corpus of training images to be used by a machine learning system to generate a model for autonomously monitoring vehicle drivers.

14. The computer system of claim 13, wherein the instructions for separating the first driver image from the first background image further comprises instructions for:

applying a segmentation model to generate a segmentation mask that (1) associates a plurality of first pixels of the first image with the first driver image or (2) associates a plurality of second pixels of the first image with the first background image.

15. The computer system of claim 13, the one or more programs further comprising instructions for:

training the model for autonomously monitoring vehicle drivers to determine whether a vehicle driver is looking forward at a road ahead of a vehicle.

16. The computer system of claim 13, wherein the one or more programs further comprises instructions for, prior to overlaying the first driver image onto the second background image, implementing one or more of:

adjusting one or more image properties of at least one of the first driver image and the second background image to match lighting conditions of the first driver image and the second background image;

normalizing at least one of the first driver image and the second background image to match average brightness levels of the first driver image and the second background image; and scaling at least one of the first driver image and the second background image.

17. A non-transitory computer-readable storage medium storing one or more programs configured for execution by one or more processors of a computer system, the one or more programs comprising instructions for: obtaining a first image of a first driver in an interior of a first vehicle;

separating, from the first image, a first driver image from a first background image of the interior of the first vehicle;

obtaining a second background image, wherein the second background image includes an image of an interior of a second vehicle;

generating a second image by overlaying the first driver image onto the second background image; and adding the second image to a corpus of training images to be used by a machine learning system to generate a model for autonomously monitoring vehicle drivers.

18. The non-transitory computer-readable storage medium of claim 17, further comprising instructions for:

training the model for autonomously monitoring vehicle drivers to determine whether a vehicle driver is looking forward at a road, looking to the left, looking to the right, looking down, closing eyes, or talking.

19. The non-transitory computer-readable storage medium of claim 17, further comprising instructions for, prior to overlaying the first driver image onto the second background image, implementing one or more of:

adjusting one or more image properties of at least one of the first driver image and the second background image to match lighting conditions of the first driver image and the second background image;

normalizing at least one of the first driver image and the second background image to match average brightness levels of the first driver image and the second background image; and scaling at least one of the first driver image and the second background image.

20. The non-transitory computer-readable storage medium of claim 17, wherein the instructions for separating the first driver image from the first background image further comprises instructions for:

applying a segmentation model to generate a segmentation mask that (1) associates a plurality of first pixels of the first image with the first driver image or (2) associates a plurality of second pixels of the first image with the first background image.

* * * * *